(12) United States Patent
Bekey

(10) Patent No.: US 9,595,295 B1
(45) Date of Patent: *Mar. 14, 2017

(54) ALGORITHMIC BASED APPROACH TO IMAGE SUBSTITUTION FOR OVERCOMING INAPPROPRIATE APPARENT ROTATION OF VEHICLE WHEELS IN VIDEOS

(71) Applicant: Ivan Bekey, Annandale, VA (US)

(72) Inventor: Ivan Bekey, Annandale, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/097,595

(22) Filed: Apr. 13, 2016

Related U.S. Application Data

(63) Continuation-in-part of application No. 13/506,454, filed on Apr. 20, 2012, now Pat. No. 9,367,908.

(60) Provisional application No. 61/477,748, filed on Apr. 21, 2011.

(51) Int. Cl.
*H04N 7/18* (2006.01)
*G11B 27/036* (2006.01)

(52) U.S. Cl.
CPC .................. *G11B 27/036* (2013.01)

(58) Field of Classification Search
CPC ...... G01N 21/8806; G06T 2207/30164; G06T 7/0004; G06T 7/001; H04N 7/183; G11B 2220/90; G11B 27/024; G11B 27/034; G11B 27/11; G11B 2220/20; G11B 27/036

USPC ............................................ 348/92; 386/286
See application file for complete search history.

(56) References Cited

U.S. PATENT DOCUMENTS

2008/0211941 A1  9/2008  Deever et al.
2012/0062845 A1  3/2012  Davis

*Primary Examiner* — Jorge L Ortiz Criado
*Assistant Examiner* — Benjamin Pezzner
(74) *Attorney, Agent, or Firm* — Maier & Maier, PLLC

(57) ABSTRACT

Apparatus and methods are described to overcome the perception in viewed video or other presentations containing moving vehicles that the apparent rotation rate of their wheels is frequently inappropriate for the vehicle speeds, which is caused by the stroboscopic interaction between the wheel spokes and the rate at which the images are presented. A currently preferred embodiment operates off-line under human control on a previously recorded video, identifying the wheels and replacing them with suitably altered images which are perceived to rotate at rates appropriate to the vehicle speeds; or to suppress inappropriate perception of rotation. The apparatus and method results in a new recording of the original video in which the wheels appear to rotate at the correct rate for all vehicle speeds. Alternate embodiments implement a similar but automated process operating in near-real time for operating in-line on streaming videos; and variations achieving the same ends.

9 Claims, 28 Drawing Sheets

| ALIAS ORDER | NUMBER OF SPOKES IN WHEEL | | | | | | | | | | |
|---|---|---|---|---|---|---|---|---|---|---|---|
| | 1 | 2 | 3 | 4 | 5 | 6 | 7 | 8 | 9 | 10 | 20 |
| 1 | | 30 | 40 | 45 | 48 | 50 | 51 | 53 | 53 | 54 | 57 |
| 2 | | | 20 | 30 | 36 | 40 | 43 | 45 | 47 | 48 | 54 |
| 3 | | | | 15 | 24 | 30 | 34 | 38 | 40 | 42 | 51 |
| 4 | | | | | 12 | 20 | 26 | 30 | 33 | 36 | 48 |
| 5 | | | | | | 10 | 17 | 23 | 27 | 30 | 45 |
| 6 | | | | | | | 9 | 15 | 20 | 24 | 42 |
| 7 | | | | | | | | 8 | 13 | 18 | 39 |
| 8 | | | | | | | | | 7 | 12 | 36 |
| 9 | | | | | | | | | | 6 | 33 |
| 10 | | | | | | | | | | | 30 |
| 11 | | | | | | | | | | | 27 |
| 12 | | | | | | | | | | | 24 |
| 13 | | | | | | | | | | | 21 |
| 14 | | | | | | | | | | | 18 |
| 15 | | | | | | | | | | | 15 |
| 16 | | | | | | | | | | | 12 |
| 17 | | | | | | | | | | | 9 |
| 18 | | | | | | | | | | | 6 |
| 19 | | | | | | | | | | | 3 |

FIG. 9

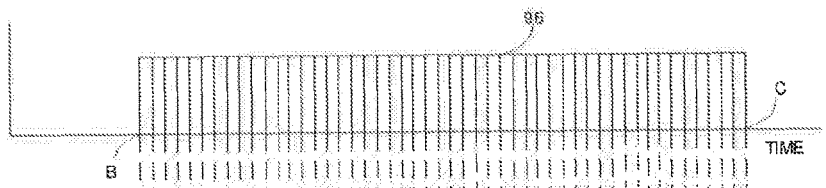
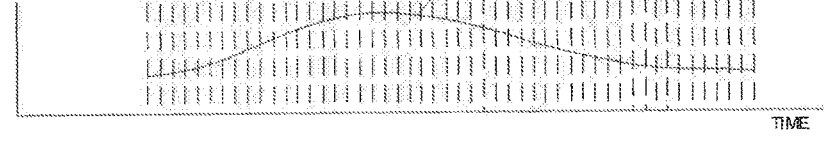

US 9,595,295 B1

ALGORITHMIC BASED APPROACH TO IMAGE SUBSTITUTION FOR OVERCOMING INAPPROPRIATE APPARENT ROTATION OF VEHICLE WHEELS IN VIDEOS

RELATED APPLICATIONS

This application is a continuation-in-part of U.S. patent application Ser. No. 13/506,454 filed on Apr. 20, 2012, the contents of which are herein incorporated by reference into this disclosure.

BACKGROUND OF THE INVENTION

This invention overcomes the frequent inappropriate apparent rotation rate of the wheels of moving vehicles that commonly appear in televised, video, filmed, computer, and other media images. This inappropriate rotation is caused by the stroboscopic effect, which arises because many wheels of moving vehicles, trucks, wagons and other vehicles, are composed of, or have on them, periodic or symmetrical structures such as spokes or wheel covers hubcaps with regularly placed areas, markings, or other designs, and are seen by the viewers only at the periodic and discrete intervals given by the rapid sequence, or the frame rate, of the video display medium. This stroboscopic effect, which is equivalent to the wheels or wheel covers being illuminated only at the rapid sequence of instants given by the frame rate, frequently makes the wheels appear to rotate at rates that are unrelated to the actual rate at which they should rotate due to the motion of the vehicle. Thus the wheels are frequently seen rotating forward, backward, or not at all, bearing little correlation with the actual vehicle speed. The same effect is also apparent when basically linear objects with regular features, such as ladders, are moved across the video field of view, the ladder appearing to have inappropriate linear motion, forward, backward, or appear motionless.

The origin of the stroboscopic effect is described referring to FIGS. 1 through 4, in which:

FIG. 1 illustrates a typical car, as example of a vehicle

FIG. 2 illustrates a typical wheel assembly on a typical car, as example of a vehicle FIGS. 3A-3L show the inappropriate apparent rotation rate of a wheel at one vehicle speed FIGS. 4A-4L show the inappropriate apparent rotation rate of a wheel at a different vehicle speed These figures contain numerical elements as follows:
10 Vehicle (in FIG. 1)
20 Wheel assembly (in FIGS. 1 and 2)
21 Wheel assembly with distinctive imaginary mark on tire (in FIGS. 3A-3L and 4A-4L)
22 Tire (in FIG. 2)
23 Imaginary distinctive mark on tire (in FIGS. 3A-3L and 4A-4L)
24 Rim of wheel (in FIG. 2)
25 Stationary vertical reference line (in FIGS. 3A-3L and 4A-4L)
26 Inner surface of wheel (in FIG. 2)
28 Spoke structures of wheel (in FIG. 2)
29 Hub or portion of vehicle holding the wheel (in FIG. 2)

This description begins with a discussion of a typical vehicle and the features of its wheels that give rise to the stroboscopic effect when video of the moving vehicle is presented to a viewer display, and which results in the inappropriate rotation perception problem. This is presented to facilitate understanding of the invention embodiments and their operation.

FIG. 1 shows a typical vehicle 10, including its spoked wheel assemblies 20, on the ground (which is not shown). FIG. 2 illustrates one wheel assembly, which generally comprises a rubber tire 22 mounted on a metal wheel. This metal wheel has a rim 24 and a generally cylindrical base 26 supported by spokes 28 or other structures, in this example shown as a six-sided star shape with truncated tips. This metal wheel connects the entire wheel assembly to the drive shaft or other mechanisms mounted on the vehicle suspension represented by housing 29 if the wheel assembly is driven by the vehicle's power train, or to surfaces not shown that are free to rotate if the wheel assembly is not driven by the power train of the vehicle. In some implementations the spokes of the wheel or some portions thereof are covered with a decorative plate or cap or hub cap. The particular design of the spokes or decorative cap or the like including the thickness, length, shape, color, and number of elements are unimportant except that there is usually an integer number of such spokes or design elements and they are generally regularly spaced around the wheel. It is this regular spacing of an integer number of elements which, together with their rotation rate and the images being presented to the viewer at another given rate, creates the stroboscopic effect.

FIGS. 3A through 3L illustrate the problem in a sequence of drawings of a rotating spoked wheel assembly as they would be seen if taken by a video camera and presented by the user displays at a fixed frame rate, in this example shown as 60 times per second, though the principle is the same at different frame rates. At each instant of time, in this example sequentially at every $1/60^{th}$ of a second, is shown the typical wheel assembly with six spokes but drawn in simplified form as a six-pointed star, as one of many shapes a wheel or hub cap or cover can take. Thus FIG. 3A is taken at the start of the sequence of video frames, FIG. 3B is taken $1/60^{th}$ of a second later, FIG. 3C is taken at $2/60^{th}$ of a second later, FIG. 3D is taken at $3/60^{th}$ second later, and so on with the last image, FIG. 3L, being shown taken at $11/60^{th}$ of a second later.

In each of these figures the tire of the wheel assembly has imprinted on it an imaginary mark shown as circle 23 so that we may discern and discuss the actual physical rotational position of the wheel assembly, which is now identified as 21 to differentiate it from the generic wheel assembly 20 which does not have such an imaginary mark or circle shown on its tire. It must be understood that this marking of the tire is purely for illustrative purposes, and that wheel assemblies or tires do not generally have such marks nor do they need any such markings in order for the stroboscopic effect to materialize. Also shown in these figures is a vertical reference line 25, also imaginary, so that the perceived rotation of the wheel assembly can be better visualized for the purposes of this discussion, since the actual spoked part of the wheel assembly in general has no identifying marks to distinguish one of its spokes or elements from another. It must also be understood that the wheel assembly is in contact with a road or other generally horizontal surface, which is not shown in any of the illustrations.

This wheel assembly 21 is rotating clockwise, as shown by the position of the painted reference circle 23 on the tire in successive images, the rotation being shown incrementally as about 50 degrees every $1/60^{th}$ of a second. The wheel assembly is generally rotating faster than the eye can track any mark on the tire. Thus the eye would not perceive the wheel assembly as rotating at all while it is actually rotating one full revolution in $7/60^{th}$ of a second, as shown in FIG. 3H. This is an equivalent rotational rate of 8.57 revolutions per second, which is 514 revolutions per minute. Given that a typical vehicle wheel assembly with tire has a diameter of 0.6 meters (2 feet) or so, this corresponds to an outer circumference of the tire of 3.14 times 0.6, which is 1.9 meters (6.28 feet), which means that the car and wheel assembly would move 1.9 meters (6.28 feet) linearly during the time a wheel assembly makes one revolution. Therefore a vehicle which rotates its wheel assembly at 8.57 revolutions per second travels 8.57 times 1.9 meters (6.28 feet) in each second, which is 16.3 meters per second (53.8 feet per second). This equates to 58.7 kilometers per hour (40.4 miles per hour), which is not an unusual speed for vehicles to be shown traveling in television, videos, or movies; and in any case is only shown as an example as the stroboscopic effect can and does occur at other speeds as well.

It is seen by examination of FIGS. 3A through 3L that while the actual rotation speed of the wheel assembly is 8.57 revolutions per second clockwise, the apparent rotation of the wheel assembly 21 is slowly counterclockwise, as seen by observing the triangular spokes, which are regularly placed around the wheel assembly, going counterclockwise past the static vertical reference line 25. In the example of FIGS. 3A through 3L the spoked wheel has apparently rotated 90 degrees in $11/60^{th}$ seconds, which equates to 1.36 revolutions per second counterclockwise. The eye is not capable of following the actual rapid clockwise rotation of the wheel assembly, and instead perceives that the wheel assembly rotates in a wrong direction by following the slow counterclockwise rotation. This effect is unchanged even if the reference mark were omitted, it being included in the illustration only for clarity.

Thus FIGS. 3A through 3L clearly illustrate the problem commonly experienced in video and film viewing, that often the perceived rotational speed of the wheel assembly bears little relationship to its actual rotational speed except for a few, fleeting instants of time should the vehicle be accelerating or decelerating through particular speeds when the stroboscopic effect produces the proper apparent rotation speed for the vehicle speed; and when it is stopped.

FIGS. 4A through 4L illustrate a different example in which the actual rotational speed of the wheel assembly 21 is still clockwise, but more rapid than that shown on FIGS. 3A though 3L. In this case the perceived rotation of the wheel assembly is zero as seen against the static reference vertical line because the wheel rotates an amount during $1/60^{th}$ of a second that brings the symmetrical wheel spoke pattern to a new rotational position which is such that it appears identical to the previous position even though rotated. This occurs because each spoke of the wheel is identical to all other spokes, and regularly located circumferentially around the wheel. This is a second example that the perceived rotational rates of the wheel assemblies on a vehicle often bear little relationship to their actual rotational speed, if seen in a video, movie, television, or other such display using rapid periodic presentation.

These inappropriate effects are disconcerting at best for the viewer, and deleterious to manufacturers and advertisers when displaying their vehicles and other vehicles for sale to consumers. While this application addresses both rotational and translational inappropriate apparent motion the application will principally discuss the rotational problem, it being understood that all aspects and content of this patent application and its embodiments apply to both rotational and translational effects. Remarkably this artifact has not been remedied, and inappropriate rotation images are unfortunately ubiquitous, despite the fact that automobile manufacturers alone spend hundreds of millions of dollars annually for television and video advertising, a substantial fraction of which feature moving vehicles yet all of which suffer from the inappropriate apparent rotation problem. Furthermore this problem is not new. Consider that film movie projection is well over 100 years old now and commercial television is over 60 years old, and both have suffered from the same stroboscopic motion effect all the time, from backwardly rotating wagon wheels in western movie films to ubiquitous televised images of vehicles with wheels whose rotation bears little or no relation to the actual speed of the vehicle, and frequently show stopped wheels, backward-rotating wheels, or forward rotating wheels at the wrong rate on a vehicle moving rapidly forward.

SUMMARY

The embodiments of this invention each utilize apparatus and method to modify the images of rotating wheels on a vehicle as shown in video, television, movies, computer, or other media displays so that the perceived rotation of the wheels appears appropriate for any speed at which the vehicle is shown and seen traveling in the video, television, movies, computer, or other media displays. The embodiments identify the wheels of the vehicle that are visible at any particular time in the video, identify the areas or features of the wheels that are regularly placed and thus cause stroboscopic effects in conjunction with the frame rate of the video, determine the wheel rotation rates and shapes, define the actual rotation rate ranges that cause inappropriate but detectable apparent rotation rates, and implement innovative algorithms to guide the image substitution such that when followed enable the choice of image substitution timing and kind so as to have maximum effect in removing the features that cause the stroboscopic effect; or otherwise modify them to prevent the effect from materializing in order to ensure that any apparent rotation rate that is perceived by the viewers is appropriate for the actual vehicle speed; and insert the modified wheel images into the appropriate images of the vehicle in the proper frames of the video data stream replacing the images of the original wheels or features. An alternative approach is to synthesize the desired images of the wheels, whether the same or different from the original wheel designs, and sequentially "morph" them and rotate them as appropriate and then insert the morphed or rotated frames into the video data stream following the same algorithms, thus ensuring the best possible effect removal.

The embodiments presented all provide algorithmically defined methods which differ principally in the degree and kind of human operator participation in and control of the computing machine process to attain the same desired results; in whether the process is off-line and intended for modification of a video and its recording to be used later, or whether the process operates in real time and while the video is streaming to the used displays; in the degree to which the actual or apparent rotation rates of the wheels must be determined in the process; and in the means for such determination. The first embodiment operates off-line on recorded video, is human-operated and machine executed, and its end product is another recorded video. The second embodiment, which is also the currently preferred embodiment, implements a similar process but operates in real time as an automated process, and is intended to operate in-line on videos being streamed to viewers. Third and fourth embodiments implement variations of the first and second embodiments which principally allow them to recognize, operate on, and successfully implement appropriate image substitution for videos in which more than one wheel is visible in any frame or that include in any frame more than one vehicle whose wheels need image modification or both, and thus achieve the same ends. The fourth embodiment also implements wheel and vehicle tracking and modification processes that operate in a number of channels in parallel on the vehicle wheels rather than in series, reducing the time lags that are introduced into the process by its operation into streaming a modified video. All embodiments result in modified video in which the wheels of the vehicles appear to rotate at the correct rates for all actual vehicle speeds when the video is viewed in the displays.

It is important to note that many of the process steps of each of the embodiments utilize computer software, or programs, with specific functionality to perform specific actions. It is understood that there exist and are in common use a number of software products, running on special or general purpose computation machinery that can perform some if not most, and perhaps all, of the necessary functions and operations called for by the various steps of the process to be described. However if existing software is insufficient, requires augmentation, or some new software would be desirable such software is relatively simple and could be readily written and coded by people normally skilled in those arts, since most of the process steps are relatively straightforward and uncomplicated compared to the extreme sophistication and complexity found in software today. In addition existing, modified, or new or different software may be needed to harmonize the operation of existing software to best interact with the operator, or for the operator to interact with the computer, and could also easily be programmed by persons normally skilled in the art.

All these existing, modified, or new software products and the choice of actual software programs, codes, or routines, and the algorithms used therein, individually or collectively, are generically referred to as software means hereinafter. The overall functions of the software means called for in this embodiment are described but not specified in detail because a number of different such means might function equally well. Neither are their source code or other coding details described as any programmer with reasonable skills in the art could readily generate them, or modify existing programs to the same end; and the very existence of many such examples is proof that that is the case. Thus these software products or means are not claimed as new. What is new and is claimed is their particular use to attain the highly desirable and useful end result, which is unforeseen in prior art.

It is understood in the above definition that software is a collection of instructions, algorithms, data, and programs that tell computing machine hardware elements what to do, how to do it, and when to do it whether the hardware elements are logic elements, switching elements, calculation elements, memory elements, computing elements, mathematical elements, geometrical elements, reading elements, recording elements, display driving elements, or other hardware. Thus all of the non-human functions described are machine hardware elements operating under the instructions and commands of software or humans or both, and are not mere written lists or abstract thoughts. All human functions, whether using observational, judgmental, manipulative, calculating, or decision skills, always result in action commands or actions that are executed by the computer (the machine). It is further intended and understood that the word "human" and the word "operator" and their plurals are interchangeable.

A large number of feature or pattern recognition, feature designation, motion tracking, feature manipulation, and object extraction and insertion software products exist and are in general use for manipulating images in many applications of still and video image generation and processing. These are commonly used to identify billboards or signs in scenes and to replace them with other billboards or signs featuring different text or content, generally for the purpose of advertising, but have many other uses for image modification in still and video media and other functions. An even greater number of software products exist are in common use for recognizing, extracting, or tracking images of faces or other objects in still or moving picture media, and are ubiquitous in photograph and video cameras, both for amateur and professional use. Such techniques can operate in real time or in delayed presentation, and some of these techniques were the subject of the patents cited as prior art.

In addition, a number of other software techniques also exist that break down an image into basic components and rearrange them at will to construct new images from them, or generate new images possessing some of the desired features of the original ones. Still others exist that are used to draw multiple images in electronic media that are incrementally and progressively changed so that when assembled into a medium allowing rapid sequential presentation such as a video or a movie they create moving and changing characters or scenes generically designated as animated films. A number of some software-based techniques also allow changing the aspect from which an object or scene is viewed or its perspective, and some also have the ability to manipulate such images creatively. This latter is commonly done in so-called "morphing" of images from one form to another in video, as well as in creating new subject matter for animated video presentation including cartoons and combinations of animated and real objects and beings.

The following is a tabulation of a number of examples of prior art or commercially available products which illustrate some specific techniques for implementing a number of software-based techniques that could be applied to some of the functions identified in this embodiment. These techniques include image recognition, tracking, and/or manipulation software, frame freezing or "grabbing" and selection software, image rotation and/or scaling software, measuring software, and others. While the specific examples listed below do not address the objectives and purpose or principal teachings of this application, they serve as easily accessed illustrations that the software art is well developed that can contribute to or perform specific functions as described in the process flow of the embodiments, whether using the specific techniques described or developing new techniques best suited to the identified tasks. These examples also serve as illustrations that very many persons normally skilled in the art of conceiving, designing, coding, verifying, and operating such software products exist. Thus all embodiments will refer to this example list whenever a software approach or program is discussed for implementing functions of the described processes.

This list includes,
For image recognition, feature tracking, and manipulation: US2006/0115113A-1, Jun. 1, 2006; US2009/0141940A1, Jun. 4, 2009; U.S. Pat. No. 3,264,993; US2001/0031067 A-1, Oct. 18, 2001; US 2011/0115945 A-1, May 19, 2011; US2006/0170769 A-1, Aug. 3, 2006; U.S. Pat. No. 7,983,448 B-1, Jul. 19, 2011; U.S. Pat. No. 7,454,037 B-2, Nov. 18, 2008; US 2005/0275723 A-1 Dec. 15, 2005; U.S. Pat. No. 6,363,160 B-1, Mar. 26, 2002;

For frame freezing or "grabbing", selection, image rotation, and/or scaling, insertion: U.S. Pat. No. 5,229,852 Jul. 20, 1993; U.S. Pat. No. 6,253,238 B1, Jun. 26, 2001; U.S. Pat. No. 5,808,695; U.S. Pat. No. 6,317,165 B1, Nov. 13, 2001; U.S. Pat. No. 5,109,278, Apr. 28, 1992; U.S. Pat. No. 5,568,600, Oct. 22, 1996; U.S. Pat. No. 7,113,194 B2, Sep. 26, 2006. For measuring of angles and distances, and coordinate transformation, image rotation, or image transformation: Some elements similar to software commonly used in computer-aided drawing programs such as Turbo CAD (www.turbocad.com); PAXIT (www.paxit.com/paxit/measurement.asp); or Boeckeler (www.boeckeler.com/cms/index.cfm/path/17933/87457/); or in public presentation and drawing programs such as Open Office Impress or Open Office Draw (www.openoffice.org)

In addition many programs that would be applicable to a number of aspects of the software tasks envisioned in these embodiments are freely available from sources such as http://sourceforge.net, http://opensourcewindows.org, http://www.sagemath.org, http://directory.fsf.org, http://www.o-salt.com, and many others.

Throughout all the embodiments the term "video" or "video media" or "video images" will be used, without limitation, to indicate moving image information-containing devices including those in electronic form such as solid state memory and those in physical form such as compact discs, video cassettes, and digital video discs. Throughout all the embodiments "displays" and "display devices" will be used to indicate moving image presentation and viewing devices including television, movies, screens, computers, cellphones, tablets, and other devices that facilitate or can display such videos. Throughout all the embodiments the term "wheel assembly" and its plural will generally be used whenever the discussion pertains to a vehicle wheel including its mounted tire, as well as their plural. The term "wheel" or its plural will generally be used when addressing strictly the metal wheel component or components of a wheel assembly or its plural, which may or may not also include metal or plastic covers or plates with decorative features, but generally do not include a tire.

Nonetheless, it must be recognized that the term "wheel" and its plural are commonly used in ordinary speech to refer interchangeably to the "wheel assembly" and its plural, and thus such references in this application may be inferred to be either, or the singular or the plural, as best indicated by the context of the text within which they are found. Furthermore, while the embodiments generally refer to a single wheel or wheel assembly when describing actions or functions, those same actions or functions could also apply to multiple wheels or wheel assemblies on a vehicle, without prejudice, unless specifically identified otherwise. In addition the spokes of typical wheels, which play a central role in the embodiments, are in some cases not structural but implemented in decorative wheel covers. The embodiments will henceforth refer only to "spokes" which should be inferred as applying to either structural spokes or distinct areas in wheels or in decorative wheel covers, interchangeably, so long as they are regularly spaced in angle centered at the wheel center around the wheel periphery.

Throughout the discussion of the embodiments reference is made to the frame rate of a video. In these embodiments this refers to the time between image sequences in the video, and is used generically, without limitation to interlace scan systems, progressive scan systems, analog or digital systems, or other formats for capturing, recording, memorizing, or displaying videos. While a number of examples use 60 frames per second to illustrate the implementation of the embodiments, the embodiments operate as well and are as valid for other rates or other definitions of frame rate.

Furthermore, throughout the discussion whenever "stores" or "stores in memory" is described associated with a function it is understood that the memory is actually a part of the computer, whether centralized or distributed. In addition, whenever the discussion refers to a function performing some action, that action is understood to mean that the computer performs that action, rather than some specialized additional hardware, whether the computer physically consists of one unit or several separate units. Additionally when discussing the process flow the word "step" and "function" and their plurals are used interchangeably and their meanings are intended to be the same.

BRIEF DESCRIPTION OF ALL THE DRAWINGS

FIG. 9 is a table that shows the orders of the generated aliasing as a function of the number of spokes in a wheel, as expressed by the true rotation rate in revolutions per second at FIG. 10 is a true/apparent rotation rate graph on which has been plotted the highest order alias line that can result from different number of spokes in a wheel at a video frame rate of 60

Figure 10:
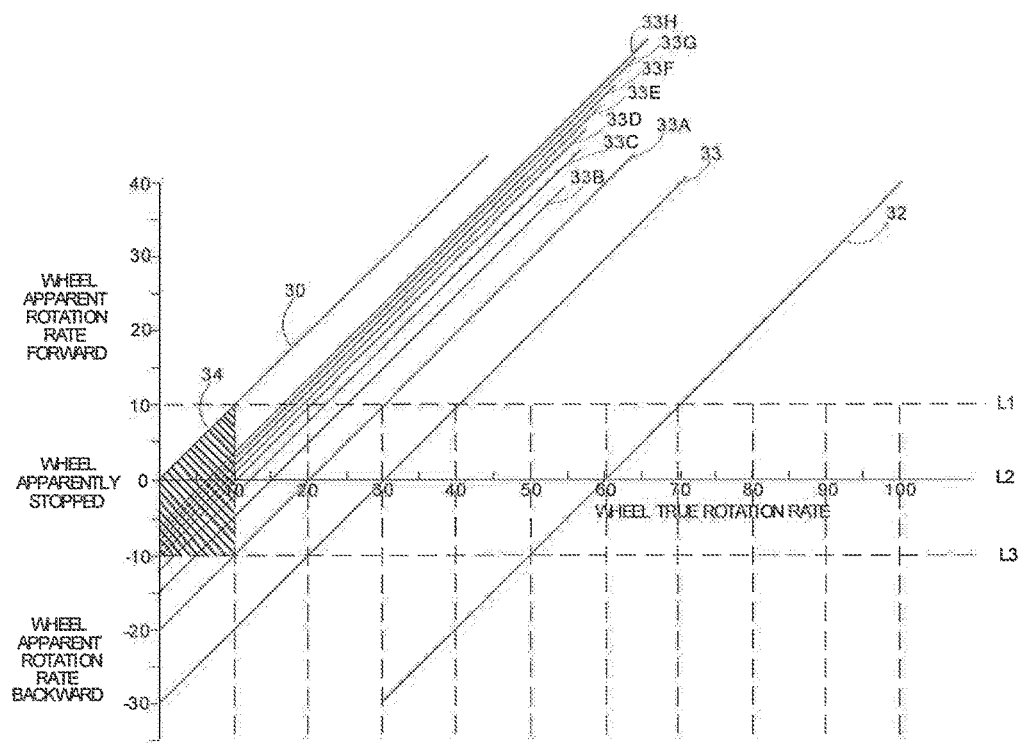
Figure 11:
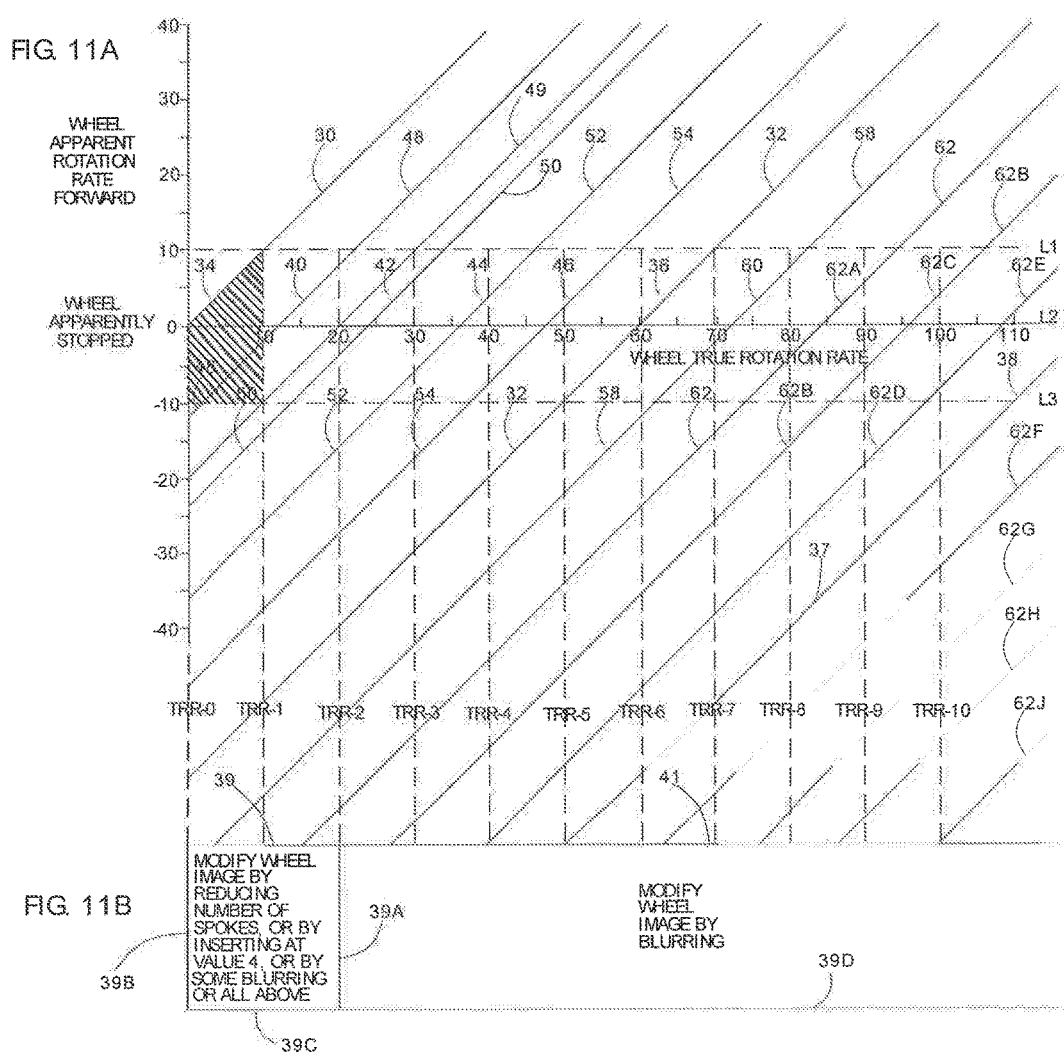

FIGS. 11A-B show the true rotation rates of the wheels of FIG. 10 at which the wheel images must be modified in order to avoid aliasing or false rotation rate perception; and the type of modification that will be imposed as driven by the Principal Algorithm.

Figure 12:
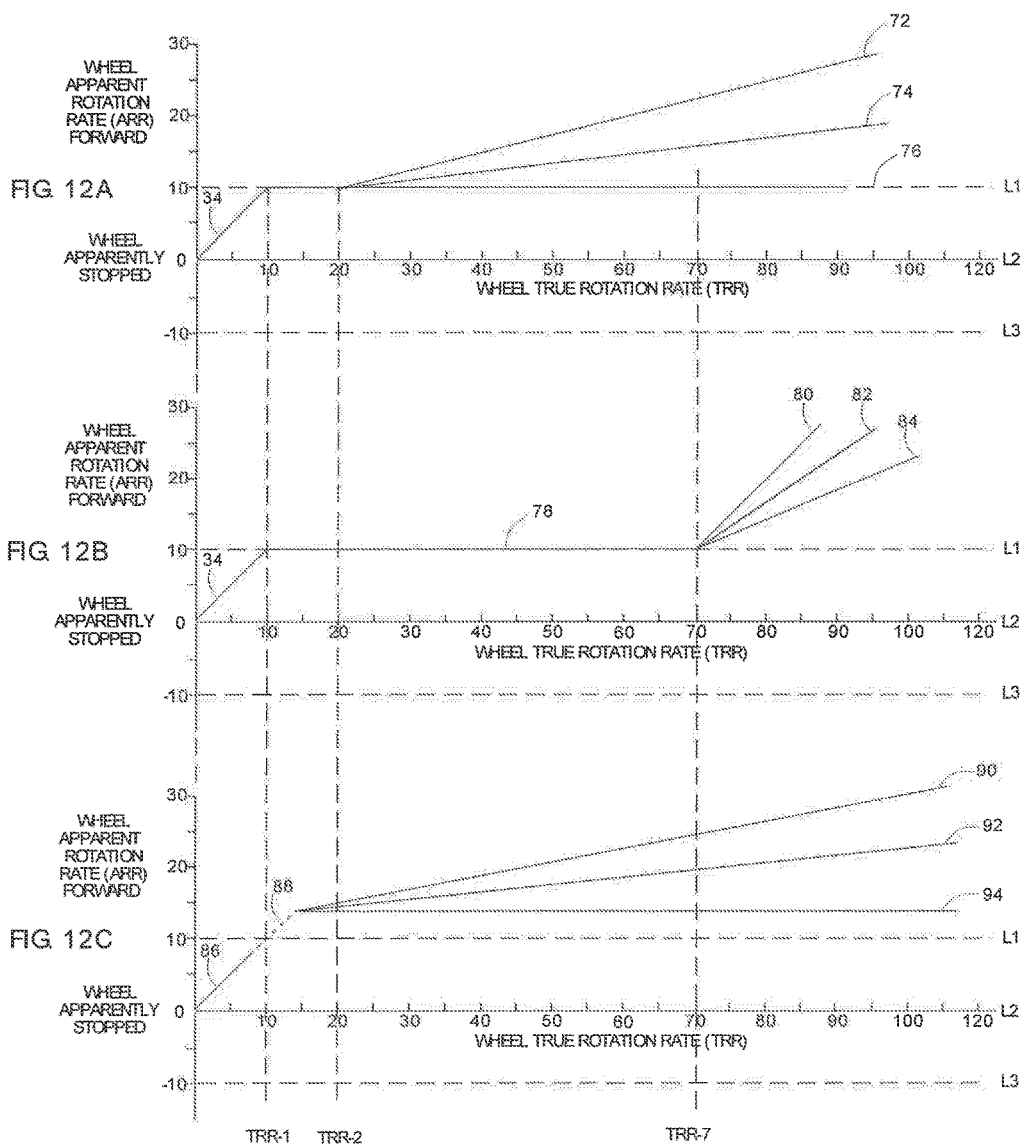
Figure 13:
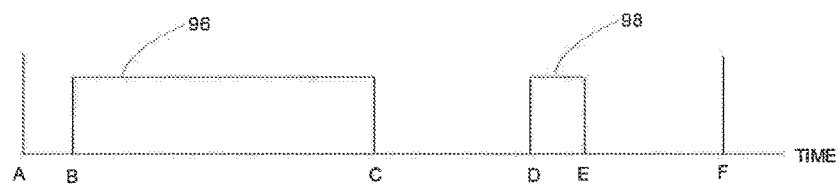

FIGS. 12A-C show a number of blurring strategies that can be used to maximize the effect of the wheel modifications which call for image blurring FIG. 13 illustrates the appearance and disappearance of vehicles in a video as a function of time.

Figure 14:
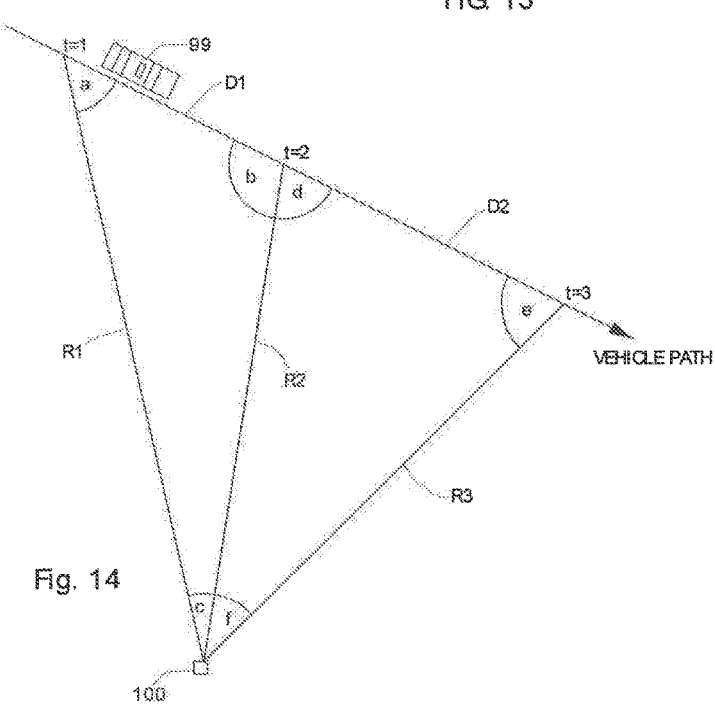

FIG. 14 is a plan view of the geometry of a typical vehicle and video camera.

Figure 15:
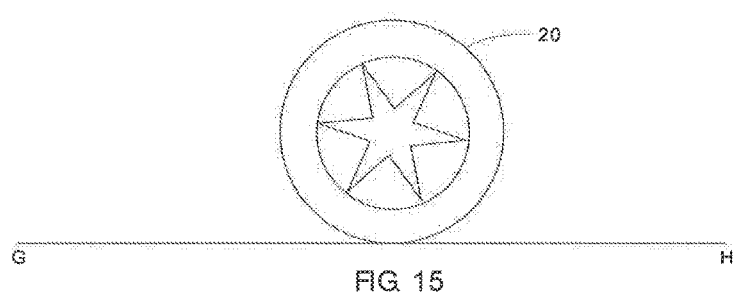

FIG. 15 is a side view of a moving wheel assembly.

FIGS. 16A-16F illustrate a means used to determine vehicle average speed as a function of time.

FIGS. 17-20 are algorithmic flow diagrams that illustrate the process of the first embodiment FIGS. 21 A-L illustrate a sequence of video images of the same wheel assembly as shown in FIGS. 3A through 3L but now with correct apparent rotation rate as a result of operation of the embodiment.

Figure 23:
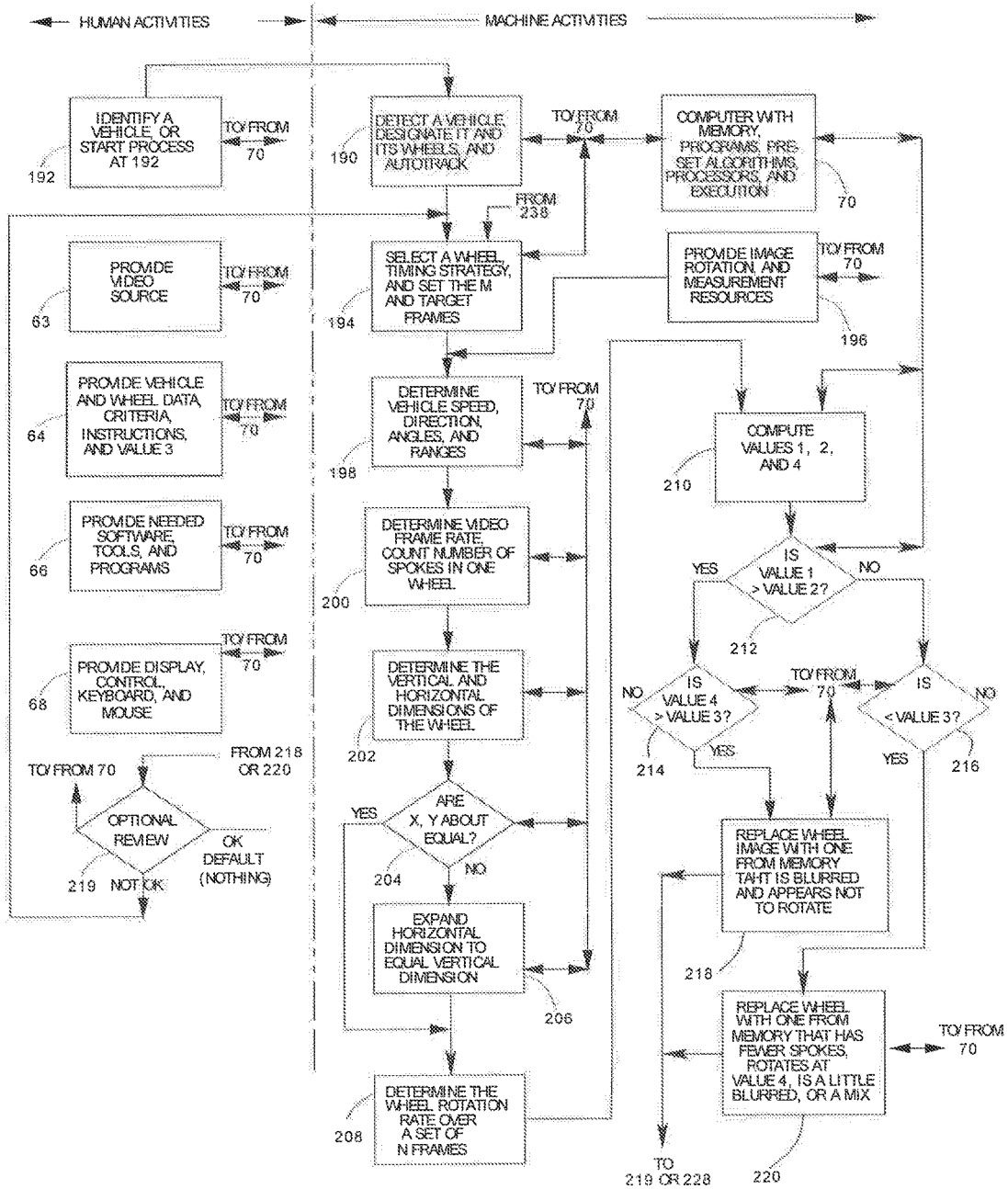
Figure 24:
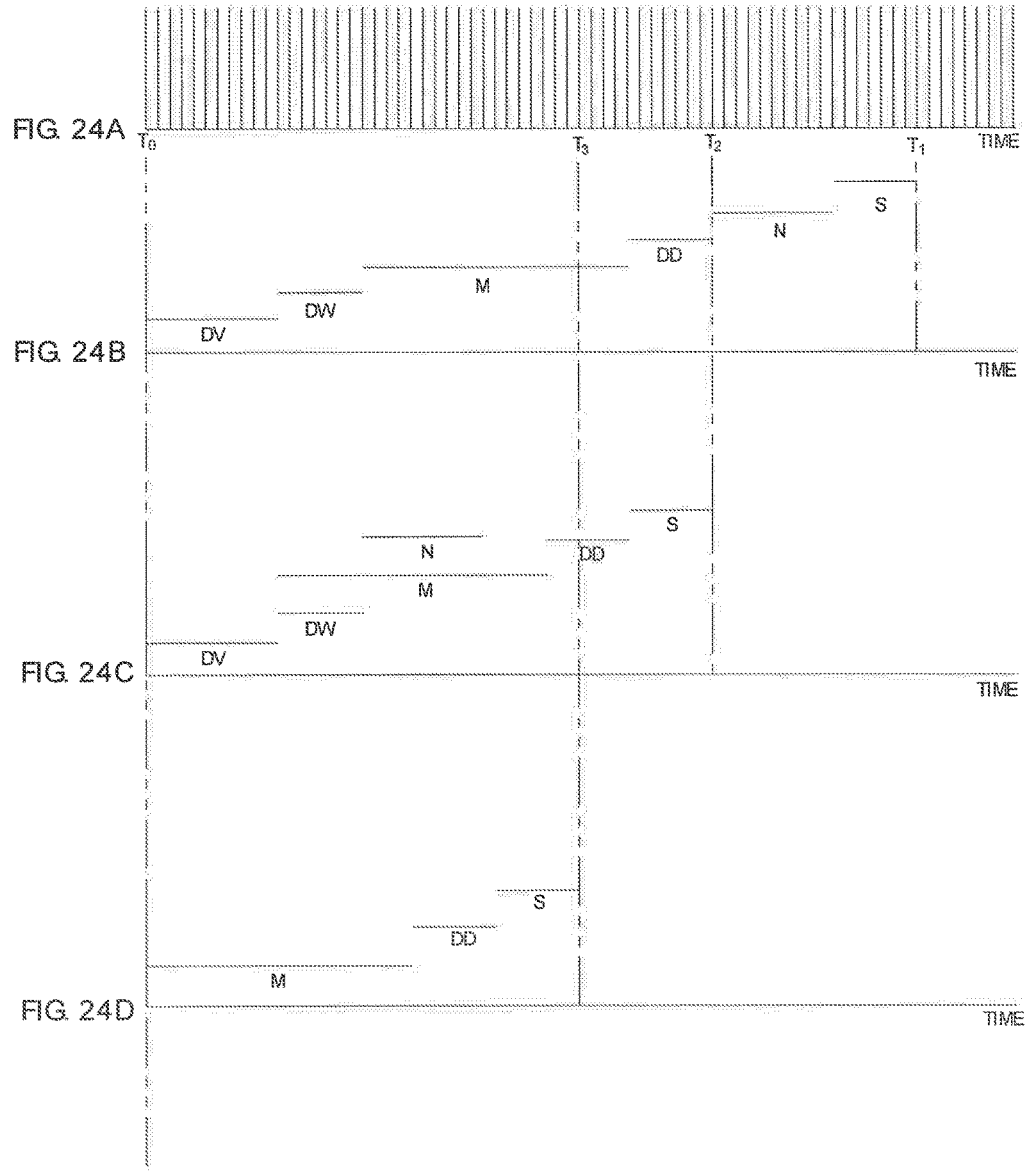
Figure 25:
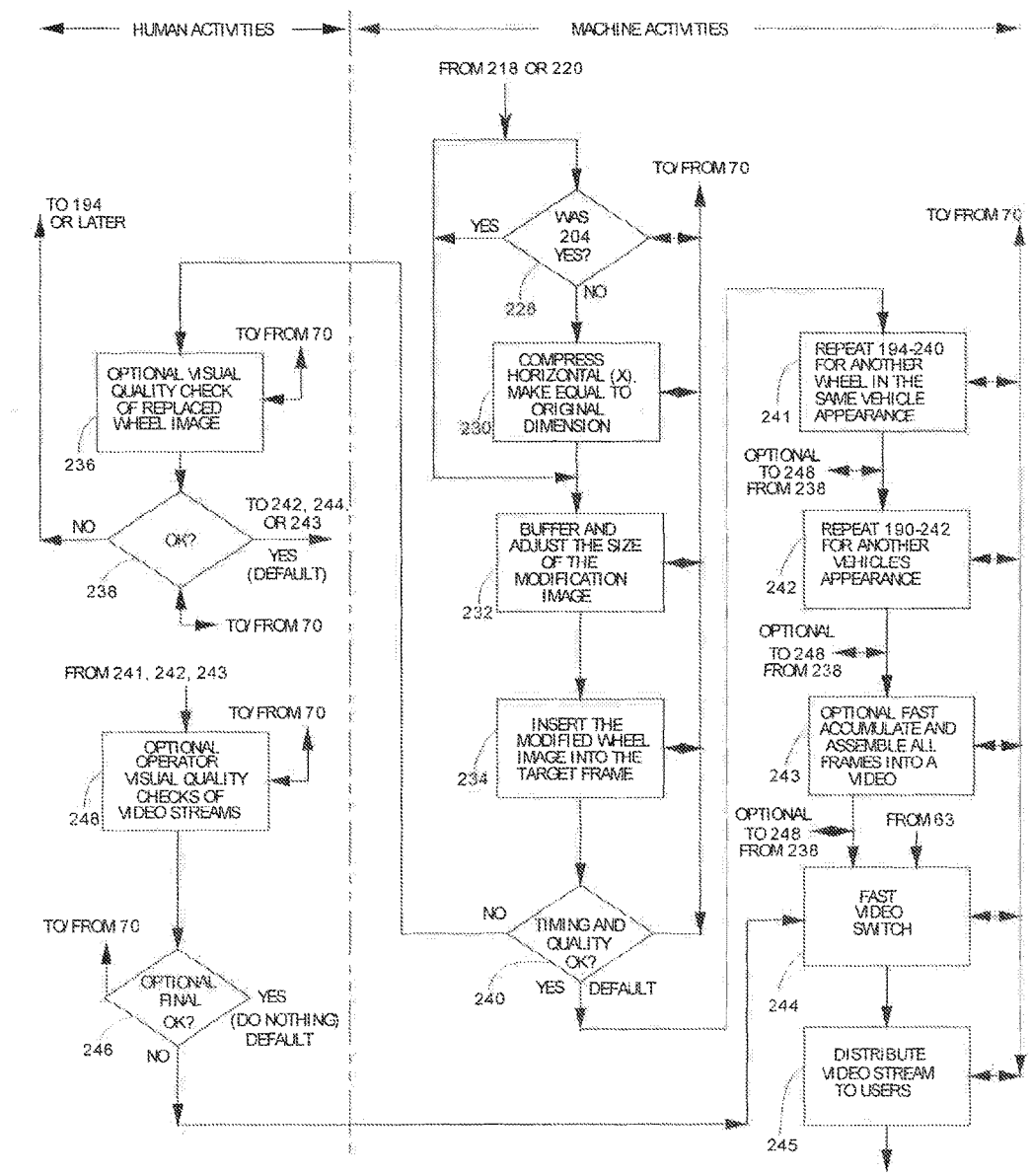
Figure 30:
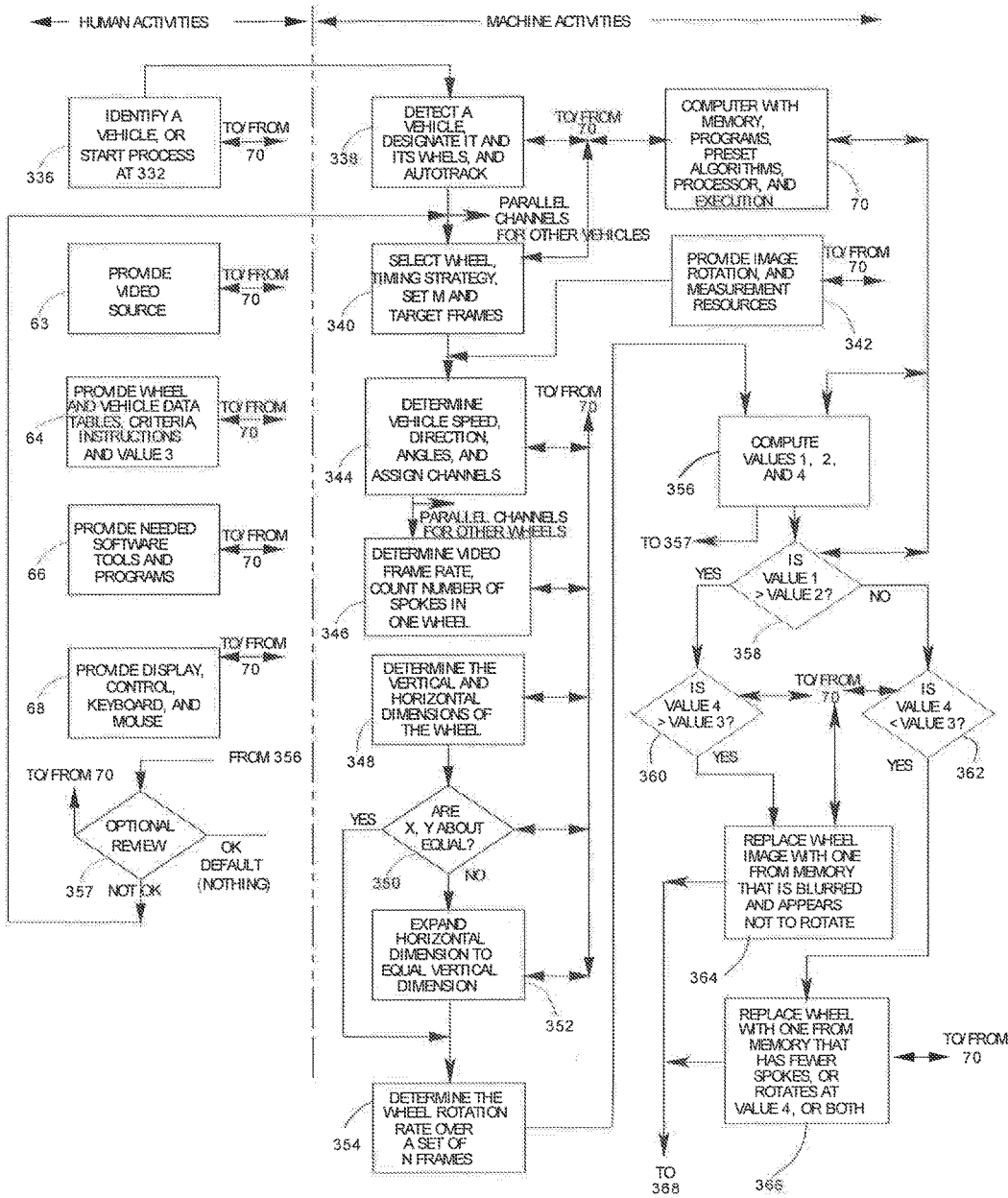
Figure 31:
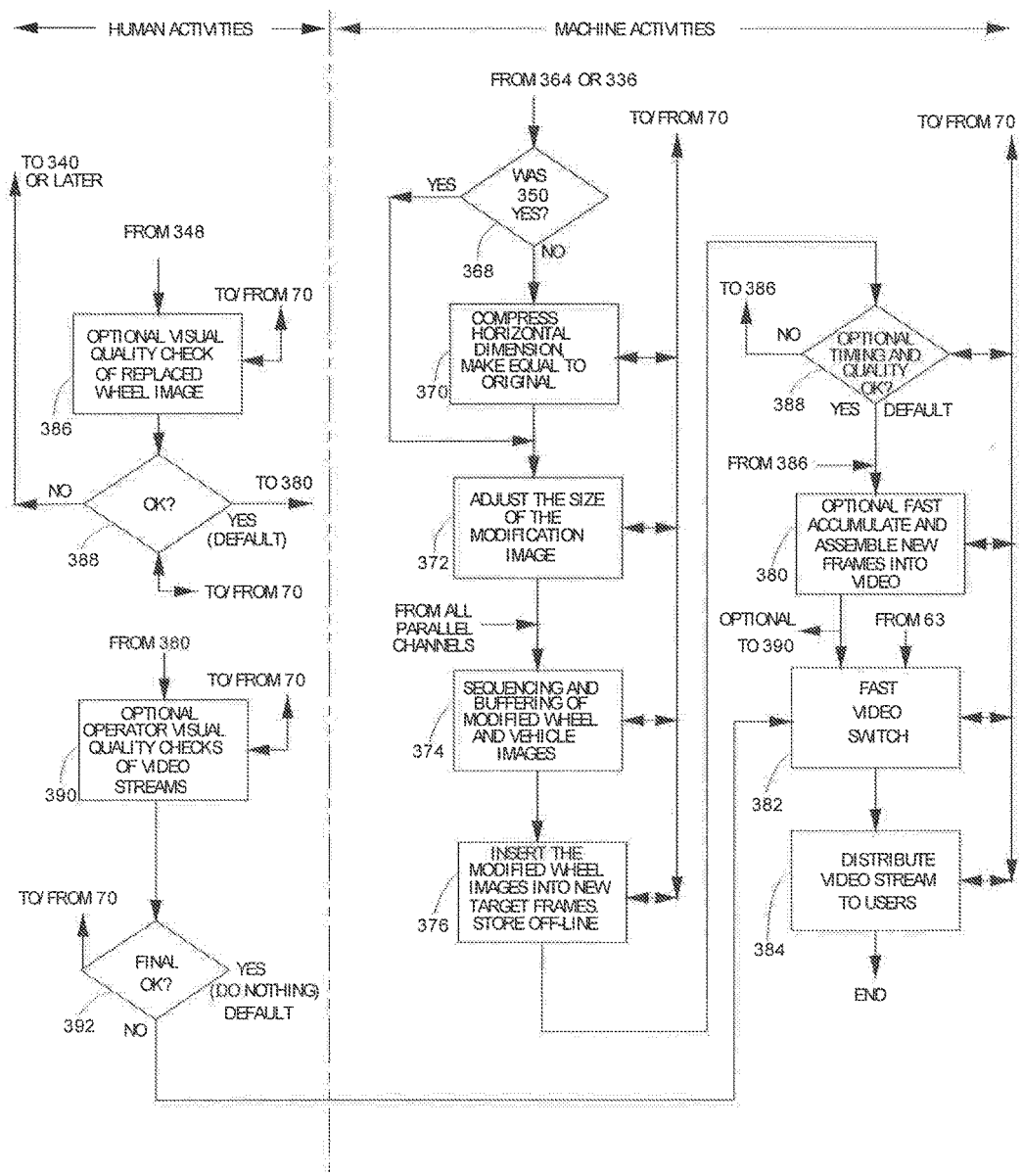

FIGS. 22A-F show the effect of blurring the spokes or distinct areas in a wheel FIGS. 23 and 25 are algorithmic flow diagrams that illustrate the process of the second (and currently preferred) embodiment FIGS. 24A-D depict a timing sequence of typical wheel appearances in a video FIGS. 26-29 are algorithmic flow diagrams that illustrate the process of the third embodiment FIGS. 30-31 are algorithmic flow diagrams that illustrate the process of the fourth embodiment

DETAILED DESCRIPTION OF THE FIRST EMBODIMENT

Figures in this embodiment: FIGS. 1-20. Identifying numbers of lines, features, and process steps. Only process equipment and functional steps are shown in bold.

10 Vehicle
20 Wheel assembly
21 Wheel assembly including imaginary mark
22 Tire
23 Imaginary mark on wheel assembly
24 Rim of wheel
25 Imaginary vertical reference line
26 Inner surface of rim of wheel
28 Spokes of wheel
29 Hub supporting wheel
30 Relation between actual and apparent wheel rotation rate as a vehicle accelerates from being stopped or decelerates to a stop
32 Relation between actual and apparent wheel rotation rates around synchronism with the frame rate
34 Portion of line 30 in which the wheel rotation is detectable by eye
36 Portion of line 32 in which the wheel rotation is detectable by eye
37 Relation between actual and apparent wheel rotation rates around the first super-synchronous rotation with lines and line portions 40, 48, 42, 50, 44, 52, 46, 54, 60, 58, 60, 62, 62A, 62B, 62C, 62D, 62E, 62F, 62G, 62H, 62J of the true and perceived (aliased) rotation rates of a wheel as caused by a wheel with 5 spokes
48 True vs. apparent rotation rates of a wheel or its alias which would cause visibly false rotation
49 True vs. apparent rotation rates of a wheel or its alias which would just barely not cause visibly false rotation
50 True vs. apparent rotation rates of a wheel or its alias which would not cause visibly false rotation
33A-H Highest order aliasing that would be caused by wheels with increasingly larger number of spokes
39-41 Lines that define the true rotation rates that must be corrected be the Principal Algorithm in order to avoid visibly false rotation
72-94 lines that define a number of different strategies for applying blurring to a wheel
63 Source of video
64 Provision of vehicle and wheels data tables, graphs, data, instructions, and assessment and decision criteria
66 Provision of the needed software tools, programs, and manuals
68 Provision of displays, controls, mice, keyboards, and plotting aids for operator
70 General Purpose or Special Purpose Computer with memory, logic, and processors, and specific software programs responsive to specific algorithms and commands
L1 Value of the average maximum human motion perception limit in the forward direction
L2 The axis of zero human motion perception, coinciding with zero apparent rotation rates of a wheel
L3 Value of the average maximum human motion perception limit in the backwards direction
86 Truncated portion of 34
88 Extended portion of 34
96 First vehicle appearance in the video
98 Second vehicle appearance in the video
99 Likeness of vehicle
100 Video camera
102 First average wheel rotation rate
104-113 Average wheel rotation rate points
114 Piecewise linear vehicle speed curve as a function of time
116 Smoothed vehicle average speed curve as a function of time
118 Derived actual wheel actual Rotation rate as a function of time
120 Identification, choice, and designation of a vehicle's appearance in the video, and wheels
124 Auto-tracking the vehicle, wheels, and supplying images
126 Setting M frames, determining vehicle speed, direction, angles
128 Provision of image rotation, coordinate transformation, and measuring aids
130 Selecting a wheel and determination of the wheel and wheel assembly dimensions, angles
132 Determination of the wheel average actual rotation rate for the M frames, and storing
133 Optional decision function regarding the accuracy of the measurements
134 Decision function on whether the wheel horizontal and vertical dimensions are alike
136 Expansion of the horizontal wheel dimension if required, to match the vertical
138 Counting the number of spokes or regular decorative features in a wheel
140 Command to display the choices of actual rotation rate/apparent rotation rate graphs
141 Retrieving and displaying the choices of actual rotation rate/apparent rotation rate graphs
142 Choosing the most appropriate actual rotation rate/apparent rotation rate graph for the video's parameters
143 Computing the prime algorithm's 4 Principal Values
144 Decision on the magnitude of Value 1 vs. Value 2
145 Decision on the magnitude of Value 3 vs. Value 4
146 Decision on the magnitude of Value 4 vs. Value 3
147 Replacement of wheel image with a blurred one
148 Replacement of a wheel image with one having fewer spokes or blurred or both
149 Preparation of modified wheel images
154 Selection of modified wheel images
156 Acceptance of selected wheel images
158 Compression of the horizontal wheel dimension back to its original value
160 Command to 70 to step through the frames of the actual rotation rate range and insert the images 162 Insertion of the modified images into the video frames of the selected wheel and range
164 Command to collect the modified frames into a temporary video
166 Preparation of a temporary video of the modified actual rotation rate time range
168 Observing the modified video
170 Decision function on quality of the video
172 Repetition of steps 150-170 one time
174 Choosing a different actual rotation rate time range to modify
176 Repetition of steps 150-178 for all frames in new time range, and storing the data
178 Choosing a different wheel of the same vehicle appearance
180 Repetition of steps 132-178 for all frames in the time range, and storing the data
182 Choosing a different vehicle appearance
184 Repetition of steps 120-182 for another vehicle
185 Accumulation of all modified and unmodified frames into a new video
186 Displaying the new video for the operator's quality check
187 Decision function on quality of the final video
188 Making a recording of the new video and its distribution to media This embodiment envisions a process that relies substantially on the operator and his perception and skills, and is human controlled. However, every human function results in a command to the machine which then executes the command. The machine is comprised of a specific computer running specific software, algorithms, and instructions; and related input-output devices. The machine aids the operator by providing information and displays, making calculations and operations whether requested by the operator or self-determined, keeping track of the current step in the process with respect to all the steps of the process, and executing the operator's commands. This embodiment corrects rotation rate of the wheel images of vehicles in a video which are or would be perceived in user displays as being inappropriate in direction of rotation or rotation rate or both for the actual vehicle speed, following a number of specific algorithms and a Principal Algorithm for making the decisions to modify or not to modify the wheel images, and the nature of the replacement images to use. The implementation of this Algorithm will result in wheel images whose apparent rotation is always appropriate for the actual vehicle speeds.

This embodiment is further oriented toward off-line functioning, such as processing a video recorded in electronic memory or in hardware form such as disc or tape, to correct inappropriate apparent wheel rotations in one or more vehicles appearing therein, and whose end product is another recorded video but with wheel rotations that appear appropriate for the vehicle speed throughout the video. This embodiment thus allows all steps and operations to be performed at leisure, and performed multiple times if necessary until the results are satisfactory, since the results of the embodiment are simply a corrected recorded video to be played later. This embodiment addresses serially the wheels of a vehicle and those of multiple vehicles in a video. The masculine gender will be used to refer to the human operator in all embodiments, recognizing that it is being done without any prejudice to or against female gender operators, but only for the sake of brevity.

The description and operation of this embodiment is shown in FIGS. 5, 6A-6F, 7, 8, 9, 10, 11A-B, 12A-C, 13-15, 16A-F, and 17-20. References in the description will be made to functional blocks or steps or activities contained in the flow diagrams of the following figures, and such references will be shown in bold numerals without further identification. The process descriptions are in FIGS. 17, 18, 19, and 20, and clearly identify all the process steps envisioned, as well as those functions and operations which are envisioned as performed by humans and executed by the computer versus those envisioned to be performed purely by the computer in this embodiment.

This embodiment is designed to replace images of vehicle wheels in frames within a video, television, movie, computer, or other display which appear to rotate at speeds inappropriate to the vehicle speed. Since human viewers' eyes (and brain) generally do not perceive motion if presented at repetition rates greater than about 10-15 times per second, blending or blurring all images above some such repetition rates, the modification of the video media images to be recorded or modification of the video data stream need only occur at those times when the apparent rotation rate of the wheels is both inappropriate and perceivable by eye as it is also below such a rotational rate.

In this embodiment the process of modifying the inappropriate wheel apparent rotation rate requires that the video frame rate, the actual number of spokes and actual rotation rates of the wheels of a moving vehicle, or the velocity of the vehicle and the outside diameter of the tires of the wheels, be determined for a number of instants of time throughout the appearance of a vehicle in a video. Since the relationship between the actual and apparent (aliased) rotational rates under stroboscopic viewing is well known and dependent principally on the number of spokes in the wheel, its rotational rate, and the video frame rate, wheel images with rotation rates or number of spokes or other image changes appropriate for the vehicle speed at any time, or images blurred so as to appear to rotate at too high a rotation rate to be discerned, can be substituted for the inappropriate wheel images, resulting in a modified video with all wheel rotation rates appearing appropriate at all times regardless of vehicle speed, wheel diameter, number of spokes, or video frame rate.

Figure 1:
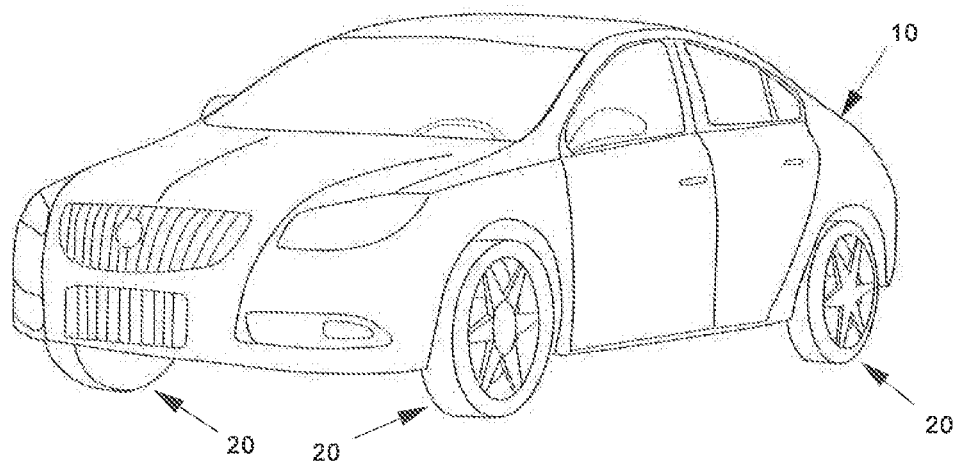
FIG. 1 illustrates a typical wheeled vehicle with its typical spoked wheels.
Figure 2:
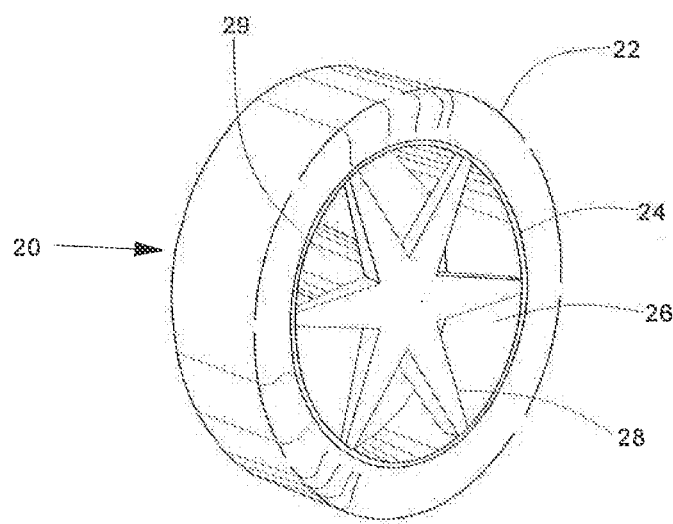
FIG. 2 illustrates a wheel assembly and parts thereof.
Figures 3A, 3B, 3C, 3D, 3E, 3F:
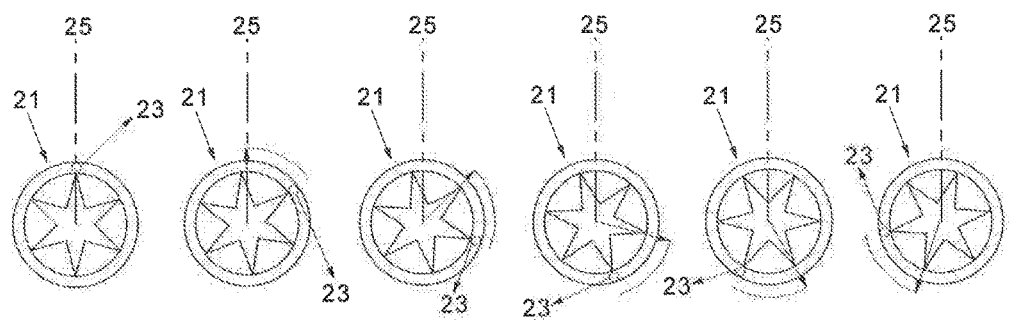
FIGS. 3A through 3L illustrate a typical sequence of images of a wheel assembly taken one video frame apart, showing its inappropriate apparently backward rotation rate.
Figures 3G, 3H, 3I, 3J, 3K, 3L:
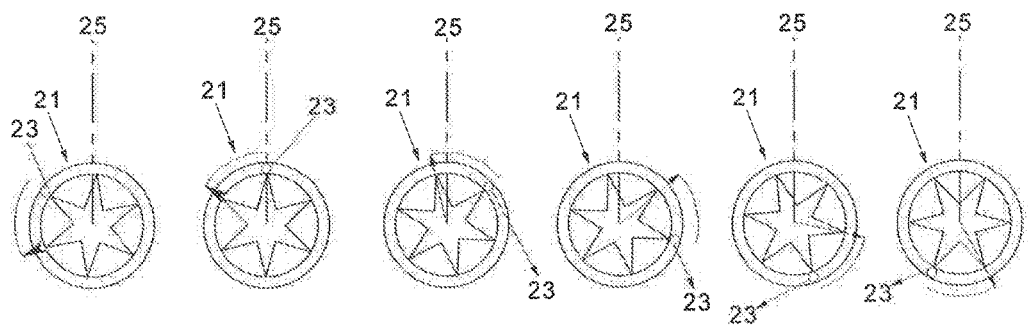
Figures 4A, 4B, 4C, 4D, 4E, 4F:
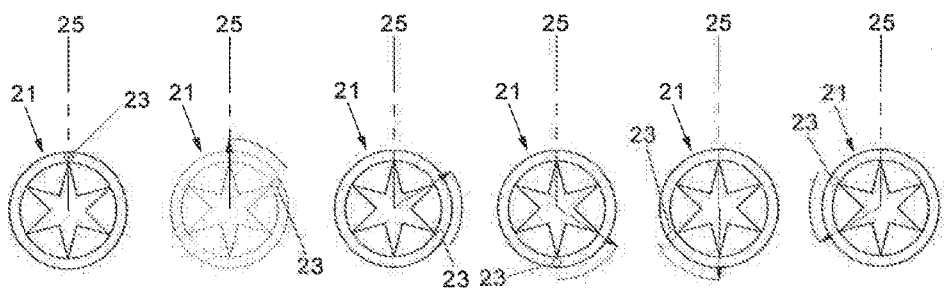
FIGS. 4A through 4L illustrate a different sequence of video images of the same wheel assembly rotating at a different rate, showing its inappropriate apparently stopped rotation rate.
Figures 4G, 4H, 4I, 4J, 4K, 4L:
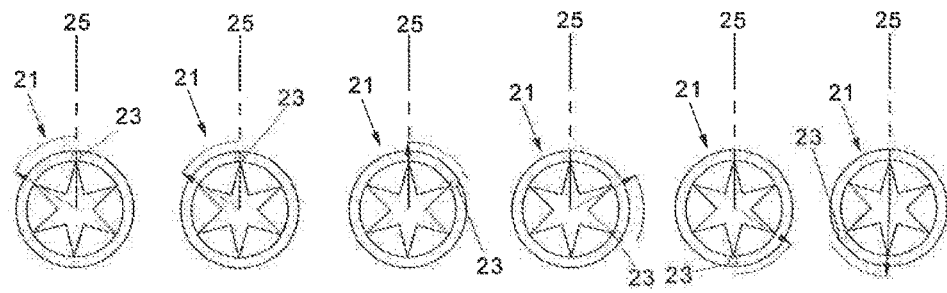
Figure 5:
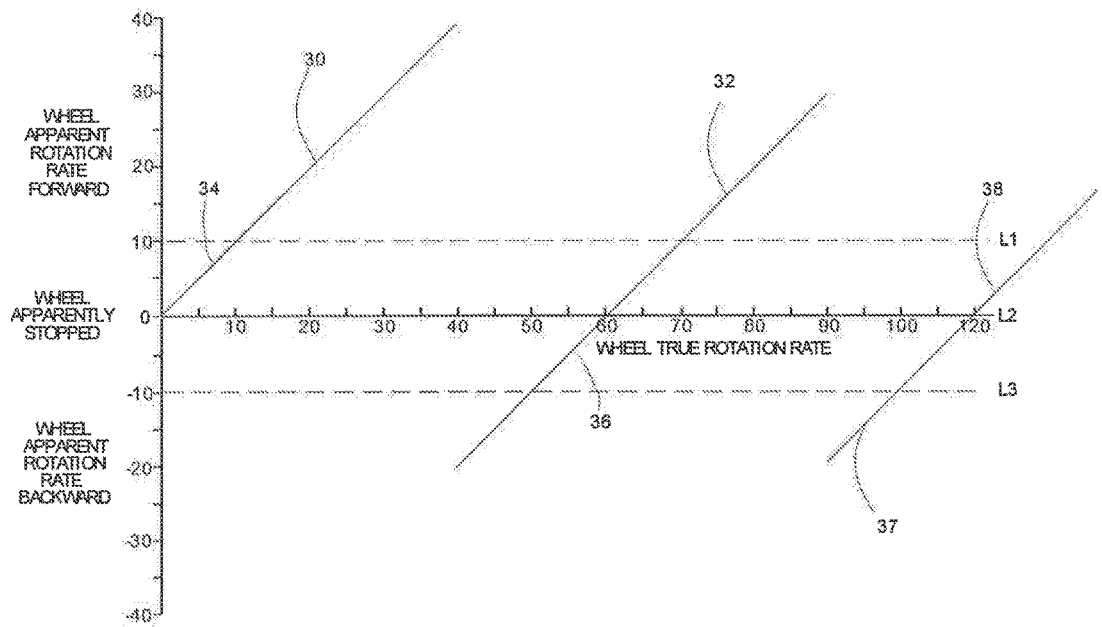
FIG. 5 is a simplified illustration of the relationship between true and apparent rotation rate of the wheels of a moving vehicle, known as the apparent/true wheel rotation graph, and the rotation rates at which such rotation is perceived by the human eye, or too fast to so perceived.

This process is illustrated in a series of figures beginning with FIG. 5, which is a simplified plot to illustrate the principles of stroboscopic wheel rotation imaging. Referring to this figure the line 30 describes the wheel apparent rotation rate in revolutions per second for actual rotational rates of up to about 40 revolutions per second or so. The wheel is seen to be rotating at the same rate and in the same direction as the actual rotation rate, as measured by the value of the apparent rotation rate in revolutions per second, with a one-to-one relationship between the apparent rotation rate and the actual rotation rate as shown by line segment 34. FIG. 5 also shows three lines of constant apparent rotation rate, labeled L1, L2, and L3. L2 is the line where the apparent rotation rate is zero—that is when the wheels are perceived to be standing still. L1 is the line of constant forward apparent rotation rate shown at a level of 10 revolutions per second, in this example, below about which the wheel rotation is perceived as such and above about which the wheel is perceived as only a blur, without any rotation being detected. L3 is the line of constant negative, or backward wheel rotation, above which in a negative direction the rotation is blurred and not detectable by eye.

As an example, if a vehicle accelerates from standstill the wheel rotation proceeds along line 34 and is perceived as appropriate until it becomes a blur above a actual rotation rate of about 10 revolutions per second because the apparent rotation rate is above the blur threshold. As the vehicle continues accelerating, in this example, the apparent rotation rate continues to increase and not be detectable by eye until the actual rotation rate approaches about 50 revolutions per second, at which time the line 32 and 36 become dominant and the apparent rotation rate is seen to become negative, that is the wheel is perceived to be rotating backward at about minus 10 revolutions per second or less, which occurs after the actual rotation rate exceeds about 50 revolutions per second. The lines 32 and 36 are straight lines with slope of one-to-one, as were 30 and 34, and are based on the frame rate of the video being assumed to be 60 frames per second, which results in the wheel being apparently stopped when the actual rotation rate becomes exactly equal to the frame rate, which is then exactly 60 revolutions per second. This is because at that actual rotation rate the images are presented at the same rate as the wheel is rotating, and so the image is always captured at exactly the same rotational position of the wheel regardless of its number of spokes or decorative features. Since most spokes or features in wheels are regularly spaced circumferentially around the wheel, the result will be that the spokes will exactly repeat and the wheel will all appear as though it is at standstill. That is the stroboscopic effect at synchronism.

As the vehicle actual rotation rate increases further past the synchronous 60 revolutions per second rate the apparent rotation rate increases in the proper rotational direction, but at improperly slow rotational rates as though it rotated below about 10 revolutions per second since the actual rotation rate is above the rate for which rotation can be detected by eye. Once the actual rotation rate exceeds about 70 revolutions per second the rotation again becomes a blur and is undetectable by eye. This slowing, standing still, and reversal of apparent motion at inappropriate rotation rates and vehicle speeds is the heart of the problem which is being addressed by this embodiment. The stroboscopic effect thus produces inappropriate slowly backward-rotating apparent rotation rate, inappropriate standstill, and inappropriate slowly forward-rotating apparent rotation rates, all occurring at inappropriate actual rotation rates.

While the apparent rotation rate may be inappropriate at many values of actual rotation rate, it is only noticeable by eye during the actual rotation rate intervals described by lines 34 and 36, and by also by line 38 for rotational rates above synchronism. Thus it is a purpose of this embodiment to modify the apparent rotation rate during the times that the actual rotation rate of the vehicle wheels coincides with lines 34, 36, and 38 and other higher super-synchronism rates so as to cause the apparent rotation rate to become perceived as appropriate for the respective vehicle speed at those times.

The picture of the situation described by FIG. 5 is different for different frame rates that may be used by the video. For example a video frame rate of 30 frames per second will have the synchronous point at a actual rotation rate of 30 revolutions per second. Since the actual rotation rate at the synchronous point will always equal the frame rate, the wheel apparent rotation rate will be perceived as zero at that point. Therefore the horizontal axis of FIG. 5 could be replaced by a differently calibrated axis to correspond to a different frame rate. The slope of the lines 30, 32, 36, 37 and 38 will still be unity, and so the calibration marks on both the horizontal and vertical axes would have to be expanded by a factor of two to accommodate such a frame rate change, and the presentation. However, the levels L1 and L3 will still occur at about plus 10 and minus 10 revolutions per second because the human motion perception limits do not change appreciably with video frame rate changes alone.

It is to be emphasized that the blur limit of the eye-brain of typical viewers generally varies between about 5 and 15 revolutions per second, though it could be somewhat higher or lower depending principally on the age and health of the perceivers. Thus the 10 revolutions per second values of L1 and L3 discussed and shown in the figures should be considered illustrative examples rather than specifications or hard limits. As a result FIG. 5 could as well be drawn at a different scale where L1 and L3 are at an actual rotation rate of 5 revolutions per second, and the corresponding apparent rotation rate is also at 5 revolutions per second. Other values than 5 or 10 revolutions per second could be appropriate for L1 and L3, as the principles are the same regardless of the scale.

Unfortunately, the complete stroboscopic effect is more complex than that shown in FIG. 5 due to the effect of different numbers of spokes or regular features of the wheels interacting with the video frame rate as a function of vehicle speed and number of spokes in a wheel. FIGS. 6A-6F portray wheels with different number of regularly spaced spokes (or other regular features) of the wheels of a vehicle, varying from 3 to 8 spokes. Though the number of spokes in a vehicle wheel varies, they are usually regularly placed around the center or periphery of the wheel, which is essentially uniformly the practice in vehicle wheels, and which results in the full stroboscopic effect. All descriptions and comments in the remainder of this embodiment assume such regular placement of spokes or features. While the embodiment will work for less than regularly placed spokes or features the result may be less-than-perfect modification of the improper or inappropriate apparent rotation rate, however the effect itself will also be weaker due to the lack of regularity. A means of handling these less-than-perfectly regular spoke designs will be discussed presently.

Figure 6A:
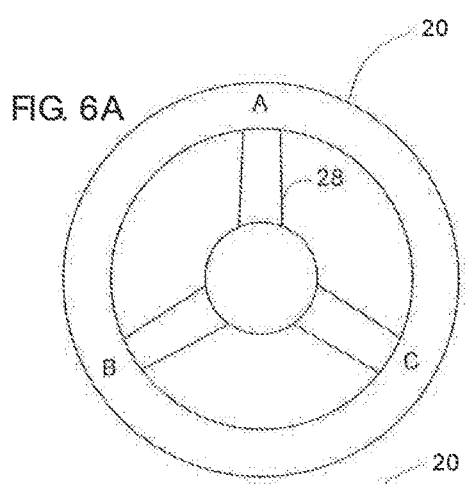
FIG. 6A-6F illustrate a number of different spoke arrangements commonly used in vehicle wheels.

Wheels with 3 spokes are illustrated in FIG. 6A and those with 4-8 spokes in FIGS. 6B-6F. Wheels in common use also contain a greater number of spokes, up to 20 or more, but are not shown as the principles are the same. Referring to FIG. 6A, which shows a three-spoke wheel 28 mounting a tire 22, with the three spokes regularly spaced around the wheel periphery. The spokes are identified as A, B, and C. Since there are three spokes the angular distance between any two adjacent ones, such as A and B, will be 360/3 degrees or 120 degrees. Assuming a 60 rframes per second frame rate and a 60 revolutions per second actual rotation rate the wheel will make a complete revolution, 360 degrees, in one frame which is $1/60^{th}$ of a second. Thus the image of the wheel and its spokes will be identical to that shown in every frame, as the wheel position is identical at every frame and will appear stationary. However the wheel position will also be perceived as identical and stationary if the actual rotation rate is increased to twice the synchronous rate, or 120 revolutions per second, because exactly two revolutions of the wheel occur between video frames. This will also be true for three times the actual rotation rate, etc., so that there will be super-synchronous actual rotation rate points at integer multiplications of the synchronous frame rate.

To complicate matters, if the actual rotation rate is reduced below the synchronous actual rotation rates other sub- and super-synchronous actual rotation rate points will also appear. Using FIG. 6A as an example, if the wheel is rotating clockwise and actual rotation rate is reduced so that the wheel makes exactly 120 degrees rotation less than before in one frame time, or $1/60^{th}$ of a second in the example, spoke A will appear in the position of spoke B but the position of the spokes will appear identical to the original position due to the regular spacing of the spokes, even though the actual spokes may not be the same ones since they are indistinguishable from each other. This leads to a sub-synchronous actual rotation rate at (360−120)/360 or ⅔ the synchronous actual rotation rate. By the same reasoning if the actual rotation rate is further reduced so that spoke A appears in spoke C's position in one frame time, or 240 degrees rotation less in ¹⁄₆₀$^{th}$ of a second, the actual rotation rate is (360−240)/360 or ⅓ the synchronous actual rotation rate as the spokes again appear unmoved, and thus describe a second sub-synchronous actual rotation rate point. Thus for a three-spoked wheel there will be two sub-synchronous actual rotation rates: one at ⅔ and one at ⅓ of the synchronous actual rotation rate. This in addition to the synchronous actual rotation rate and an infinite number of super-synchronous actual rotation rates, all spaced at ⅓ of the synchronous rate apart.

Putting practical numbers into the actual rotation rates, which for example portray a 0.67 meter diameter wheel assembly rotating at an actual rotation rate of 60 revolutions per second with a video frame rate of 60/second, imply that the vehicle speed must be 151.6 kilometers per hour, or 94.8 miles per hour. Thus for a frame rate of 60 images/second, the principal actual rotation rates of concern are probably at or below the synchronous rate of 60 revolutions per second, and the super synchronous points, though fully applicable, generally will be of less interest for surface vehicles which only rarely attain speeds of 303 kph (190 mph) or more in videos. However the sub synchronous points will all fall in vehicle speed areas of interest. This conclusion will hold for other numbers of spokes in the wheels, though the numbers will change.

Figure 6B:
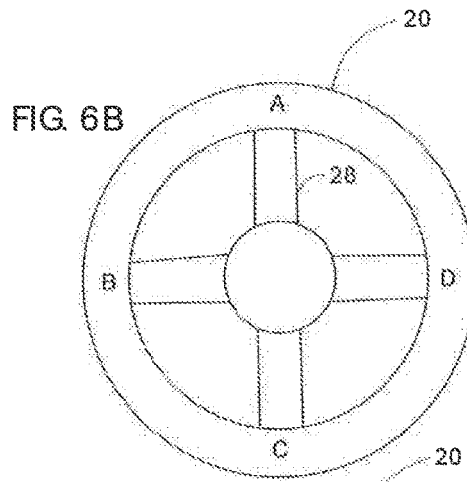
Figure 6C:
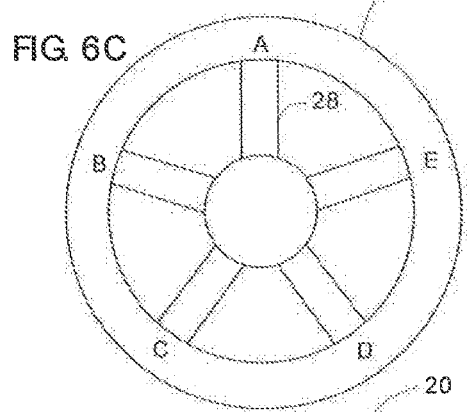
Figure 6D:
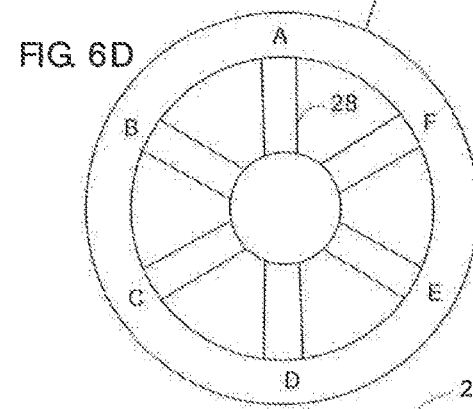
Figure 6E:
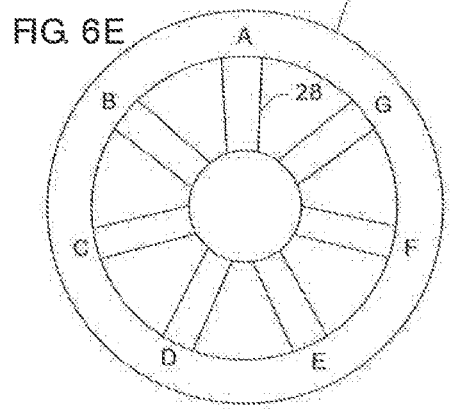
Figure 6F:
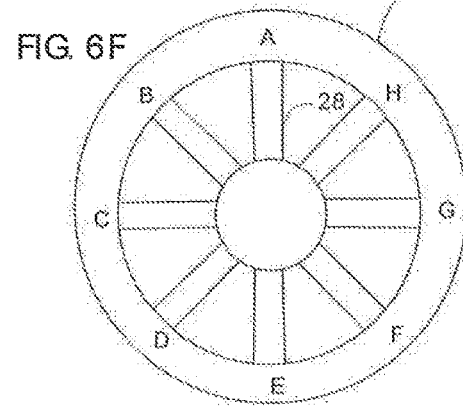

Using the four-spoke wheel design of FIG. 6B as a second example, if the actual rotation rate is reduced so that the wheel makes exactly 90 degrees rotation less in one frame time, or ¹⁄₆₀$^{th}$ of a second in the example, spoke A will appear in the position of spoke B and the position of the spokes will appear identical to the original position due to the regular spacing of the spokes, even though the actual spokes may again not be the same ones, since they are indistinguishable from each other. This leads to a sub-synchronous actual rotation rate at (360−90)/360 or ¾ the synchronous actual rotation rate. By the same reasoning if the actual rotation rate is further reduced so that spoke A appears in the same position as spoke C in one frame time, or 180 degrees rotation in ¹⁄₆₀$^{th}$ of a second, the actual rotation rate is (360−180)/360 or ½ the synchronous actual rotation rate as the spokes again appear unmoved and describe a second sub-synchronous actual rotation rate point. Similarly if the actual rotation rate is reduced even further so that spoke A shows up in the same position as spoke D in one frame time the actual rotation rate is (360−270)/360 or ¼ of the synchronous actual rotation rate. Thus for a four-spoked wheel there will be three sub-synchronous actual rotation rates: one at ¾ one at ½, and one at ¼ of the synchronous actual rotation rate. This is in addition to the synchronous actual rotation rate and an infinite number of super-synchronous actual rotation rates.

By deductive reasoning the different number of spokes in the wheels shown in FIGS. 6C through 6F, which portray wheels with 5 through 8 spokes respectively, will each result in sub-synchronous actual rotation rate points of (1−(m/n)), where m is an integer equal to or less that the number of spokes, and n is the number of spokes in the wheel. Thus for three spokes sub synchronous points appear at 0.67 and 0.34 of the synchronous actual rotation rate; for four spokes the points appear at 0.75, 0.5, and 0.25 of the synchronous actual rotation rate; for five spokes the points appear at 0.8, 0.6, 0.4, and 0.2 of the synchronous actual rotation rate; for six spokes the points appear at 0.83, 0.67, 0.5, 0.33, and 0.17 of the synchronous actual rotation rate; for seven spokes the points appear at 0.86, 0.71, 0.57, 0.43, 0.29, and 0.14 of the synchronous actual rotation rate, and for eight spokes the points appear at 0.88, 0.75, 0.63, 0.50, 0.38, 0.25, and 0.13 of the synchronous actual rotation rate; and so on for wheels with more spokes. Thus, in general, the number of sub synchronous points will be one less than the number of spokes or regular features in the wheel. Since the super synchronous points will appear at actual rotation rate points of (1+(m/n)) rotations per second, there will be an infinite number of such points, each also spaced at the same multiples of the synchronous rate as the sub synchronous points.

Figure 7:
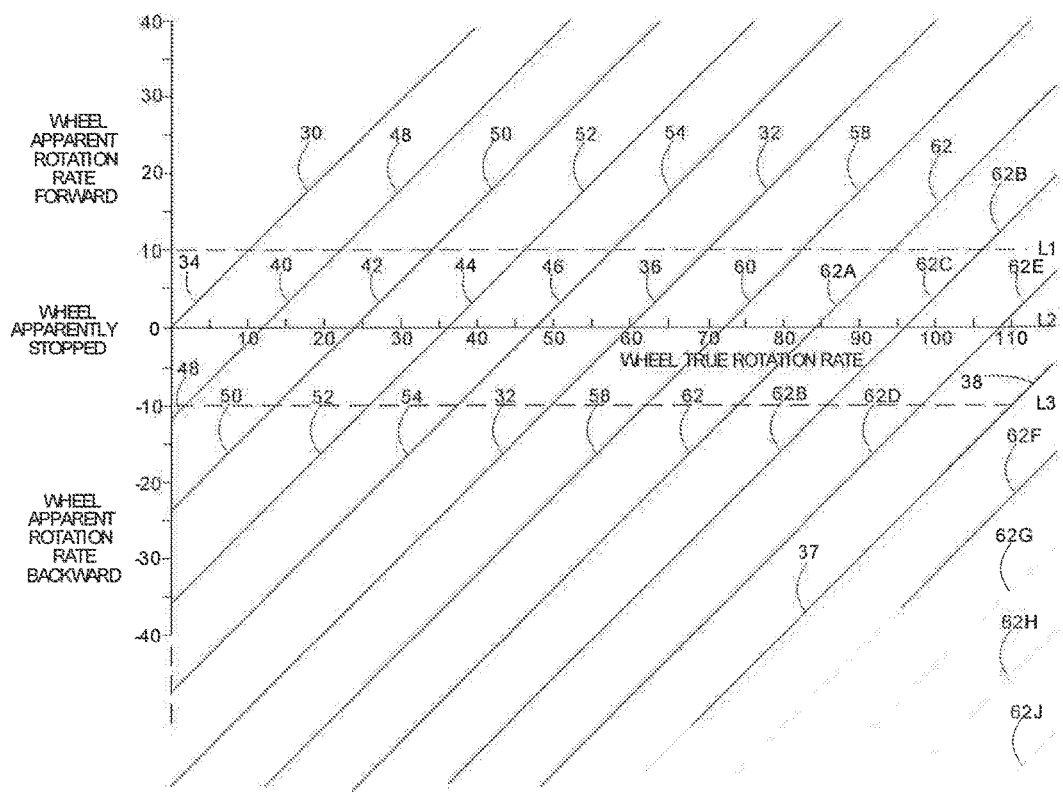
FIG. 7 is a more complete illustration of the apparent/true wheel rotation graph including the aliasing caused by the stroboscopic effect by a five-spoked wheel at a video frame rate of 60 fps.

The existence of any sub or super synchronous point at which the apparent rotation rate is zero also means that for smaller as well as larger actual rotation rates than at those points the purely sub synchronous apparent rotation rate will be non-zero and vary with actual rotation rate in the same way that it does away from the synchronous point, that is the apparent rotation rate grows negatively below and positively above that point. Thus the picture becomes more complex than FIG. 5, and is illustrated in FIG. 7 which describes the apparent rotation rates as a function of the actual rotation rate for a five-spoked wheel and a frame rate of 60 per second, as an example of the more general case. FIG. 7 contains all the information from FIG. 5 but with the addition of the lines describing the sub-synchronous mode behavior, and the partial inclusion of super-synchronous modes.

Thus FIG. 7 contains, in addition to lines relating the apparent rotation rate to the actual rotation rate for the principal low actual rotation rate mode represented by line 30 and the principal synchronous mode represented by line 32, line 48 representing the 0.20 mode with sub synchronous L2 intersection point at an actual rotation rate of 12 revolutions per second; line 50 representing the 0.40 mode with sub synchronous L2 intersection point at an actual rotation rate of 24 revolutions per second; line 52 representing the 0.60 mode with sub synchronous L2 intersection point at an actual rotation rate of 36 revolutions per second; and line 54 representing the 0.8 mode with sub synchronous L2 intersection point at an actual rotation rate of 48 revolutions per second. In addition there will be super synchronous lines 58, 62, 62B, 62D, 37 and 62F-62J which are partially shown. As in FIG. 5 the portions of those additional lines which give rise to obviously inappropriate apparent rotation rates are identified as 40, 42, 44, 46, 36, 60, 62A, 62C, 62E, and 38, while the apparent rotation rates falling outside the extent of those lines will be blurred.

Figure 8:
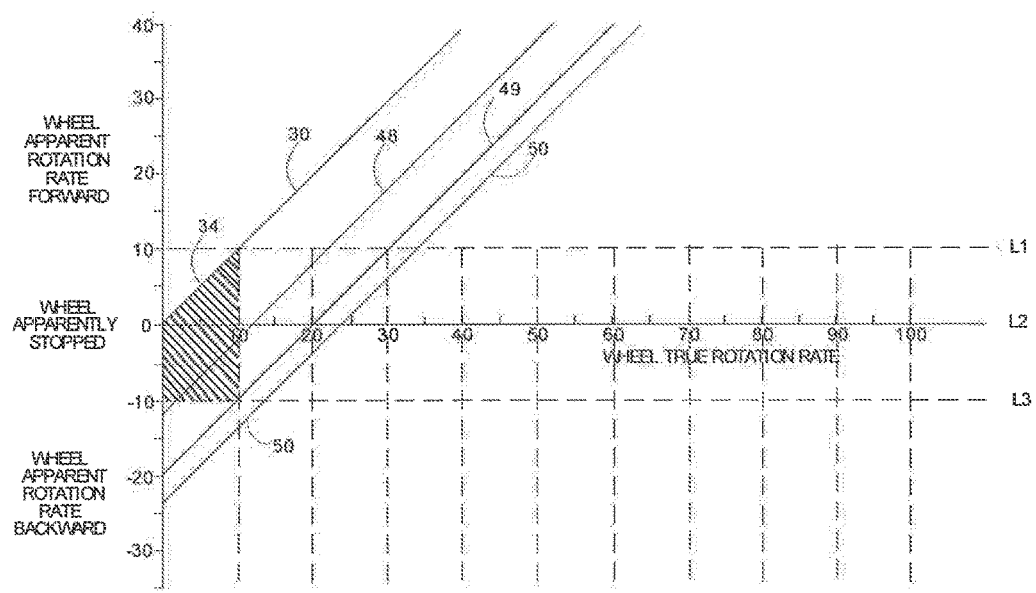
FIG. 8 illustrates those areas in the apparent/true wheel rotation graph in which false motion will be detected by the eye, and thus must be avoided in design of modified wheel images to avoid such aliasing.

The region in the true and apparent rotational rates graph of FIG. 7 that will contribute the most to perceptions of false apparent rotation is indicated in FIG. 8 by the shaded area bounded by true rotation rates of 0 and 10 revolutions per second vertically; by the value of the lower maximum human negative rotation rate perception limit L3 and by line 34 up to its intersection with L1, the maximum human positive motion perception limit. That is any real or aliased line falling within this shaded area, such as line 48, will be perceived as having improper rotation rates while any line such as 50 falling outside this shaded area will not be so perceived as all apparent rotation rates due to it will be beyond the limits of the eye-brain to perceive it a rotating. In that context line 49 represents a boundary case between those lines that will and will not cause false visible apparent rotation.

Since the location of the intersects of aliased rotation rate lines with the L1 axis is intimately related to the number of spokes in a wheel by the previously derived equation (1+(m/n)) rotations per second, FIG. 9 is a table that shows these aliased order intersects as a function of the number of spokes in a wheel under a video rate of 60 frames/second, for 2-20 spokes. The highest order aliases that occur are represented by the lowest-most numbers vertically in FIG. 9. The alias lines of FIG. 7 were shown for 5-spoked wheels under 60 frames/second video frame rate, and are seen to correspond to the numbers in FIG. 9. These highest order aliasing lines are plotted in FIG. 10 as superimposed on the graph of FIG. 8, with line 33 representing 2 spokes, 33A representing 3 spokes, 33B 4 spokes, and so forth through line 33H representing 10 spokes, all for a video frame rate of 60 frames per second.

A principal conclusion that can be drawn from FIG. 10 is that the main contributors to false rotation perception will be wheels with 4 or more spokes, as their aliasing lines will intersect with the shaded region, while wheels with 1, 2, or 3 spokes will not so contribute. Thus one major conclusion is that the modification algorithm should be designed to replace wheel images for wheels containing 4 or more spokes with wheel images having 3 or fewer spokes if their aliasing lines otherwise intersect with the shaded area of FIG. 10, while if the aliasing lines do not intersect with the shaded area, such as would be for higher true rotation rates or some different video frame rates, they can be safely ignored or blurred and will not be noticeable.

The situation is even more complex, however, because lines failing to intersect the shaded area of FIG. 10 could still give rise to improper or inappropriate apparent rotation rates, however those images will tend to have a lower image brightness and contrast than line 34 because they intersect the true rotation range of 0 to 10 revolutions per second at much greater negative values of rotations per second than the lower human rotation perception limit, rather than having no brightness or visibility at all. This is because they will have somewhat blurred images which will of necessity be dimmer than the images in which the spokes can be seen clearly since the blurred images will have the average of the brightness of the spokes and the usually dark spaces between them. Thus, since the eye is vastly more sensitive to resolved moving images than to non-resolved moving images, even if of the same size and shape, even such substantially lower contrast wheel images could still result in somewhat objectionable perceived wheel rotations.

Thus in this actual rotation rate region the substitute wheel images should preferably contain 3 or fewer spokes, which will have the effect of moving all the lines numbered 40, 42, 44, and 46 toward higher actual rotation rates such that all result in apparent rotation rates more negative than −10 rotations per second. Nonetheless if any aliasing line penetrates the true rotation region between 0 and 10 revolutions per second, even though that penetration be at more negative rotation rates than L3, it is possible that the resulting false apparent rotation of the wheel may still be noticeable even if fainter than the true apparent rotation. Should that perception still be objectionable modified wheel images can also be substituted which are somewhat blurred or less contrasty under those conditions, so that the false rotation perceptions will only be fleeting, indistinct, and dim.

It must be pointed out that the transition from detectable to blurred in any of these lines, for example from 34 to 30 may be perceived gradually rather than abruptly, depending on many factors. In addition it is likely that the actual threshold levels L1 and L3 are themselves a function not only of the perception of the eye, but also of the actual number of spokes in the wheel being observed. It is therefore important to keep in mind that the values of the L1 and L3 levels are neither fixed nor absolute, but shown for example only as their values could be different from those shown and discussed in this or the other embodiments. To that must be added the caution expressed for FIGS. 5 and 7 regarding the limit of the eye-brain of typical viewers, which generally varies between 5 and 10 revolutions per second, though it could be somewhat higher or lower. Thus the 10 revolutions per second values of L1 and L3 discussed and shown in the figures should be considered examples rather than specifications or hard limits. As a result FIGS. 5 and 7 could also as well be drawn at a different scale where L1 and L3 are at an actual rotation rate of 5 revolutions per second, and the corresponding apparent rotation rate is also at 5 revolutions per second. Other values than 5 or 10 revolutions per second could be appropriate for L1 and L3, as the principles are the same regardless of the scale.

The net intent of the above reasoning is to formulate the principal algorithm that will define the operation of substitution of modified wheel images for those original wheel images whose apparent rotation rates would be deemed inappropriate for the actual wheel rotation rates experienced when viewed in user displays. These operations are illustrated in FIG. 11A, drawn for a five-spoked wheel and a frame rate of 60 frames per second, and its corresponding FIG. 11B which defines the regions of the true rotation rate intersects with L2 that require modification of the wheel images to preclude or minimize the false apparent rotation rates due to the aliasing stroboscopic effect, and define the type of action most appropriate to be taken. FIG. 11B shows two regions, the First Region bounded by lines 39, 39A, 39B, and 39C and the Second Region bounded by lines 41, 39A, and 39D. In addition the FIGS. 11A and 11B contain labels TRR-0-TRR-9 corresponding to the wheel True Rotation Rates 0, 10, 20, 30 and so on, in rotations per second.

Since all true and apparent wheel rotation rate lines are all necessarily at 45 degrees to the horizontal and vertical axes of FIG. 11A due to the design of that figure, by simple geometry if an aliasing rotation line intersects the True Rotation Rate axis (L2) at a value of 20 rotations per second (for a video frame rate of 60 rotations per second) or less, some portion of that line will inevitably enter the shaded region wherein it would cause highly visible and apparently false apparent rotation. This is because all rotation rate lines, real or aliased will plot as 45 degree lines to either the horizontal or vertical axes of FIG. 11A. Any particular intersect of a sub synchronous L2 intersection point is also mathematically equal to the video frame rate divided by the number of spokes in the actual wheel. Therefore if any particular aliased rotation rate line intersects L2 at a value of less than 20 rotations per second, some portion of that line will always enter the forbidden shaded region, which is partly defined by the Upper Negative Human Rotation Motion Perception Limit.

By simple geometry due to the 45 degree angle of the rotation rate lines, this value of 20 rotations per second is exactly twice the value of the Upper Human Motion Perception Limit for this example (and falls below the TRR-2 line in FIG. 11A). Under these conditions the aliasing line will likely cause objectionable false apparent rotation so that mitigating actions must be taken which substitute wheel images containing fewer spokes in order to move that sub synchronous L2 intersection point of the alias line towards the right in FIG. 11A and thus move it entirely out of the shaded region. This condition is illustrated in FIG. 11B as being within the above-defined First Region. Alternative mitigating approaches for this First Region include substituting a wheel image that rotates at precisely the correct actual rotation rate, or has some degree of blurring, or both, in order of priority. These actions do not apply to lines 30 and 34, which are the true and thus the only rotation rate lines that are desired in or touching the shaded region.

In contrast to the above, should any portion of an aliasing rotation rate line's intersect with L2 fall above the value of 20 rotations per second (for this example using a video frame rate of 60 frames per second), the wheel image need only be blurred so that then it will not cause visible false apparent rotation whenever its intersect with L2 falls within the above-defined Second Region of FIG. 11B. This action includes all super-synchronous alias lines as well.

In order to codify the above actions into an executable algorithm we define Four Principal Values as follows:

Value 1: Being the video frame rate in frames per second divided by the number of spokes in the vehicle's wheel (this is numerically equal to the intersect of the highest order alias line 40 where it intersects the L2 axis, and is shown to intersect L2 at precisely 12 rotations per second for a video frame rate of 60 frames per second and 5 spokes in the wheel in the example. The dimensions of Value 1 are 1/seconds.

Value 2: Being twice a Value 3. The dimensions of Value 2 are 1/seconds.

Value 3: Being the Human Upper Rotation Motion Perception Limit (stated in revolutions per second. The dimensions of Value 3 are 1/seconds.

Value 4: Being the vehicle velocity in meters per second divided by the quantity of pi times the actual wheel assembly overall diameter including the tire, in meters. Value 4 is numerically equal to the rotational velocity of the wheel in revolutions per second. The dimensions of Value 4 are 1/seconds.

Given these definitions of the four Principal Values, the Principal Algorithm for selecting the wheel image modification actions is stated as follows:

Whenever Value 1 is greater than Value 2 and Value 4 is also greater than Value 3, substitute blurred images for the original images of the vehicle wheels (because that is the only effective strategy in that region); and whenever Value 1 is less than Value 2 and Value 4 is also less than Value 3, substitute wheel images that have fewer spokes than the original wheel images, or rotate at a correct rotational velocity equal to that of Value 4, or are partially or wholly blurred, or some combination of all three actions because those strategies are only ones likely to be effective in that region.

This algorithm will assure that the most proper action is taken regardless of the actual vehicle velocity, the video frame rate, the number of spokes in a wheel, the diameter of the wheels, or the value of the Human Upper Rotation Motion Perception Limit, in order to assure that the best possible results are obtained which eliminate or minimize the apparently false rotation rate of wheels of vehicles in videos. It is this algorithm which is codified in all the Embodiments as well as in the Claims. It also applies to any other embodiments that may be later be envisioned.

There are at least three types of time sequences in common use in typical videos showing a vehicle. In the first a vehicle could start from standstill and accelerate to some speed. In the second a vehicle could be shown initially at some speed, and then decelerate to a stop. In the third a vehicle could be shown at some road speed, which could be constant or varying, which it could do at different rates and times. In the absence of wheel image modification the apparent rotation rate as a function of time is different in each of these types. In the first type, as the actual rotation rate increases, the apparent rotation rate of the wheels will be seen as correctly increasing until they become a blur as the apparent rotation rate passes through L1 in FIG. 7. As the actual rotation rate continues to increase the wheels will continue to be principally blurred, however as the actual rotation rate passes through the regions represented by lines 40, 42, 44, and 46 the strength of the stroboscopic effect could readily cause the apparent rotation rate to vary between the L3 and L1 levels, and the rotation rate will be perceived as going from rapidly backwards to more slowly backward and then through a momentary stop, through slowly forwards, and then through rapidly forwards until becoming a blur above L1 several times as the vehicle speed and thus the actual rotation rate increases.

When the actual rotation rate goes above 50 revolutions per second in this example, the stroboscopic effect will be the strongest since moving along line 36 as it will then be near synchronism, and the backward-to stop-to-forward apparent rotation rate will be dominant. Further increases in actual rotation rate will produce a succession of such backward-to-stop-to forward apparent rotation rates though increasingly weaker as forward blur is mostly indistinguishable from backward blur, until the actual rotation rate nears the super synchronous point of line 38 when the backward-to-stop-to-forward rotation effect again dominates the apparent rotation rate above synchronism. This sequence will continue for all actual vehicle speeds above synchronism.

The second type of time sequence is the opposite from the first. As the vehicle slows from an initial high speed the actual rotation rate steadily decreases until it becomes zero. The sequence of apparent rotation rates will be the reverse of that in the first example, with the apparent rotation rate going from slowing forward-to-stopped-to-increasing backward apparent rotation rates several times.

The third type, in which the speed and therefore the actual rotation rate vary slowly between two or more values, will see a series of slowing-to-speeding up and speeding up-to-slowing apparent rotation rates, and apparent momentary stopping in between depending on the extent of the differences between the actual rotation rate values. Thus the apparent rotation rates could be similar to that of either the first or the second types and could contain one transition around a sub-synchronous point, a few, more than one, or none at all depending on the ranges of actual rotation rate values experienced. These apparent rotation rates are not only intuitively and mathematically correct, but not surprisingly also match those experienced during watching videos of moving vehicles having spoked wheels. This embodiment is designed to correct these inappropriate apparent rotation rates.

This embodiment discusses a number of strategies that could be utilized to eliminate the inappropriate and inappropriately perceived apparent rotation rate of the wheels of a moving vehicle in such videos. These strategies could be applicable to the other embodiments as well, and will be discussed further therein. Three such strategies are shown in FIGS. 12A-12C and are non-limiting examples, as other strategies could also exist and would be as applicable to the embodiment. All of these examples use a vehicle that starts at standstill and increases speed through at least the synchronous point, though the reverse or other speed/time profiles would be as applicable.

FIG. 12A describes a strategy in which the apparent rotation rate follows the actual rotation rate from zero through its intersection with L1 and proceeding beyond, and the wheel images are modified to either blur them, to substitute wheel images with fewer spokes, or both based on the actual rotation rate at every such rate as per the Principal Algorithm. Blurred images are substituted for the original images in the video for all higher actual rotation rates that exceed a true Rotation Rate greater than 10 revolutions per second, which coincides with crossing L1. They could be used at one level of blurring such as following line 76, or they could be imparted a degree of blurring such as generated by wheels that rotate faster as the actual rotation rate increases, in which case they would follow some line such as 74 or 72.

FIG. 12B describes a strategy which begins as does that in 12A until the apparent rotation rate crosses L1 and then substitutes uniformly blurred images until the actual rotation rate is above the synchronous point, and then substitutes wheel apparent rotation rates which are blurred by various degrees of faster rotation with increases of actual rotation rate, in which they would follow some lines such as 80, 82, or 84.

FIG. 12C describes a third strategy in which adopts similar paths as did those in FIG. 12A but now identified as lines 90, 92, and 94. However they originate at an extension of 86 identified as 88 which extends beyond the intersection with L1 in order to start the blurring substitutions at a point well beyond TRR-1 so that to make sure that the apparent rotation rate is well clear of potential vestigial spoke rotation visibility and potential stroboscopic effects, however weak.

The choice of strategies could be made on the basis of the range of vehicle speeds, the number of spokes in the wheels, or other conditions likely to be encountered in the video as it is being watched. As an example, 12A might be most applicable in videos with high speed vehicles, 12B in videos with low speed vehicles, 12C in videos with a large number of spokes in the wheels, and so forth. Other strategies could include choosing 12A line 76 for embodiments in which the operator has vehicle speed estimates made only at a low actual rotation rate and only made by eye rather than by measurement, and so could not take advantage of a more complex strategy. These three strategies are not the only ones that are possible and probably effective, but they are a representative set, recognizing that others may be as effective, and so they should be considered as non-limiting examples of the principles.

Figure 17:
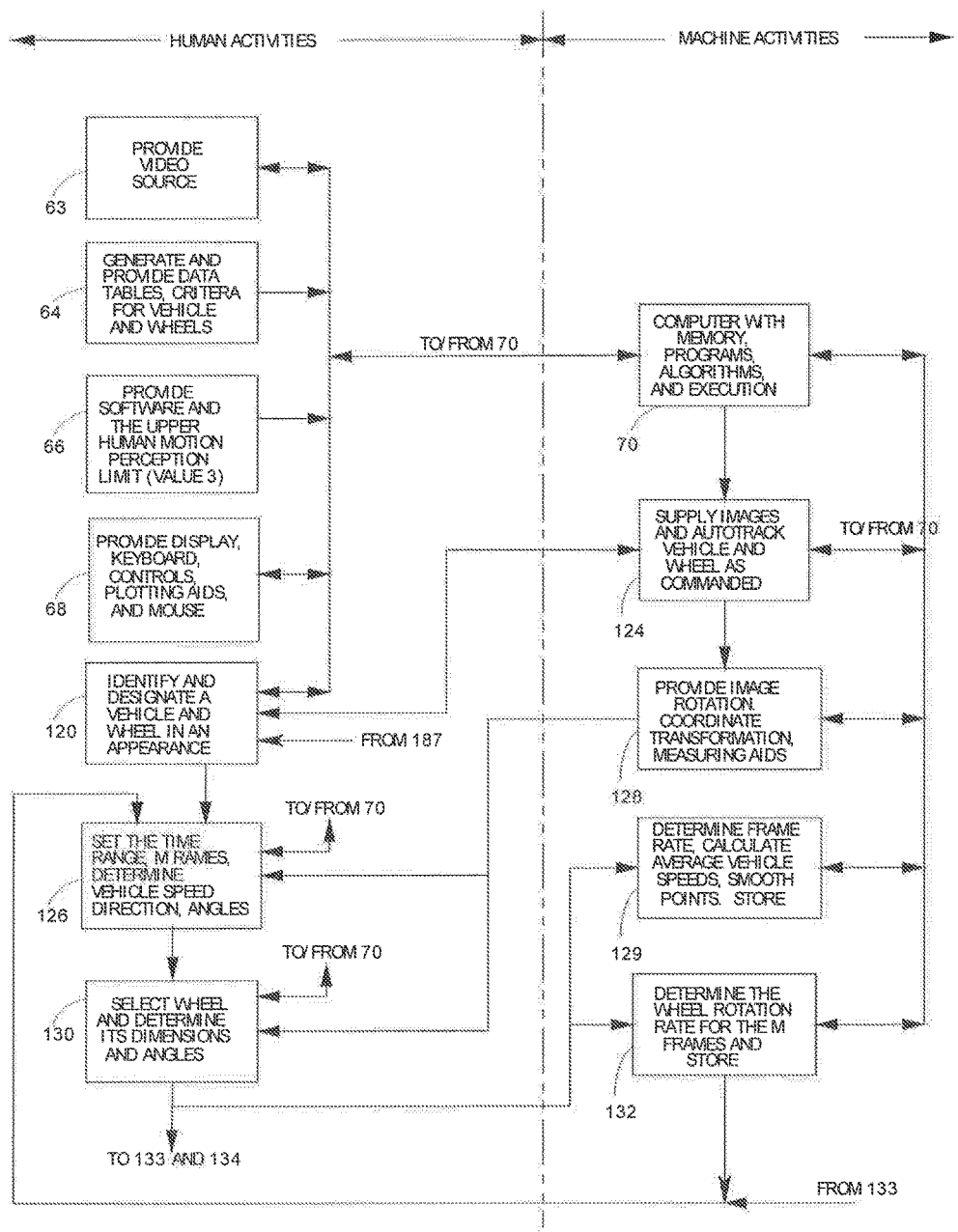
Figure 18:
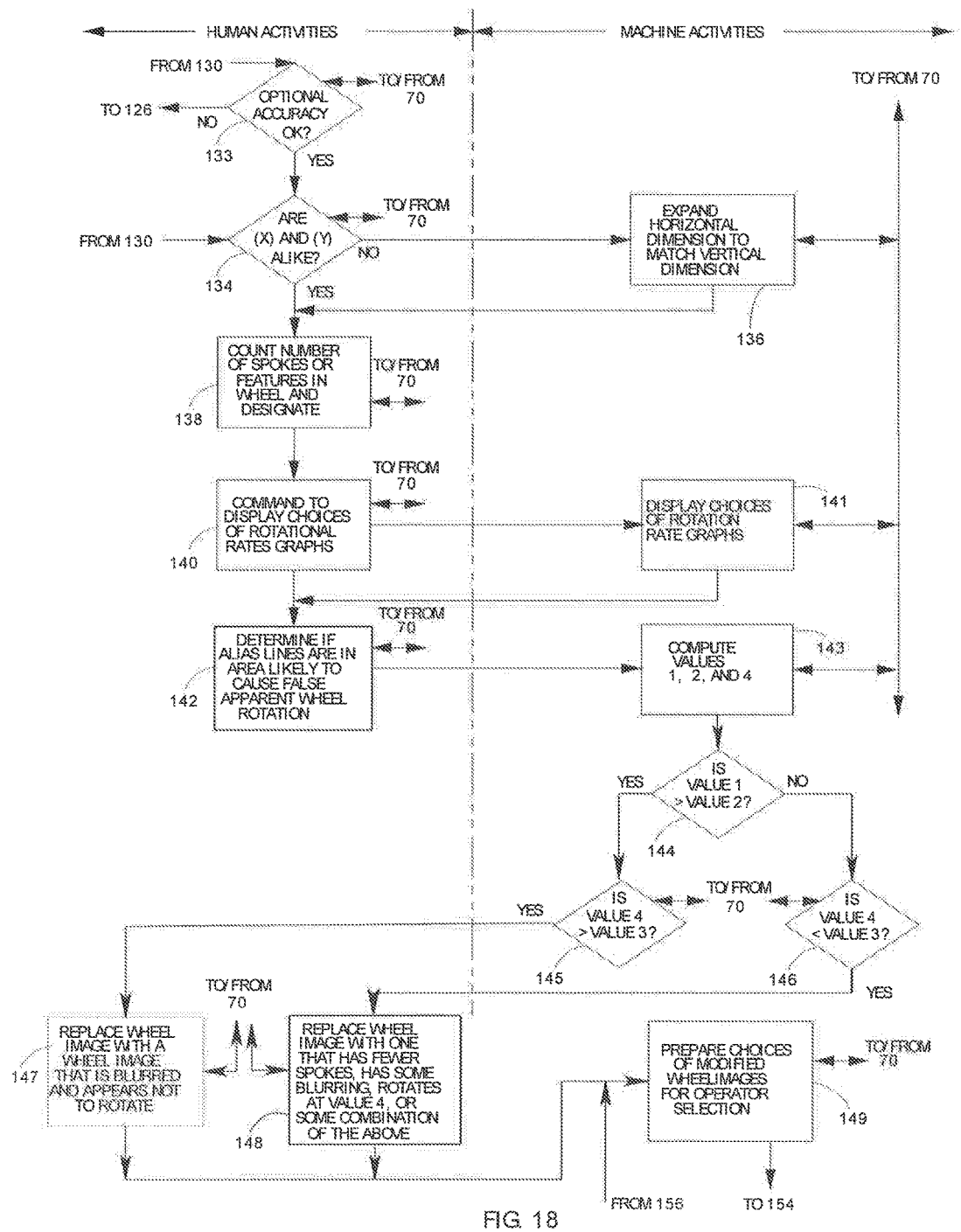
Figure 19:
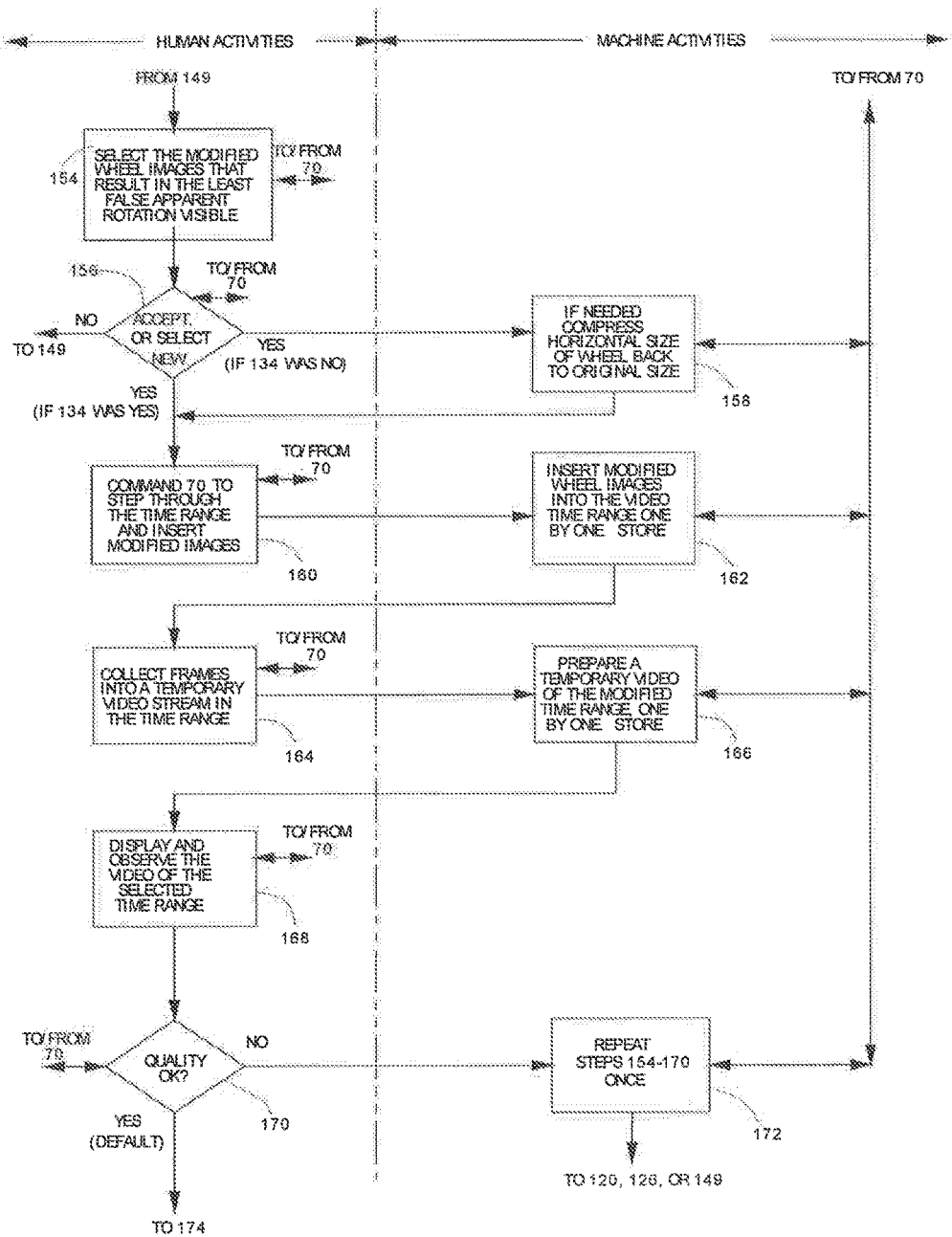
Figure 20:
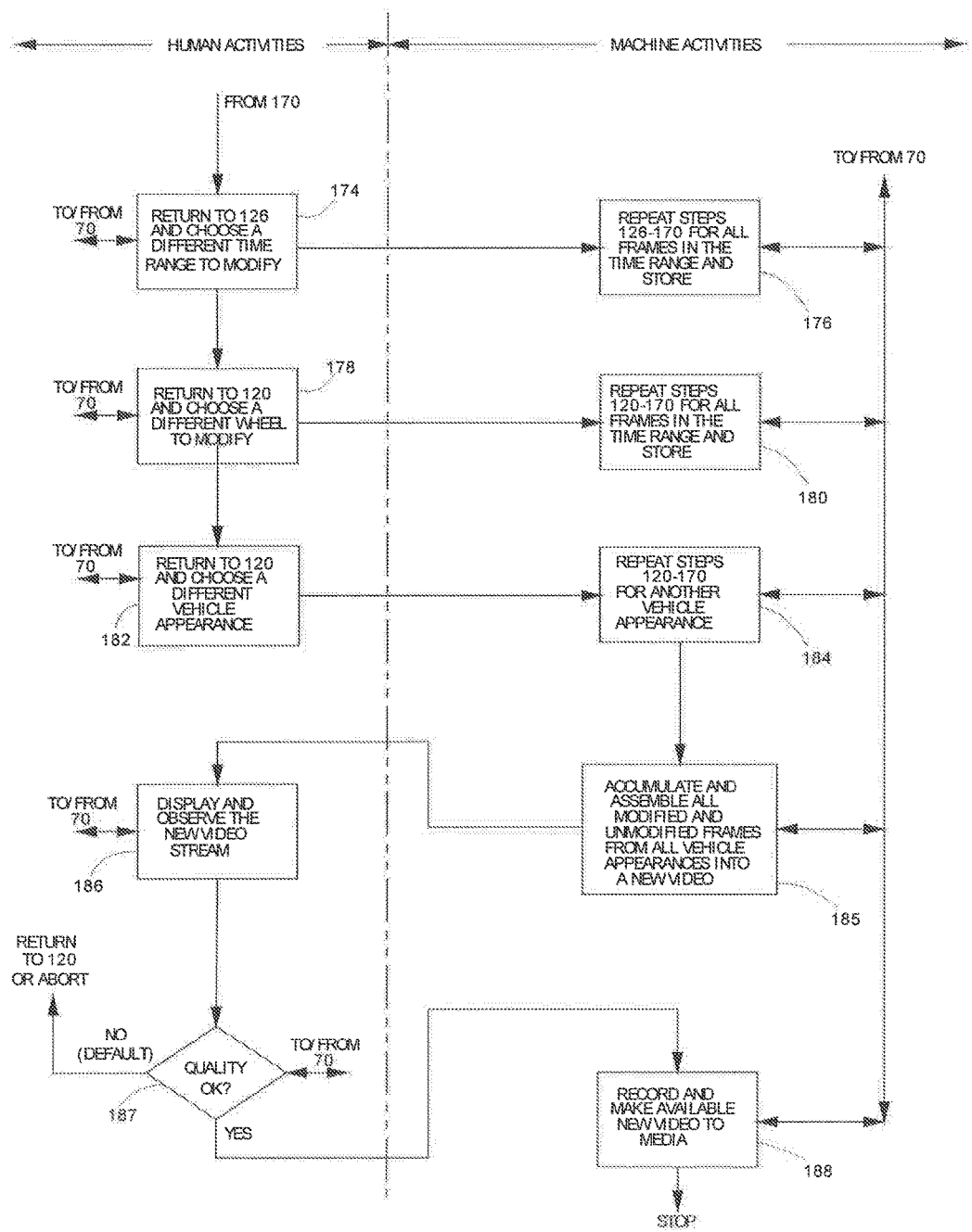
Figures 21A, 21B, 21C, 21D, 21E, 21F:
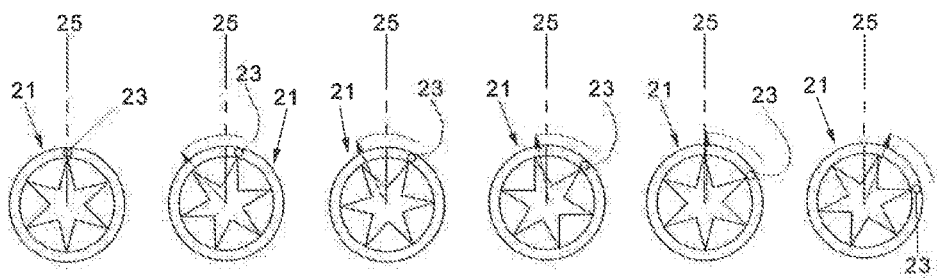
Figures 21G, 21H, 21I, 21J, 21K, 21L:
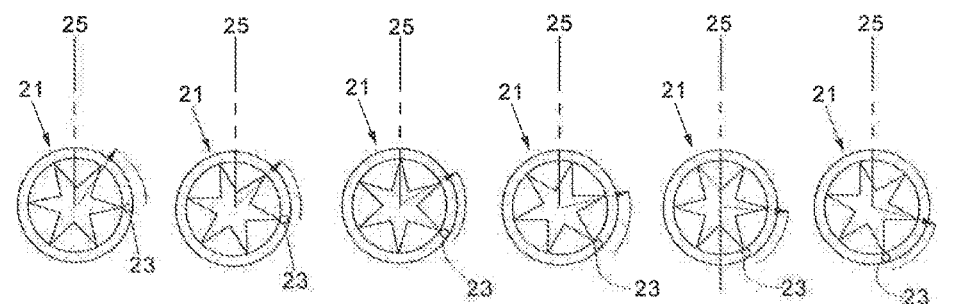
Figure 22A:
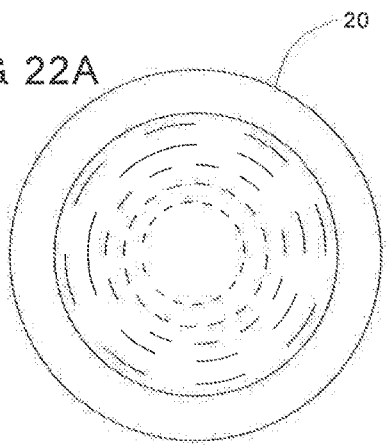
Figure 22B:
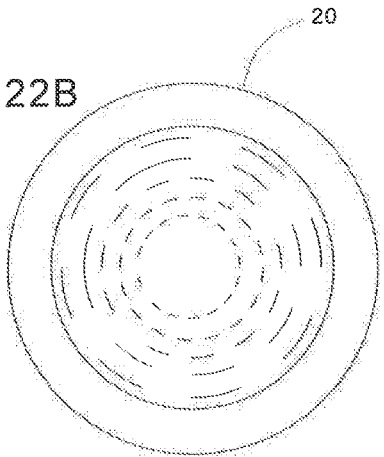
Figure 22C:
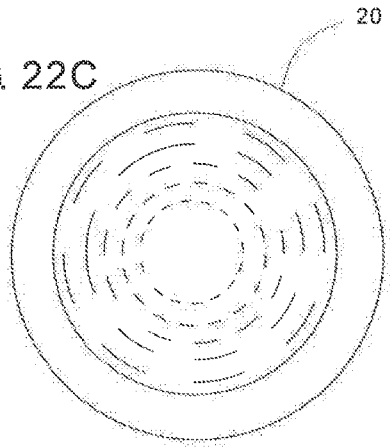
Figure 22D:
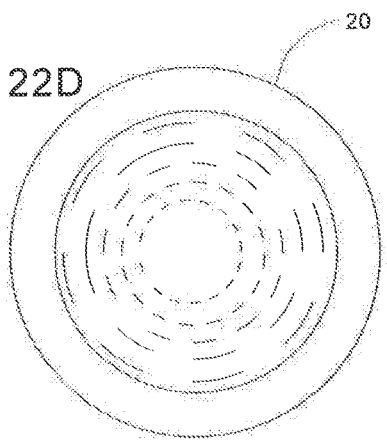
Figure 22E:
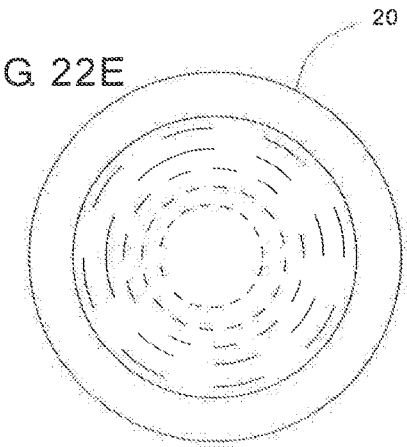
Figure 22F:
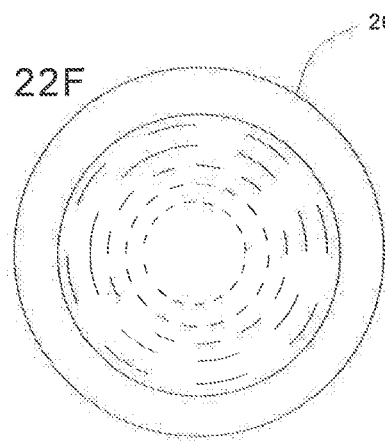

Referring to the process description beginning in FIG. 17 and continuing on FIGS. 18, 19, and 20, a source of video 63 is provided by the operator and stored in the computer 70, containing the image sequences of the vehicle whose wheels may exhibit inappropriate apparent rotation rate. Data tables of vehicle types and their characteristics, common and/or usual wheel types and designs associated with specific vehicles, criteria for decision-making, a number of charts or their digital equivalents of apparent rotation rate as a function of actual rotation rate for several different wheel diameters and spoke designs for several different video frame rates are generated prior to beginning operations, data on criteria for replacing wheel images including the strategies exemplified by FIGS. 12 A-C, and other data are provided by the operator in 64 and stored in 70. The type and amount of such data will be understood to be discretionary as the process of this embodiment is enhanced by but can operate without some of these inputs if the operator can generate the data as needed or use his judgment to develop it.

Software products, algorithms specifically including the Principal Algorithm derived previously, programs, and tools that will be needed for the subsequent operations are provided by the operator in 66 and stored in 70. While these will be discussed in more depth presently, one key software program will implement a system of message boxes that could be displayed on 68 for the computer to communicate a status message, and a count or identification of which step in the process the system is in. There could also be displayed an action box such as including a "yes", "no", "go back", and "go forward", or "go to step number_" menu for the operator to select which would command the machine 70 to execute those commands. In addition other commands and information displays could be accommodated. There could also be a process flow chart or set of charts to aid the operator in stepping through the process, which could also be displayed on 68 on command, whether in one shared display or on a separate display. These displays and action means or their equivalents are intended to be the principal command and executive interface between the human operator and the machine.

The inputs from functions 63, 64, and 66 are loaded into a computer 70, which can be a general-purpose or a special purpose computer, so long as it is capable of accepting, storing, recalling, and executing the particular and appropriate software programs and routines; operate in response to external or internal commands; and output its responses and results. This computer 70 is the heart of the machine-oriented activities, and it is functionally connected to and from the process steps in these flow diagrams, whether shown as connected in the figures or not. It is also intended that the human operator functions in these process flow diagrams are connected to the computer 70, and vice versa, whether shown as connected in the figures or not. One or more display units and any number of associated control keyboards, mice, overlays, or other input or output or plotting aids are provided in 68, and also connected to 70 with two-way communications. The video stream from the source 63 can be loaded into computer 70, or may optionally be accessed directly from 68 or from 70 and started or stopped at any point in time as desired in this flow, in response to commands from the operator or from the computer itself.

Once steps or functions 63-68 are completed the process begins with the operator, in function 120, viewing the video or some portion thereof, either directly from 63 or from 70, identifying the first vehicle appearance to be addressed and its wheels, and manually designating them in a command to 70. This appearance of the vehicle in the video is illustrated in FIG. 13, which shows an example of a video, its start as time A, the appearance of a vehicle noted as at time B and its disappearance noted as at time C and identified d as 96, a second vehicle appearance at time D and its disappearance as time E and identified as 98, and the ending of the video in time F. This description continues referring to the vehicle as though there were only one vehicle making an appearance in the video, but it will be understood that the process applies to all appearances by one vehicle and also to all appearances of any other vehicles, should there be more than one. Thus 96 could be the first appearance of vehicle #1 and 98 its second appearance, as an example.

Although the operator can choose any point in the video to start the process proper he could advantageously choose a point in time in which a vehicle makes its first appearance in the video, such as point B in FIG. 13. Alternatively he could choose a point in time at which he first perceives the wheels of the vehicle to have an inappropriate rotation rate for the vehicle apparent speed. The operator designates not just the presence of a vehicle but actually designates the vehicle itself, and one or both of its visible wheels via their coordinates, distance from the edges of the video frames, or specific characteristics of their image that would allow the computer to track them. This designation would be accompanied by a command from the operator to the computer to then initiate automatic tracking of the vehicle and its wheels in computer function 124, for which it could use a number of commonly available software products similar to that used in "face recognition" programs and "object tracking" programs, which are ubiquitous in consumer digital cameras, such as referenced in [030], or more sophisticated professional recognition and tracking software also commonly available. Function 124 can also supply images, portions of images, frozen video frames, or other information as requested by the operator in 120 for display.

Next the operator, in function 126, determines the vehicle speed and direction of travel by measuring the motion of its image over a number "M" of video frames at or near the initially chosen times in the video. One of these measurement frames could coincide with the chosen initial vehicle identification time, but that may not be necessary so long as it is near that time due to the relatively slow-changing aspect of many vehicle images in common video streams. These frames are supplied on operator command either from the video source 63 or from the stored video by 70, with commonly available software which can "grab" or "freeze" the frames, separate them from the video stream, and present them as desired to 68. As a non-limiting example illustrated in FIG. 11, the vehicle 99 image positions in three frames are digitally introduced into a common larger image containing the images as well as a representation of the video camera used for recording 100, and their relative geometry.

It will be recognized that a minimum of two positions of the vehicle in time are required to obtain the average velocity between the points, however the greater the number and their spacing in time the greater the velocity accuracy, so three frames will be used by way of a non-limiting example. In this display the vehicle images could initially be sized small enough so that their position at the three instants of time represented by the three chosen video frames were mere points in order to facilitate accurate measurements, or some point on larger images of the vehicle could be used as a point reference to attain the same end.

In order to facilitate this display geometry and the desired measurements 70 can perform any requested necessary coordinate transformations, image rotations, and specified measurements using commonly available programs for such purposes in computer function 128 for display on 68 in a view normal to the horizontal plane or to the plane of the vehicle travel, or other suitable geometry. This display could be provided together with graduated measurement aids such as on-screen rulers, protractors or other angle measurement devices, or other on-screen measurement aids for the video image, as requested by the operator, to facilitate function the measurements. Alternatively the operator can supply physical overlays with inscribed rulers and protractors, or simply use those instruments themselves, to make these measurements directly on the screen of 68. If he so desires the operator can also print the images and use physical measurement aids to determine the desired measurements. The purpose of these measurements is determination of the vehicle range or distance from the video camera, its speed, and its direction of travel relative to the video camera line of sight, all of which will be used for determination of proper wheel rotation rates and other quantities necessary for the recognition and modification of inappropriate apparent wheel rotation.

The process of determination of these parameters can be based on the geometry of FIG. 14, which is an example of a plan view of the vehicle 99 and its motion. This figure lays out the vehicle position at three instants of time as seen by the video camera 100, with the distances, ranges, and all relevant angles identified. While these instants of time could beneficially be chosen during the time period when the operator perceives the vehicle wheels to be rotating at improper rates for the perceived vehicle speed, a different choice in number or instants of time could also be used and will be discussed presently.

It is noted that the only quantity that is assumed to be known a-priori in FIG. 14 are the approximate length of the vehicle and the precise video frame rate. Since the scale of FIG. 14 on the monitor screen is unknown, knowing the approximate length of vehicle 99 and the time elapsed between the time points t-1 and t-2, available from the frame rate allows an approximate determination of the distance $D_1$ traveled by measuring how many vehicle image lengths, or fractions of lengths, fit between the time points. Since the make and type of vehicle to be experienced in the video is usually known a priory and made part of 64, including the vehicle length, the length of the vehicle will be known. In the case where it is not most vehicles of a recognizable type have approximately the same length, the accuracy of measurement will be limited by this approximate knowledge, but should suffice for the purposes of this embodiment. Alternate techniques to determine the distance travelled between t-1 and t-2 such as using a calibrated display or other techniques could be used and could be as, if not more, effective.

Knowing the time difference between the two frames at the known frame rate then allows the speed of vehicle 99 along the path $D_1$ to be determined from $$V_1 = \frac{D_1}{T_1},$$

where $V_1$ is the vehicle velocity, $D_1$ is the distance, and $T_1$ is the time elapsed between time points t-1 and t-2 at the known video frame rate. The distance $D_1$ will be measured in terms of the vehicle lengths. Analogously the distance $D_2$ between time points t-2 and t-3 can be determined, and thus the vehicle speed $V_2$ between those time points. Only two time points are required to determine the vehicle velocity if it is constant and its path straight, and its direction relative to the video camera subtends an angle such as the angle "a" which is neither very small nor very large. However, such may not be the case and thus more than two time points, or a choice of different time points, or both, may be required for vehicle speed determination for various instants of time. This may be especially so if the angle "a" or one of the other angles in FIG. 14 is very small (such as less than a few tens of degrees) or very large (such as a few tens of degrees less than 180 degrees), or the time difference between t-1 and t-2, or both are particularly small.

The angles a, b, c, and d, e, and f in FIG. 14 can be measured directly on the display screen. Then, using the Law of Sines, the ranges $R_1$ and $R_3$ can be determined. If the angles c and f are small and difficult to measure accurately then the fact that the three angles of a triangle always equal 180 degrees enables determination of the ranges $R_1$, $R_2$, and R₃. While the range measurements may or may not prove useful they are discussed for completeness.

Measurement of the angle of vehicle travel with respect to the line-of-sight from the video camera will be a simple angle measurement on the display screen if the display is a plan view. Non-plan view presentations of the relative geometry are also possible and will also suffice but require the use of coordinate transformation or image rotation software, which is commonly available and presented by 128 to 126 on command. If no a priory vehicle length data are available there are at least two options: The approximate vehicle dimensions can be obtained by scaling the dimensions of buildings, windows, doors, people, pets, trees, or other features of the scene whose dimensions are known or can be reasonably estimated. Alternatively should that prove difficult, such as might be the case if the vehicle is shown against an outdoors country scene with few or no landmarks of known size, the vehicle velocity could be estimated by its approximate size and the change in that size over a number of video frames, since the frame rate is known. It will be understood that the vehicle speed and direction determination can proceed over a larger or smaller number of video frames, or over video frames which are contiguous or widely separated in time. It will also be understood that there exist software tracking and designation programs that accomplish all the above autonomously, with but a few conditional inputs, and their use could also be invoked.

The choice of which frames to use for the estimation of the vehicle parameters of FIG. 14 could be done in a number of ways, one of which is illustrated in FIGS. 16A-16F. Referring to those figures the appearance of the vehicle, identified as a portion of 96, is shown in FIG. 16A with an illustrative set of video frames shown. It must be pointed out that there would usually be a much greater number of frames in a typical vehicle appearance, which could easily last tens of seconds or more, and thus could contain on the order of hundreds of video image frames. One strategy for frame selection for display in FIG. 14 is seen in FIG. 16B, in which the operator has selected F1, the first frame he sees as the first, F7 as the second, F13 as the third, and every 7$^{th}$ frame thereafter during the entire video appearance. The choice of every 7$^{th}$ frame is arbitrary and used only for illustration purposes. Not all the selected frames are so indicated in FIGS. 16A-16F, but if they were they would follow the same assignment strategy.

The vehicle speed determined using the geometry established by these frames in FIG. 14 would necessarily be an average over the time spanned, in this example over sets of 7 frames, or 7/60 of a second apart if the frame rate were 60/second. This is illustrated as points of average speed every 7$^{th}$ frame in FIG. 16C, one point for every averaging set of 7 frames. The points are identified as 102, 104, 106, 108, 110, 111, 112, and 113. This series of points describes a vehicle speed profile taken at the average points. The points could be connected by straight lines to emphasize that no information was gathered in between the sampling frames, in which case the a piecewise continuous curve of speed as a function of time such as 114 would result. While this curve is continuous the information accuracy at any instant of time depends on its distance in time from the frames which defined it.

A more accurate speed curve could be readily generated by connecting the points of FIG. 16C with a curve, using linear or curve fitting approaches or software programs such as a least-squares or other curve fitting techniques. A typical result of such a curve-fitting process is shown by example that could be like 116, shown in FIG. 16E, which is a much better approximation to the actual vehicle speed. Computer function 129 is then commanded by the operator, through 70, to collect and store all the vehicle measurements he has determined for every set of frames used, and then to apply the averaging and curve-fitting process to determine the best fit curve of vehicle velocity as a function of time for the vehicle appearance and store it in memory. It must be pointed out again that the speed points, choices of frames, and other parameters and resulting in the curve of 16E are purely arbitrary, and shown only as an example.

Once the vehicle range, speed, and direction are known for the vehicle appearance in the video a similar process can be used to ascertain the angle of the wheels of the vehicle to the video camera line of sight, since knowledge of those angles is what is ultimately desired in order to devise the modifications to the wheel images, which is the objective of this process. If the vehicle is not turning at the time both the front and rear wheels of the vehicle could be assumed to be at essentially the same angles as the vehicle 99 in FIG. 14 with respect to the video camera. Since in general the vehicle will not be at exactly right angles to the video camera line-of-sight there will be some foreshortening of the circular wheel assembly images, which would make their horizontal dimension smaller than their vertical dimension. Should the vehicle not be turning and the ranges between video camera and vehicle be large this foreshortening will be substantially equal for the front and rear tires/wheels, and then the same modification of the video's wheel images can be applied to both front and rear wheels of the vehicle.

However, in the general case, the vehicle may well be turning at the time, or the interval of time chosen may be too great for such simplifying assumptions, or the range between vehicle and the video camera could be small, and thus the like dimensions of the front and rear wheel images would not be the same, and might have to be considered and treated separately in the process flow in the general case. Furthermore the time interval between the time points t-1, t-2, and t-3 could also be large, in which case the foreshortening of the wheel images could be substantially different for front and rear wheels whether the vehicle is turning or not. Thus, while not mandatory it is assumed that the front and rear wheels should in general be considered independently in the process flow. As a separate consideration the scale of the scene displayed on the monitor screen may have to be amplified to get the needed accuracy for the wheel assembly size and angle measurements, depending on the initial scale and the geometry.

The operator then determines, as the next step in the process in function 130, the actual angle of a visible wheel to the line-of-sight to the video camera for sets of frames such as used for the vehicle speed determination, though a different set could also be used if desired provided that a vehicle speed as a function of time curve such as 116 in FIG. 16E was determined. In addition, 130 also determines the wheel assemblies' horizontal (X) and vertical (Y) dimensions for each frame or for a number of frames separated by some time interval. This could be done using analogous measurement techniques to those that were used to determine the vehicle angles and distances, however a greater degree of image amplification may be required on the displays of 68 since the wheels are smaller objects than the vehicle. This display could be provided together with graduated measurement aids such as on-screen rulers, protractors or other measurement devices or on-screen measurement aids for the video image, as requested by the operator, to facilitate function 130. Alternatively the operator can supply physical overlays with inscribed rulers and protractors, or simply use those instruments themselves, to make these measurements directly on the screen of 68. If he so desires the operator can also print the images and use physical measurement aids to determine the desired measurements. The purpose of these measurements is determination of the horizontal (X) and vertical (Y) dimensions of the designated wheel or wheel assembly as seen on the designated vehicle.

It is preferable if not necessary to determine both the horizontal and vertical dimensions of the wheel assembly or wheel, both to determine whether sufficient foreshortening exists that it will have to be removed, and to be able to accurately calculate the actual rotation rate of the wheel assembly. The graphical technique for determining these dimensions can be analogous to that used for vehicle measurement, but the image view should preferably be along the horizontal plane generating a side view of the vehicle and its wheels, so that the wheel images are basically vertical and thus their dimensions easily measured. Once obtained, these data on angles and dimensions are all commanded to be stored in 70.

The operator then commands 70 to proceed to 129 to determine the frame rate being used by the video if not determined earlier, and to store it, and to calculate average vehicle speeds and smooth the data points, as a backup to the operator's measurements. This function could actually be accomplished at several other points in the process flow, and is shown as 129 for convenience. The operator then commands 70 to proceed to 132 to calculate the actual rotation rate of the wheel using its vertical dimension and the vehicle speed for the M frames, and store it. This is easily done referring to FIG. 15, which shows a wheel assembly in the vertical plane. The actual rotation rate of the wheel assembly will be $$TRR = \frac{V}{\pi D}$$

simply, where TRR is the actual rotation rate in revolutions per second, V is the vehicle velocity in meters per second, and D is the wheel assembly diameter in meters. Thus 132 calculates the actual rotation rate for every set of frames for which vehicle data was determined and stored, which could be discrete points or look like FIG. 16F, and stores the data.

The process then proceeds to 133 in FIG. 18 which is an optional function in which the operator assesses the accuracy of the data he has gathered, including vehicle speed, wheel angles, wheel dimensions, and wheel actual rotation rate for a selected number of frame sets at his discretion. This is so that if the quantities he has obtained do not meet criteria specified beforehand in 64, which were determined to assure that the image substitution is likely to be satisfactory, he can command 70 to send the process back to the beginning or to 126 and repeat the parameter determination using a different selection of frames, and/or their timing. As an example he could reduce the number of frames between the selected frames so that the average values determined were closer to the instantaneous values at all significant times. He could also alter the timing of the choice of frames so that the geometry is different and relevant parameters could be measured with greater accuracy than if the angles such as "a" were very small (or very large—close to 180 degrees). He could also use measures such as standard deviation and variance of the various measurements to determine accuracy. However, this step could be omitted once the system is checked out and the operator has gained sufficient experience to operate it satisfactorily.

The process then proceeds to decision function 134 in which the operator determines whether the (X) and (Y) dimensions of a wheel are substantially alike—that is whether the wheel is being imaged at about right angles to its axis. This is because if these measurements are very unlike each other there will be substantial foreshortening of the image and some operations to follow may be difficult to perform accurately. If that is the case the operator decides NO and commands 70 to proceed to 136 which expands the (X) measurement to match that of the (Y) measurement, making the image of the wheel substantially circular. If the decision was YES the operator commands 70 to proceeds directly to 138. An alternative to measuring the (X) and (Y) dimensions would be to measure the angle the wheel subtended to the video camera line-of-sight, which could be used in a like way to expand the (X) dimension by multiplying it by the cosecant of that angle. Another alternative would be to shrink the (Y) dimension to that of the (X) dimension.

The next step is to determine the number of spokes or other regular features in the now circular wheel images, and designate their number to 70, so that the proper choice of apparent vs. actual rotation rates graph can be chosen or made, and the proper wheel image modifications chosen and applied according to the Principal Algorithm. In this embodiment this determination is done by the human operator in 138 by simply counting their number on a frozen frame which is presented on command to the operator's display by 70, and sending that number back to 70. Since the number of spokes or regular features in a wheel do not change during the vehicle's appearance, nor during any subsequent appearance of the same vehicle, this measurement need only be done once for each different vehicle, and the determination can be done at the most convenient time or set of frames for the operator.

However, the choice of frame for the determination of number of spokes must be chosen so that the apparent rotation rate is between the L1 and L3 limits in FIG. 11A, or he is likely to just see a blur and be unable to count the spokes. Therefore, if the wheel's spokes are not clearly discernible in the first vehicle set of frames viewed in the first vehicle appearance the operator must search the video until he can get a clear spoke count, at which time he can return to the start of the vehicle appearance. To that end the operator commands the computer to play the video at any rate or series of steps he desires from any starting point he desires until he has found clear spoke images, whether rotating or at standstill, counts the spokes, and commands 70 to store that number. The assumption is made that all the wheels of a particular vehicle have the same wheel pattern, as is the usual case, particularly in new vehicle advertisement videos. Should that not be the case the operator would repeat these process functions separately for the different patterned wheels. As discussed previously, for a number of reasons the process functions 136, 138, 140, 141, and 142 may be performed separately for the steering and non-steering wheels, though they could be processed simultaneously if their (X) and (Y) measurements were nearly the same.

Alternatively this function 138 of determination of the number of spokes/pattern of the wheels could be accomplished in non-circular wheel assembly images without (X) or (Y) wheel assembly image dimension modification by the operator even if the wheel angles to the video camera are substantially different than 90 degrees, as long as the angle is considerably greater than zero or considerably less than 180 degrees, so that the foreshortening is sufficiently moderate so that a clear view of the spokes/pattern exists sufficient to permit their accurate visual counting. If that option were adopted functions 134 and 136, as well the eventual 158, could be skipped or omitted.

The process then proceeds to 140 in which the operator commands 70 to proceed to 141 to display on 68 the several actual apparent/true rotation rate graphs stored by 64, so that he can choose, in 142, the graph that most closely matches the current set of parameters including the frame rate and the number of spokes and designate that to 70, as well as assess whether the aliasing lines intersect the shaded area in FIG. 11A, and decide that this portion of the video is in need of image substitution modification. Alternatively the operator can simply request that the graph calculated for the proper frame rate and number of spokes be displayed for his approval or disapproval. In the former case the operator could choose the most appropriate from a number of graphs of wheel apparent rotation rate as a function of actual rotation rate for different values of the number of spokes and different video frame rates, such as illustrated in FIG. 11A, as each of these will be different. One option would be for sets of such graphs to be prepared ahead of time for many combinations of number of spokes, frame rate, and other parameters if appropriate, and supply them as part of 64, in which case the operator simply chooses the most appropriate one for his display. Another option would be for the computer to calculate and prepare a graph or groups of graphs on command for the particular conditions he has determined, and present that on his display. Whichever option is selected the operator can readily see all the features that are illustrated in FIGS. 11A-B, but prepared and calibrated for the specific wheel dimensions, number of spokes, and video frame rate of the particular vehicle appearance in the particular video being processed.

In addition the operator then can mark those portions of the video in which the wheel actual rotation rate is in each of the "modify" regions of the proper apparent/actual rotation rate graph chosen, corresponding to those regions of FIGS. 11A-B. This is in order to later enable the computer to make automatic image substitutions rapidly, once the operator has determined the times for those actions. The operator then commands 70 to store the time boundaries defining those regions in 70.

The operator next commands the computer 70 to compute in 143 the Values 1, 2, and 4, as required by the Principal Algorithm. Value 3 is not computed because it was part of the inputs of 66. The computer then determines whether Value 1 is greater than value 2 in 144, and if it is then in process 145 the computer decides whether Value 4 is greater than Value 3. If the answers to both is YES then the operator, in 147, decides to implement the blurring wheel image substitution strategy. If the answer from 144 is NO but that from the subsequent 146 is YES the operator then proceeds to 148 in which he decides that the right image substitution strategy is to reduce the number of spokes in the wheel image, to substitute a correctly rotating image for the vehicle speed and frame rate and number of spokes, or to partially blur the image, or some combination of all three. These decisions of 147 and 148 are communicated by the operator to the computer, which is commanded to prepare the appropriate image choices for those decisions for the operator, in 149. The functions 147 and 148 could also be performed by the computer rather than by the operator, with equal results. These choices prepared in 149 include number of spokes, rotational rate, and degree of blurring in accordance with the optional strategies of FIGS. 12A-C, and the operator would select from among the options using criteria pre-determined and supplied in 64, or he could use his judgment, and save the chosen strategy in 70.

The simplest strategy would be to substitute every frame image of a wheel in those chosen that are in one of the two "MODIFY" categories of FIG. 11B in accordance with the Principal Algorithm with the same image of a wheel of the same type and size, but whose image is well blurred such as would be due to rapid rotation, corresponding to line 76 in FIG. 12A, or whose number of spokes are reduced, or both. Since the tire may have uneven coloration or texture, and could also have letters and numbers visible, the tire as well as the wheel, namely the entire wheel assembly, could be modified so as to be blurred. This strategy anticipates that as a wheel's actual rotation rate increases or decreases and crosses the L1 or L3 threshold the image would rapidly change from one where the spokes are detectable to one where no spokes are detectable and the wheel is a blur; or the spokes are detectable but the apparent rotation rate of the wheel is now appropriate for the vehicle speed. At worst the false apparent rotation rate for low speed vehicles in which the number of spokes in the substitution image was reduced to the minimum but some blurring had also to be applied, would still be somewhat visible but much fainter and with low contrast than without image substitution, and thus would only be minimally perceived.

Alternative strategies to that in FIG. 12A could substitute modified images chosen or designed so that their apparent rotation rate is imposed to be that called for as a function of actual rotation rate commensurate with lines 34 and 72-74 in FIG. 11A, lines 34 and 80-84 in FIG. 12B, or lines 86 and 90-94 in FIG. 12C. Yet another alternative strategy would be to have a stored set of wheel or wheel assembly images for substitution, with different number of spokes or degrees of blur in each as though experienced at different actual rotation rates, each actual rotation rate being at a slightly different offset from a point at which an actual rotation rate/apparent rotation rate lines such as 34 and 30 in FIG. 11A cross level L1. The difference from the first strategy is that the eye may perceive subtle differences in different substituted images that appear to rotate at actual rotation rates too high to fully resolve the spoke patterns, but yet may be more natural looking as the vehicle speed and actual wheel rotation rate vary at or near the boundaries of the two "MODIFY" true rotation rate regions in FIG. 11B.

Whichever strategy is chosen the operator then commands 70 to proceed to 149 which prepares the pertinent choices for the wheel image modifications in accordance with whatever strategy decisions were made in 147 and 148 and stores them for presentation to the operator. The process for the actual preparation of the substitute wheel images that are blurred or have a reduced number of spokes or both can vary so long as the product is, or are, wheel assembly images whose shape, size, and color match that of the original wheel assembly images except for the modified portion containing the desired spokes or design features. One approach could be taking an actual image from a frame which is in a high but blurred actual rotation rate range of FIG. 11A. Another approach could be generating a graphic design of the wheel in rapid rotation, and imaging it. Yet another could be generating a series of such graphic designs, but with each at a different rate of rapid rotation. Yet a different option would be to take one of the wheel images and morph it so as to appear to be rapidly rotating. Yet another would be to generate an image of a wheel with a smaller number of spokes than the original. Yet another would be to produce a wheel image that has both fewer spokes and is also somewhat blurred. There are surely more options, though any one would probably accomplish essentially the same objective though under somewhat different conditions. There are software programs in common use that could readily accomplish any of them.

However the modification options are designed, computer function 149 then sends a sample of each to the operator function 154 in FIG. 19 so that the operator can make his choice from the visual or other choices offered as to which wheel image or images to use in the actual video frame modifications. He can assess these in conjunction with the previously selected apparent/actual rotation rate graph and strategy and proceed to 156 in which he decides whether the modified wheel images presented to him in 154 were sufficient or whether rework or new choices are desired. If his decision is NO (not to accept) he commands the computer to send the process back to 149 for a repetition loop. If he decides YES that means that he has decided that no new images are needed and has verified the choice he made in 154, which he has already stored in memory in 70. If his decision in 134 was no, meaning that the wheel dimensions along X and Y axes were not sufficiently alike and he therefore sent the process to 136 to expand the horizontal X dimension so as to circularize the image, he then commands 70 to pass the process to function 158 which performs the reverse of function 136, and compresses the (X) dimension of the modified wheel image back to the (X) dimension of the original image's measurement in the video. If his decision in 134 was YES then no (X) expansion was done so no compression will be required, and he commands 70 to proceed directly to 160.

In process function 160 the operator commands 70 to proceed to 162 to sequentially step through all the frames of the selected time range one by one and insert the selected modified wheel images into all the frames in that time range of the original video, and store them all. The actual modification of each selected frame of the video with the new images can be accomplished in a number of ways. The modified image must be sized so as to match the dimensions of the original image and its color, texture, degree of "blurriness", and/or number of spokes must each be appropriate for the actual rotation rate being addressed. If it was designed as a new graphic image in rapid rotation its design of that pattern must be realistic and its depicted rotational speed must be appropriate for the desired effects. The modified wheel or wheel assembly image can then be simply "pasted" into the wheel or wheel assembly image after the original wheel image was "cut", much as is done in computer presentation graphics programs in common use. Or the image can be appropriately "morphed" and integrated into the set of bits that represent the original wheel assembly image, thus replacing the bits representing the original wheel assembly. There are also other software techniques in common use that can accomplish the equivalent. The net result, however it is accomplished, will be a wheel assembly image for every modified frame in which the wheel assembly appears as the new, modified image rather than the original.

In performing these modifications 162 would step through the designated time range to be modified one video frame at a time, perform the modification, store the modified image frame, and proceed to the next frame, repeating the operation until done. When complete the computer then sends the proceeds to 164 for collecting the modified and unmodified frames in the time range, which then proceeds to 166 to actually produce the required temporary video incorporating both the unmodified and modified frames in the proper sequence, and sends that video 168 when done. The assembly of unmodified and modified frames by both 164 and 166 assures the best accuracy. The operator then observes the temporary video of the selected time range in 168, either step by step or straight through, so that he can make a quality assessment of the modification process. If the operator feels that the quality of the temporary video is lacking he decides NO in his decision function 170 and commands 70 to send the process to 172 to repeat steps 154-170 one time.

This repetition, which is a combination of machine functions and human functions executed by machine, will conclude with the process in function 170 again. Once the operator views the new temporary video in 168, if he now feels that the quality is acceptable he makes a YES decision in 170 and commands 70 to send the process to 174 in FIG. 20 and simultaneously sends a signal to 70 to accept the temporary video of the first chosen time range for the first vehicle appearance and to place it in storage. If he feels that the quality is still unacceptable he can command 70 to send the process to 172 again in the hope that it will be corrected, or he could elect to send the process back to an earlier step between 126 and 168 at his judgment. He can also command 70 to abort the entire process as something is clearly not working as intended, and start all over from the beginning by sending the process all the way back to the beginning in 120.

Once in function 174 the operator returns the process to 126 and selects a different time range to be modified in the video of the vehicle during its appearance, should there be more than one, and commands 70 to proceed to 176 to cause a repetition of steps 126-170 for the new choice of time range, storing all appropriate data in 70. Once the process makes it successfully to 174 again he continues to choose time ranges in the vehicle appearance and commanding 70 to proceed to 176 to repeat its functioning for every time range until there are no time ranges left that require modification of the wheel images. He then proceeds to function 178 in which he commands 70 to send the process back again, but this time to 120 to choose a different wheel assembly of the same vehicle should there be reason to do so, and commands 70 to proceed to 180 to cause a repetition of steps 120-170 for the new choice of wheel, including possible repeat loops and operator decisions as before, and data storage in 70. He then proceeds to 182 in which he commands 70 to return the process to 120, display the original video again from which he selects a different appearance of the same vehicle, if any, for processing or a new appearance of a different vehicle, if any. He then commands 70 to send the process to 184 which coordinates stepping through of the entire process for the new vehicle appearance, from 120 through 170.

This process is repeated until all the time ranges requiring modification for all the wheels in all the appearances of all the vehicles have been modified, and their quality accepted, at which time he commands 70 to proceed to 185 to assemble all the modified and all the unmodified video frames of all the time ranges addressed, for all wheels addressed, and for all the vehicle appearances, into a properly sequenced new continuous video.

The operator then proceeds to a final quality check in 186 in which he is shown the complete final video stream from 185, on his command. He then makes a decision in 187 as to its overall quality. If acceptable, using criteria from 64 or his own judgment, he decides YES which commands 70 to proceed to 188 to make one or more recordings of the modified video in one or more media types and formats, which are then ready to be made available for distribution to media instead of the original video 63, which is the end of the program steps. The recording(s) can be made as software, if such is the medium to be distributed, or if hard media by any machine capable of that task, whether it includes 70 or is simply turned on by 70. If the operator deems the final quality unacceptable he can command 70 to send the process back to 120 or another step to repeat the process, or simply abort. Whereas the default decision of 170 should be YES so that the process can be given more chances to perform as intended, the default decision in 187 should be NO so that a poor quality product will not make it all the way to a final output without a conscious decision by the operator to do so.

The result of the modification of the wheel images of this process will be wheels perceived to be correctly rotating for every time range when the vehicle speed is low, as shown in FIGS. 21A-21L, in which a wheel is seen as rotating appropriately for its actual rotation rate. These figures show precisely the same wheel assembly 21 with the same imaginary reference circle 23 on the tire, rotating at the same rate, and shown at the same precise intervals of time as were shown in FIGS. 3A through 3L. In this case, however, as seen against the same stationary imaginary vertical reference marks 25, each wheel image at each instant of successive time at the same frame rate has the original image replaced by a new image whose rotational position is appropriate for the actual wheel rotational speed. Therefore the sequence of images in FIGS. 21A through 21L now has the wheel assembly shown to be always in the proper orientation that it would have were it to rotate in the video as perceived by a human viewer at the same rotational speed and direction as the actual physical real wheel assembly. The same result will be obtained by image modification of the conditions of FIGS. 4A through 4L even though the actual wheel rotation rate is different than that of FIGS. 3A through 3L.

The result of the operation of the Principal Algorithm when the actual rotation rate is not low, that is when it is above TRR-1 in FIG. 11B, is that the wheel images are always deliberately blurred so as to prevent the spokes or other patterns to be perceived as rotating at all, which is appropriate at speeds above the blur limits of L1 or L3 in FIGS. 11A-B. This effect is illustrated in FIGS. 22A-22F, in which the likeness of rapidly rotating, blurred images of the wheels are illustrated as concentric dashed lines which are circumferentially similar if not identical, and have no spoke detail discernible. While this would clearly eliminate all inappropriate apparent rotation rate perception the option exists, if desired, for including some differences in the modified images of FIGS. 22A-22F in their degree of blurriness, in some vestigial pattern that is dimly or subliminally perceived by the viewers in the interest of more realism as vehicle speed changes, or some deliberate patterning.

Thus, as a result of the operation of the Principal Algorithm as implemented in this first embodiment the inappropriate apparent rotation of the wheels will have been remedied by wheel image substitution of several different kinds, only where necessary and appropriate for all wheel actual rotation rates and for all vehicle speeds up to any practical limit desired, and the undesirable effects of the stroboscopic aliasing will have been completely eliminated; the image modifications and substitutions are such as to be undetectable by the viewer; and the process has produced an entirely new and unexpected result: the absence of apparent inappropriate rotation rate of wheels that do not correspond to actual vehicle speed as seen in video displays of moving vehicles. It will be understood that a case in which the actual rotation rate of the wheel assembly is in between those exemplified in FIGS. 3A through 3L and FIGS. 4A through 4L, or rotating at greater or slower speeds, or containing wheel images with fewer or greater number of spokes or patterns, or recorded at different video frame rates would yield analogous results, all of which would be properly corrected for their respective conditions.

Since the process is off-line and thus does not operate in real time the iterations can be repeated until the operator is satisfied that the proper quality product has resulted from the flow process of this embodiment, and that the inappropriate apparent rotations of the wheels in the video have been adequately modified and now appear correct. While the steps of the process in this embodiment will accomplish its objectives, some steps may not be necessary and might be omitted, while some may be combined into fewer steps. An example is the omitting of steps 134, 136, and 158 which made the wheel image circular for easier measurements and operations, and then made it non-circular again to match the original wheel shape. In this case an option exists to perform all operations on the non-circular wheel images, which will be elliptical, since there are software programs that could perform the counting of the spokes and wheel sizing operations on elliptical images rather than on circular ones. While this would save some complexity and time there are limits to the ellipticity that can be accommodated in such operations due to the inherent noise and inaccuracy involved in measurements on small quantities which could decrease the accuracy of the image substitution process, and thus such techniques could be used providing the angle of viewing of the wheel with respect to its axis is not close to zero or 180 degrees.

Also some steps identified as machine steps might be more easily performed by the operator, or vice versa, there being a number of alternates to this embodiment using fewer or greater number of steps, or exchanging human and machine steps, which would be similarly effective while still maintaining a similar degree of control of the human operator over the process and its results, which is the intent of this embodiment. Thus it is understood that such possible variations are recognized and intended to be fully within the scope of this embodiment. It will also be understood that when human decisions or actions are identified in the process flow they are either commands to the computer to perform specific functions, observations that result directly in such actions without commanding the computer, or responses to requests by the computer for actions or decisions, all of which are human functions executed through and by the computer, and also intended to be fully within the scope of this embodiment.

The new images can also be made deliberately different from the original if desired, such as featuring a different wheel structure, pattern, shape or color. In fact the embodiment also would permit specific rotational or stroboscopic effects to be imposed on the final video stream to deliberately create some wheel apparent rotation speeds, whether constant or variable, or lack of them to replace the proper or otherwise apparent rotation speeds; or create new patterns that could change in time and space and could cause images or patterns to move within the wheel radially or circumferentially or both, or create other images-within-images should specific effects be desired.

In fact it is quite possible to generate specific images of people, animals or products which could be animated and appear instead of the spoked wheel images, or appear to emerge out of the wheels, and be used for advertising, artistic, or other purposes. These images could appear, move about, speak or just show or point to a specific product or company logo, and would represent a new dimension in advertising. As just one of potentially thousands of examples, when the vehicle in a video appears to travel at right angles to the viewer's line of sight an image of a person could partially emerge from the otherwise blurred wheel up to about their waist, extend a product toward the viewer, and recite some of the product's characteristics that are being advertised. There could also ensue some morphing of the product showing a satisfied user, being a human or, say, a cat gleefully eating the product. At the conclusion of such an "ad within an ad" the person and product could return into the wheel and the vehicle proceed apparently untouched by the ad campaign. Another possibility is that the object emerging from the wheel is the driver himself, and is shown as operating some aspect of the vehicle including the control centers of the dashboard or other vehicle features that the manufacturer wishes to promote. This option makes double use of the vehicle video, promoting the car on the basis of its external appearance as well as on the added basis of some of its internal features.

This embodiment can operate regardless of the speed of the vehicle or the particular design of the wheels, wheel covers, hub caps, or other structure and thus, unless specifically so desired, can effectively create apparent final wheel rotation rates that are appropriate whether the vehicle is accelerating, maintaining a given speed, or slowing down. The wheels would also be seen to stop rotating when the vehicle speed is reduced to zero.

Detailed Description of the Second Embodiment
(which is the Currently Preferred Embodiment)

This embodiment is a method for a fully automated process implemented on a specific computing machine which is intended to operate in real time and in-line with streaming video services, with optional and then very limited human control of the machine. This embodiment corrects rotation rate of the images of wheels of vehicles in a video which are perceived in user displays as being inappropriate in direction of rotation or rotation rate for the actual vehicle speed, replacing them with images whose rotation in viewer displays cannot be perceived by eye while leaving unchanged the images of wheels whose rotation rate is perceived by eye to be appropriate for the actual vehicle speed. This embodiment addresses the wheels of a vehicle and multiple vehicles in a video serially.

Figures in this embodiment: FIGS. 5 through 22(A-F) from the previous embodiment, and 23-25.
190 Detecting a vehicle and its wheels, autotrack
192 Optional manually identifying a vehicle or start process
194 Selecting timing and strategy, setting M frames and target frame
196 Providing image rotation and measurement resources
198 Determining vehicle speed, direction, angles, ranges
200 Determining video frame rate and counting the number of spokes of one wheel
202 Determining the vertical and horizontal dimensions of a wheel
204 Making a decision as to whether the wheel dimensions are about equal
206 Expanding the horizontal dimension until it equals the vertical dimension
208 Determining the wheel actual rotation rate over a set of N frames
210 Computing the Values 1-4
212 Decision as to whether Value 1 is greater than Value 2
214 Decision as to whether Value 4 is greater than Value 3
216 Decision as to whether Value 4 is smaller than Value 3
218 Choosing to replace wheel image with one that is blurred
219 Optional human review
220 Choosing to replace wheel image with one with one having fewer spokes, is blurred, rotates at Value 4, or combinations of these remedies
228 Decision function as to whether 204 was YES or NO
230 Compressing the horizontal dimension back to its original length
232 Buffering and adjusting the size of the wheel modification image
234 Insertion of the modified wheel image into the target frame
236 Optional visual quality check
238 Decision as to quality
240 Decision as to timing and quality
241 Repetition of functional steps for another wheel on the same vehicle
242 Repetition of functional steps for another vehicle appearance
243 Optional fast accumulation and assembly of frames into a new video
244 Provision of fast video switch
245 Distribution of the video stream to users
246 Optional final quality decision
248 Optional operator visual quality checks The process begins and proceeds throughout this embodiment under the control of 70, which implements all the functional steps discussed and shown in the process flow diagrams. The process starts with computer function 190 in FIG. 23 with the computer software accessing the start of the video, which is illustrated in FIG. 13 as point A. 190 then autonomously identifies, designates, and begins tracking the vehicle's first appearance in the video, such as shown in the illustration of FIG. 13 as the point B of the vehicle's appearance, 96, and tracking its wheels. This function would use object recognition software similar to the ubiquitous "face recognition and tracking" software in common use in cameras or "shape or feature identification" software in common use in billboard or advertising message recognition and substitution programs. Any of these or similar programs would operate on the vehicle shape, features, or its wheels or all of these. It is anticipated that the first appearance of a vehicle in the video stream would be used to start the process, though any appearance of any vehicle could also be used, keeping in mind that since it operates in real time, in this embodiment the inappropriate apparent rotation rate of the wheels can only be modified forward in time from the time of first vehicle identification and track.

An option is provided in function 192 for an operator to identify and designate the vehicle to 70 while viewing the video 63 on 68 as the first step in the process, and is provided as insurance against the process having unexpected difficulties at its initial trials. Alternatively the operator can simply initiate the machine process by a "start" command to 190. The operator could also initiate the process by an even simpler switch actuation which would power or alert 70 to the fact that its functions are now desired, so as to prevent it from operating all the time on a video feed and rather only when and if so desired, and could also be manually turned off when not desired. Nonetheless, as it is intended that the process be automated in normal operations so as to minimize processing time delays, it is intended that 70 and the process starting with 190 to be active all the time. This could be implemented by 192 after the automated vehicle recognition function works as desired, has been well tested and is now believed to work reliably enough, and has a low inappropriate start rate, as would be determined by analysis, experience, or both.

Once the process is started 190 begins observing the video image stream to detect and identify the first appearance by a vehicle in the video stream, following the instructions, data, and criteria of 64, and designates the vehicle by a unique identifier code. The function then similarly detects, identifies, and designates its wheel, or both wheels should they both be visible in the video, and begins tracking the vehicle and each wheel separately. Function 190 also continually observes the video stream to detect if the vehicle makes more than one appearance, when it disappears, or when a second vehicle makes its appearance and disappearance, shown as point D and curve 98 in FIG. 13. Function 190 stores each vehicle and its wheels' identification in memory. Since the two visible wheels of the vehicle may have a different shape when the vehicle is turning, and since a second or even third or fourth vehicle may make an appearance simultaneously with the first vehicle, it may be necessary to track and modify at least four different wheels in essentially the same real time period an possibly even more.

The process then proceeds to 194 which selects one of the vehicle's wheels and sets the timing strategy for the embodiment. This strategy has options, illustrated in FIGS. 24A-24D, keyed to the frames which appear at the video frame rate as a function of time, shown in FIG. 24A, and beginning with $T_0$. FIG. 24B illustrates the time that various functions in this embodiment require for their operation, beginning with the time required to designate the vehicle, labeled as DV; followed by the time required to designate the wheels, labeled as DW; followed by the time required to determine the vehicle speed, labeled as M; followed by the time required to determine the wheel assembly dimensions, labeled DD; followed by the time required to determine the number of spokes in the wheels, labeled as N; and lastly the time lag for the process to step through all the functional steps in the process including image modification and substitution, labeled as S.

The length of these functions as shown are purely as examples, and could require many more frames or fewer frames in actuality. If these steps are executed serially they will appear as shown in FIG. 24B and the total delay indicated as $T_1$, which would be the first frame that could be modified by the process stepping though its steps in this embodiment. However, the designation of the wheels and the measurement of the vehicle speed could start in parallel as they are not dependent on each other, and the measurement of the number of spokes could start independently also. The counting of the number of spokes can also occur in parallel with the vehicle speed measurement, but the wheel dimension determination must follow the vehicle speed determination, and the system total processing time must necessarily be additive to all the other functional times, so that the total time could be reduced to $T_2$ in FIG. 24C by paralleling some functional steps. In addition, once the process has stepped through and modified the first frame image, the process for doing so for the following frame images can be considerably shorter as long as it is within the same vehicle appearance. This is because only the vehicle speed and the wheel dimensions must be measured, and with the unavoidable system time delay the total delay could be shortened to $T_3$ in FIG. 24D.

The functioning of 194 requires that the total system time delay be measured and stored, which would be done by the equipment manufacturer, and possibly also calibrated in the installation by the operator during the set-up process. As a result of the foregoing 194, with inputs from 196, selects all the process steps to occur serially for the next video frame if the vehicle appearance is new, or optionally instructs that steps such as 196, 198, 200, 210-220, and all of 190 except its scanning for the presence of the vehicle, be skipped if the vehicle appearance is continued from the previous frame.

The process then proceeds to 198 to determine the vehicle speed, direction, and angles which will be needed in order to determine the wheel actual rotation rate, which in turn is necessary for the image substitution process. The process of determination of these parameters can be based on a geometry similar to that of FIGS. 14 and 16A-F and using frame designations, and implemented by a process similar to that described for the first embodiment, except that all process steps are accomplished by the computer rather than by the operator through the computer, and aided by 196 which provides image rotation, coordinate transformation, and measuring software resources to accomplish its task. While the precise length of the vehicle will generally not be known in advance, this being a real time embodiment intended to be on-line in a video feed all the time, the computer uses estimates of vehicle lengths supplied in 64. However, it may be possible to determine a more precise measure of the length by comparison of the vehicle, seen from the side or above by coordinate transformations or rotations, with elements in the scene background whose size is known a priori, such as flagpoles, buildings, people, or other fixed or moving objects whose dimensions are generally known or supplied to 70 at the outset. While the accuracy of determination of the vehicle velocity will be limited by the approximate length knowledge, it may suffice for the purposes of this embodiment.

Once the vehicle speed and direction are known for the vehicle appearance in the video the process proceeds to function 200 which determines the video frame rate and counts the number of spokes in the wheel. The computer obtains the video frame rate by simply counting the time elapsed between video frames, which could take as little as two frames, and stores it. Determination of the number of spokes requires a finite period of time. To obtain the number of spokes the computer accesses the digital data representing a wheel assembly and wheel image, and scans the digital data in a pattern equidistant from the center of rotation of the wheel, or of the centroid of the wheel image, whichever is easiest to implement, and counting the number of times that the magnitude of those data exceed some threshold. This way the number of spokes or regular features could be readily determined. Counting the times when the data falls below a threshold might also alternatively be used, as well as other methods. The assumption is made that all the wheels of the vehicle have the identical wheel pattern, as is the usual case, particularly in new vehicle advertisement videos. The implementation of the counting of the spokes is very fast as all it requires is scanning a set of digital data points, which can be done very much faster than the time of one frame of the video. Function 200 could be placed earlier or later within the process flow, and is shown as placed for graphical convenience.

The process then proceeds to 202 to determine the horizontal and vertical dimensions of the designated wheel assembly and wheel. These quantities can be determined by commonly available software that measures the vertical and horizontal extent of the wheel and wheel assembly data relative to the size of a known object. In this case it could be the length of the vehicle, which was estimated previously, or the height of a person or other object in the scene whose size is known or can be approximated. A more accurate determination might be a simple counting of the data elements in an array relative to data from a known object. Alternatively the computer could simply access a lookup table of common wheel assembly sizes for a number of different vehicle brands and models in various countries, and accept the uncertainty in actual rotation rate that would result from not knowing the exact size, but which may be sufficiently accurate for the purposes of this embodiment.

The process then proceeds to 204 which is a computer decision function, similar to that discussed in the first embodiment except for being entirely automated, which compares the dimensions (X) and (Y) of the wheel to determine if they are similar to each other or very different. If the function makes a YES decision it passes the process to computer function 208 for further action, and if NO to computer function 206 to modify the wheel image dimensions so that they become substantially circular.

The criteria used by 204 to make the decision can be fairly loose, because foreshortening is a cosine function of the angle at which a circle is observed, and a few tens of degrees off normal viewing geometry causes little image non-circularity. The opposite is true of course, when viewing a circle close to right angles to the line of sight, in which case the cosine function is rapidly changing. To that end function 206 simply expands the (X) dimension until matches the (Y) dimension, making the dimensions substantially equal. Alternatively the (Y) dimension could be decreased until it matches the (X) dimension, to the same end. Either of these operations would take place in the digital domain and are very fast. The computer could measure the two dimensions and use the secant of the vertical to expand the horizontal, if desired, to the same end. If the images are small or the video noisy it would be better to invoke the former to avoid noise-induced errors. When complete the process proceeds to 208.

Function 208 determines the actual rotation rate of the wheel assembly over an averaging number of frames, identified as "N" frames, in a similar way as described in the first embodiment. Once the actual rotation rate during the N video frames is known, the process proceeds to 210 which calculates the Principal Values 1, 2, and 4 using information gathered in the previous steps as well as provided a priory to 70, in a manner completely analogous to that described in the first embodiment. This, together with the Value 3 which was provided in 64, will enable the operation of the Principal Algorithm to determine what the wheel image substitution strategy shall be. Function 210 then proceeds to 212 which decides whether Value 1 is greater than Value 2 and if so passes process to decision function 214 and if not passes it to decision function 216. 214 decides whether Value 4 is greater than value 3 and if so passes the process to 218 which selects the method of replacement of images with blurred ones. 216 decides whether Value 4 is smaller than Value 3 and if so passes the process to 220 which selects replacement wheel images that have fewer spokes than those in the original video, rotate at Value 4, or have a degree of blurring or combinations of these. These decisions are in accordance with the regions so identified in FIG. 11B, and implement the Principal Algorithm as was described in the first embodiment.

Functions 218 and 220 also select appropriate wheel image modification strategies such as illustrated in FIGS. 12A-12C using similar rationales and choosing from among similar choices that were discussed in the first embodiment, except that the process is entirely automated.

The process ten proceeds to computer decision function 228 to determine whether the wheel images require de-circularization. In order to determine that 228 accesses the decision made by 204 to determine whether the wheel dimensions (X) or (Y) were modified to attain circularity. If the 204 decision was YES then no circularization was done and the process proceeds directly to 232. If it was NO then the dimensions were modified to attain circularity and the process proceeds to 230 to perform the inverse operation and de-circularize the image back to its original shape for insertion of the modified wheel images. To do that it would compress the (X) dimension of the wheel image back to the same dimension that it has before 206 expanded it The process then proceeds to 232 which is a function that buffers or holds the data for the wheel assembly and wheel image to be inserted into the frame to be modified and measures its dimensions, shape, and size, and adjusts them so that they match the stored dimensions in the original wheel assembly dimensions, should they require any adjustment. In that sense this a "vernier" adjustment to fine-tune the size adjustment and dimensions so that the new images will be seen as seamlessly replacing the original ones when the image replacement is actually performed. The sizing adjustment is a simple scaling in the software, and the criteria for size match are contained in 64.

The process then proceeds to 234 which performs the insertion and replacement of the original wheel assembly image with the modified wheel assembly image into the first attainable targeted frame. The targeted frame was designated by 194 as part of the overall process timing strategy, taking into account all the sources of time delay in the process. The actual modification by 234 of each selected frame of the video with the new images can be accomplished in a number of ways and with criteria similar to those described in the first embodiment except for being wholly automated and thus skipping the operator steps.

The process then proceeds to 240 which is an automated decision function with software means to assess whether the timing or quality of the modification, if approved, would meet the criteria laid out in 64. This approval process could consist of simple counting and parity checks to verify that the proper images were sent to the proper target frames. It could also be more complex measurements of the wheel or wheel assembly dimensions as modified in several frames, and comparing them with the original dimensions, and measuring the maximum allowable differences as specified in 64. Function 240 could also be used to start human operator checks in the setup and troubleshooting phases, and then later bypassed for in-line automated operations. Should the automated checks in 240 indicate that the quality is lacking the process can be sent to an optional operator quality check in 236 in which the operator decides whether the modified wheel images prepared by 234 and presented to him were satisfactory or whether rework or new choices are desired, and he proceeds to his decision function 238. If his answer is NO he commands 70 to return the process back to 194 or a later step for a repetition loop. If he decides YES then he commands 70 to pass the process to 241, 242 or 243. This is the same outcome from 240 had the automated quality check resulted in a YES decision.

It is important to note that this operator function is completely optional and intended for off-line use. It would be of greatest utility in the set-up, checkout, and initial learning operations of the process, during which operator intervention might be necessary in order to make changes necessary for smooth functioning with minimal delays. It would be expected that once the process is shown to be reliable and with low missed inappropriate rotation recognition and correction rates and a sufficiently low false alarm rate, that the operator function to start over would be only rarely invoked. Furthermore the functions 238 and 240 also have a YES default outcome to be used with the process on-line mode which, if the operator has not made a NO decision within a prescribed time window, the YES outcome is the default decision in order to introduce minimum delay into the process. In addition, the computer can be instructed at the outset of installation by the operator, either through 64 or by commands, to deactivate functions 236, 238, and 240 after the initial period if they are no longer felt to be necessary, in order to reduce system time delays as much as possible.

241 is a sequencing function that coordinates and executes a series of steps and commands 194 to select and designate another wheel in the same vehicle, thus repeating steps 194-240 as long as the vehicle is visible in the video, and skipping steps 198, 200, and 210-220. This could result in the second wheel's image being inserted in the same target frame selected as the first attainable due to reduced number of steps and the now calibrated delays, but it could also be inserted into another frame slightly later in time. This process could be continued with 241 choosing alternate wheels in the vehicle so that each gets modified in every other frame. While both visible wheel images of a vehicle would thus be modified rapidly, in time every frame might have one wheel with the original image and the other wheel with the modified image, with less than ideal results. A better alternative would be that the image of the first modified wheel, or the entire vehicle with one modified wheel image, could be put into buffer storage by 232 for one frame and then 234 could insert both the first stored modified wheel image and the second modified wheel image simultaneously into the second target frame.

That process could be continued alternating which wheel image is stored so that every frame has inserted into it the latest modified image of one wheel and the previous modified image of the other wheel. That way only modified images of wheels are passed to the process output, with every frame having one wheel whose image lags one frame behind the other, the wheels taking turns which one lags the other. Though introducing an additional one frame of delay the results would be high quality modified apparent wheel rotation rates as the eye of a viewer cannot detect such rapid changes and construes both wheel images to be continuous.

The continued presence of the vehicle can be assured either by 190, which can continually scan for its presence, or by communications between 241 and 190 which can be coordinated so that the functioning of the process would stop when the vehicle or its wheels are no longer visible in the original video. However, should another vehicle appear in the video while the first vehicle is still visible this scanning for vehicles by 190 can alert 241 which passes the process to and commands 242 to assume essentially the same sequencing function as 241 in parallel so that both vehicles and their wheels are tracked, and the proper wheel images are modified and inserted into the video for the second vehicle as well as for the first by 234. In any case, 242 would then repeat 190-241 in scans for another vehicle's appearance.

This implies that there could be up to three modified wheel images in buffer storage at one time, to be introduced along with the most recent modified image of a fourth wheel, into the vehicle in the target frame, and that in that case up to every fourth frame could contain these modified images. Since the modified images of wheels would only be modified to either make them blurred, possibly with one uniform blurriness or perhaps with one that varied somewhat with actual rotation rate, or with wheels with fewer spokes, or rotating at the appropriate rotation rate for the vehicle speed and wheel assembly diameter, it is doubtful that even having three frames delayed out of four by a maximum of ³⁄₆₀ of a second would be very noticeable in the video by the observers' eyes. The software implementation for either of these options is similar and can be accomplished readily by any programmer normally skilled in the art.

The process then proceeds to 243 which is an optional function that assembles and accumulates the modified and unmodified frames in the proper sequence of the original video into a temporary video segment, which can be shown to the operator for his approval off-line during the installation and checkout process, if desired. If so the process proceeds to 248 in which the operator views the temporary video segment prepared by 243 during which he would be able to see the effects of the image modification process. While this may not be very useful in actual on-line use because of the very short times available and the very undesirable time delays incurred, it would be extremely useful in the initial familiarization, operational practice, and checkout process, as well as for troubleshooting. The process proceeds to 246 in which the operator decides whether the quality is adequate. If YES, which is the default decision, he does nothing. If NO he commands 70 to send an interrupt signal to the fast switch 244. This optional operator quality check is also available after 241 and 242 if desired, both also off-line.

The output of function 242, and that optionally of 243, represent the new video stream modified as appropriate, and the process proceeds to function 244 which is a fast video switch, implemented either in software or in hardware or both, that has the ability to switch between the original video 63 and the modified video in a time shorter than one video frame. The normal setting of the fast video switch is to pass the modified video stream from 243. This "interrupt" switching function would be enabled by command from 246 to 70 or directly from 246 to 244 to activate the switch if the operator decided the quality was not acceptable, which would result in the almost instantaneous streaming of the original video. Therefore if the operator deems the final quality acceptable and does nothing, the fast video switch 244 will continue to stream the modified video to 245, which is his default outcome in 246. Therefore the activation of 244 results in effectively interrupt and sidetrack the image modification process until that command is reversed, but having no effect on the original video stream from 63 which then continues to stream to be distributed by 245 to the media and the users/viewers. While the modified video would be sidetracked the process could be kept operating until the decision was made to switch it back to the modified video stream by commanding 70 to deactivate the switch 244. The inclusion of this operator optional intervention assures that a poor quality product will not make it all the way, even in the checkout process, without a conscious decision by the operator let it do so.

Should the operator determine it advantageous, or there were instructions in 64 regarding trying again after some elapsed time so state, the operator can reverse his decision to stream the original video to 245 by overriding his decision made in 246 and commanding 244 to once again pass the modified video stream to 245. This can be repeated as often as the operator or the instructions of 64 deem it necessary. Nonetheless, whether so instructed in 64 or by operator decision, one or more or all of the optional operator assessment and intervention functions can be omitted from the repeat sequences of steps commanded by 241, 242, or 243 as well as 219. Thus the process can be limited to a wholly automatic and autonomous process with absolute minimal time delays that can be "on-line" all the time without operator participation, since that is envisioned as the normal mode of this currently preferred embodiment.

As in the first embodiment the functioning of the process produces a video of the vehicle or vehicles in which the wheels appear to be rotating at rates appropriate for the vehicle speed, as illustrated in FIGS. 21A-21L for low speeds, or appropriately blurred as illustrated in FIGS. 22A-22F. The output of 245 is a seamless video stream containing either the original or modified video frames or both in whatever sequence the process attained, which is distributed to the media and users in the usual manner of conventional streaming video. This process will assure that the viewers will be generally unaware of any inserted wheel image modifications, and at the worst case will be watching the original video or some segments of it with unmodified wheel images at certain times.

While the steps of the process in this embodiment will accomplish its objectives, some steps may not be necessary and might be omitted, while some may be combined into fewer steps. An example is the omitting of steps 204, 206, 228, and 230 which made the wheel image circular for easier measurements and operations, used a circular modified image, and then made it non-circular again to match the original wheel shape. An option also exists to perform all operations on the non-circular wheel images, which will be elliptical, since the are software programs that can perform the counting of the spokes and wheel sizing operations on elliptical images rather than on circular ones. While this would save some complexity and time delay there are limits to the ellipticity that can be accommodated in such operations due to the inherent noise and inaccuracy involved in measurements of small quantities which could decrease the accuracy of the image substitution process, and thus such techniques could be used providing the angle of viewing of the wheel with respect to its axis is not close to zero or 180 degrees.

Description of the Third Embodiment

This embodiment, much as does the first embodiment, envisions a process that relies substantially on the operator and his perception and skills, and is human controlled. However, every human function results in a command to the machine which then executes the command. The machine is comprised of a specific computer running specific software, algorithms, and instructions; and related input-output devices. The machine aids the operator by providing information and displays, making calculations and operations whether requested by the operator or self-determined, keeping track of the current step in the process with respect to all the steps of the process, and executing the operator's commands. This embodiment corrects rotation rate of the wheel images of vehicles in a video which are or would be perceived in user displays as being inappropriate in direction of rotation or rotation rate or both for the actual vehicle speed, following a number of specific algorithms and a Principal Algorithm for making the decisions to modify or not to modify the wheel images, and the nature of the replacement images to use. The implementation of this Principal Algorithm will result in wheel images whose apparent rotation is always appropriate for the actual vehicle speeds.

This embodiment is also oriented toward off-line functioning, such as processing a video recorded in electronic memory or in hardware form such as disc or tape, to correct inappropriate apparent wheel rotations in one or more vehicles appearing therein, and whose end product is another recorded video but with wheel rotations that appear appropriate for the vehicle speed throughout the video. This embodiment thus allows all steps and operations to be performed at leisure, and performed multiple times if necessary until the results are satisfactory, since the results of the embodiment are simply a corrected recorded video to be played later. This embodiment is similar to that of the first embodiment except that it employs vehicle speed estimation by the operator rather than its measurement by software, which allows fewer steps and less complexity at the cost of reduced accuracy. This embodiment also addresses serially the wheels of a vehicle and those of multiple vehicles in a video.

Figures in this embodiment: FIGS. 5 through 22(A-F) from previous embodiments, and FIGS. 26-29.

Figure 26:
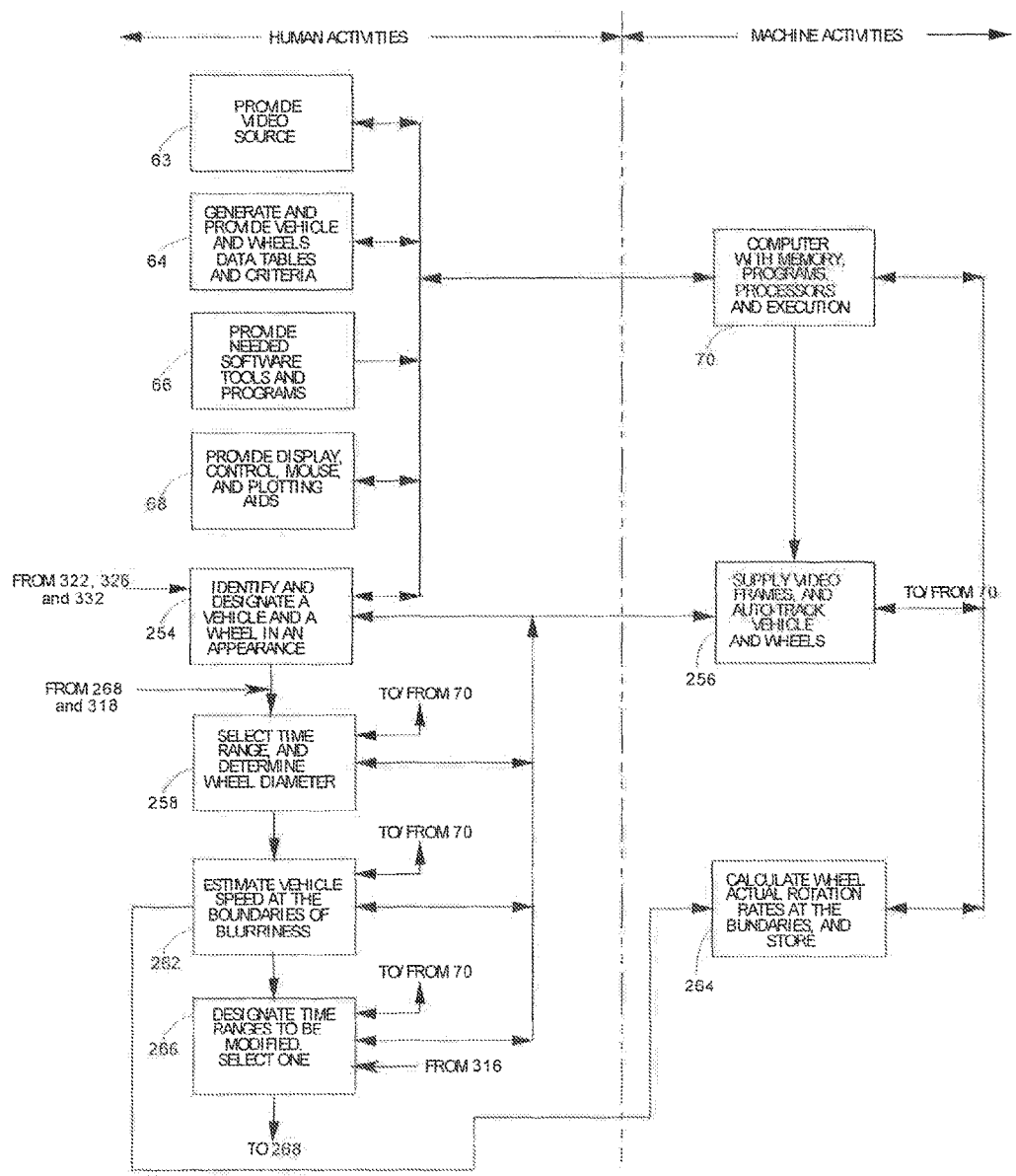
Figure 27:
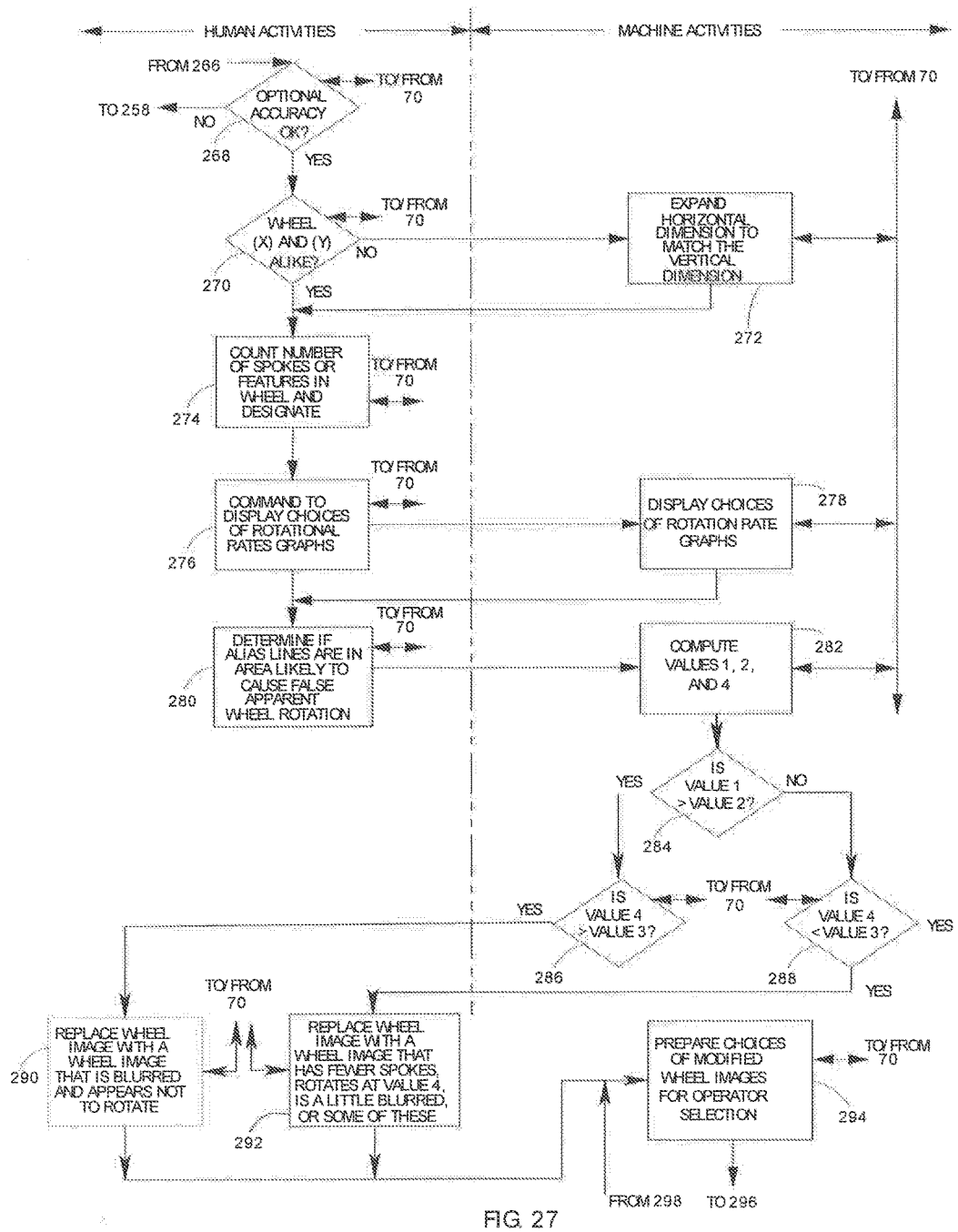
Figure 28:
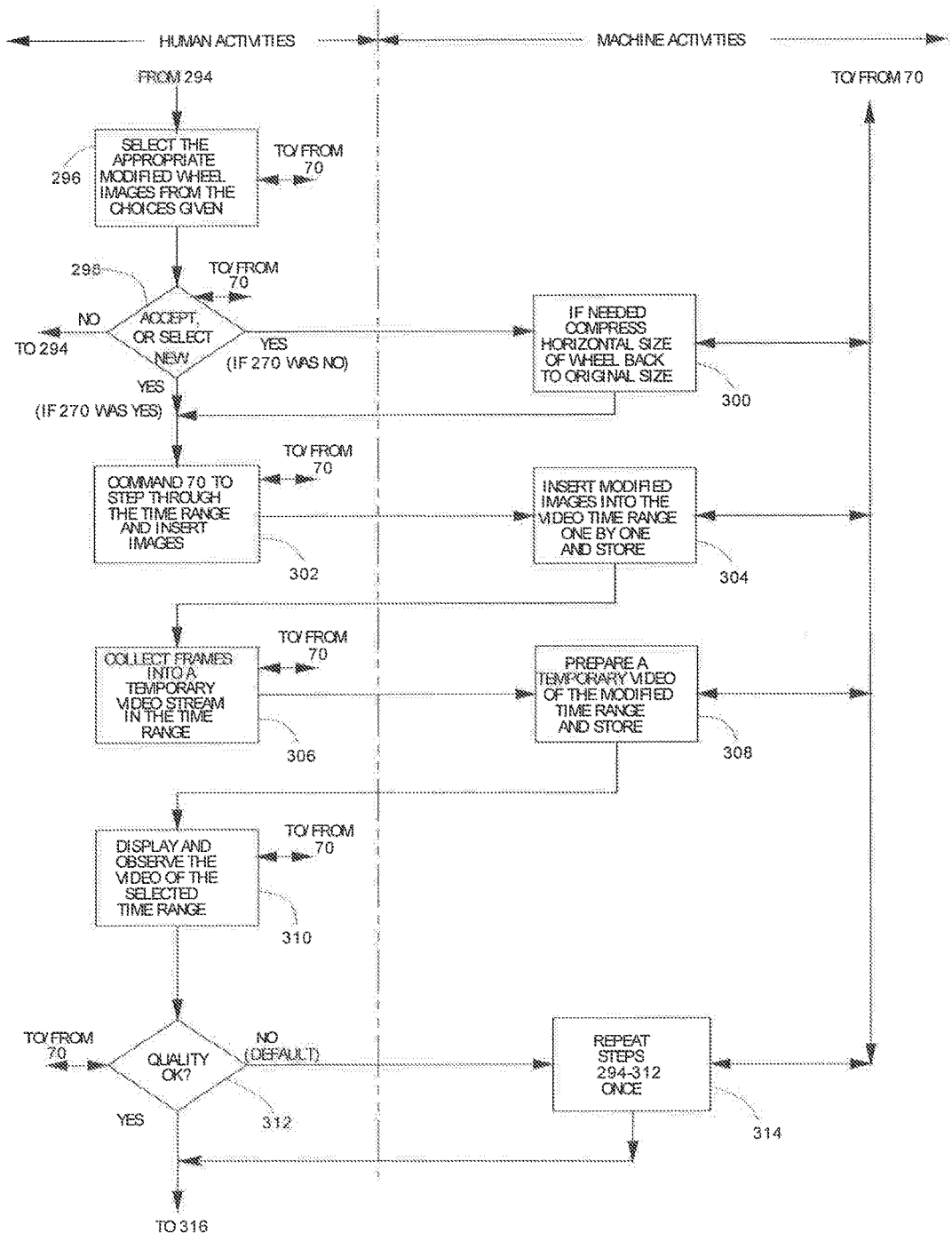
Figure 29:
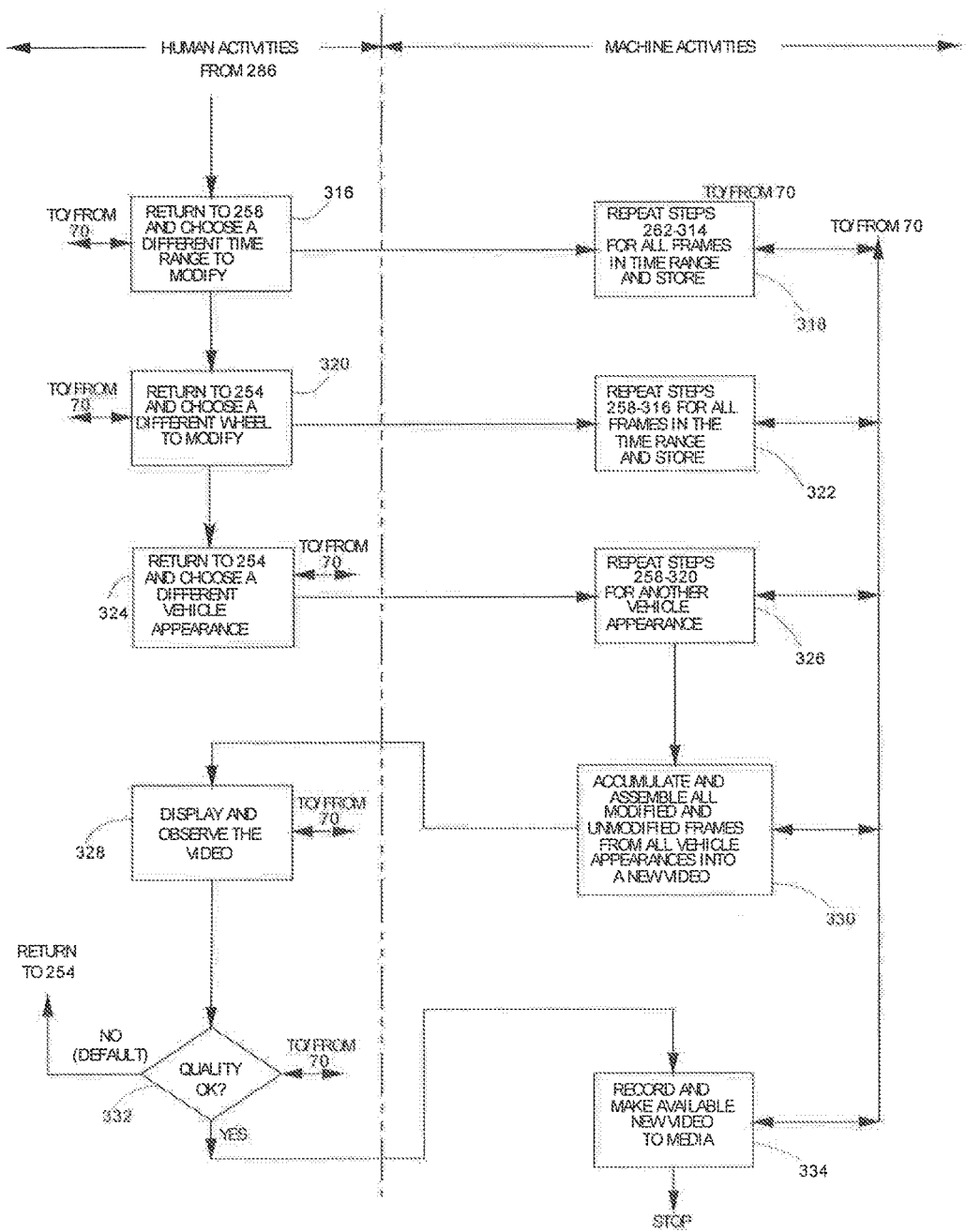

63-70 Inputs and provision of a computer
254 Identification of a vehicle and its wheels, and their designation
256 Supplying video frames, video, and auto tracking
258 Selecting the time frame and determine wheel diameter and number of spokes
262 Estimation of the vehicle speed at the boundaries of blurred image perception
264 Calculation of the actual wheel rotation rate at the boundaries, and storage of data
266 Designation of time ranges to be modified, and choosing one
268 Optional accuracy check
270 Decision whether 2 wheel dimensions are substantially the same
272 Expansion of the wheel dimension to be equal
274 Counting the number of spokes in a wheel and designating it
276 Command to display apparent/true wheel rotation rate graphs
278 Computer displays choices of such rotational graphs
280 Determination whether aliasing is likely cause false rotations in viewing wheel video
282 Computation of the Principal Algorithm inputs of Values 1, 2, and 4
284 Decision as to whether Value 1 is greater than Value 2
286 Decision as to whether Value 4 is greater than Value 3
288 Decision as to whether Value 4 is smaller than Value 3
290 Choose to replace wheel image with one that is blurred
292 Choose to replace wheel image with one that has fewer spokes, rotates at Value 4, is partially blurred, or combinations of all three
294 Preparation of specific choices of modified wheel images selected
296 Selection of the most appropriate substitute wheel images resulting in least false rotation
298 Decision to accept the presented choices, or to select new ones
300 Compression of wheel dimensions if previously expanded
302 Commanding computer to step through the time range and insert the modified images
304 Computer actions to actually insert the modified images one by one and store
306 Operator collection of the frames into a temporary video stream in the selected time range 308 Preparation of a complete temporary video of the modified time range
310 Display and observe the modified video in the selected time range
312 Quality check
314 Repetition of steps 294-312 once
316 Return to 266 and choose a different time range to modify
318 Repeat steps 268-314 and store
320 Return to 254 and choose a different wheel to modify
322 Repeat steps 256-316 and store
324 Return to 254 and choose a different vehicle appearance
326 Repeat 258-320 for a different vehicle appearance
330 Accumulate modified and unmodified frames from all vehicle appearances into a video
332 Quality check decision
334 Record new video and make available to media The process for this embodiment begins in FIG. 26 with function 254 in which the operator identifies and designates a wheel in a vehicle appearance and views the video or some portion thereof, either directly from 63 or from 70, identifying the first vehicle appearance to be addressed and its wheels, and manually designating them to 70. This appearance of the vehicle in the video is illustrated in FIG. 13, which shows an example of a video, its start as time A, the appearance of a vehicle noted as at time B and its disappearance noted as at time C and identified as 96, a second vehicle appearance at time D and its disappearance as time E and identified as 98, and the ending of the video in time F. This description continues referring to the vehicle as though there were only one vehicle making an appearance in the video, but it will be understood that the process applies to all appearances by one vehicle and also to all appearances of any other vehicles, should there be more than one. Thus 96 could be the first appearance of vehicle #1 and 98 its second appearance, as an example.

Although the operator can choose any point in the video to start the process proper he could advantageously choose a point in time in which a vehicle makes its first appearance in the video, such as point A in FIG. 13. Alternatively he could choose a point in time at which he first perceives the wheels of the vehicle to have an inappropriate rotation rate for the vehicle apparent speed. The operator designates not just the presence of a vehicle but actually designates the vehicle itself and one or both of its visible wheels via their coordinates, distance from the edges of the video frames, or specific characteristics of their image that would allow the computer to track them. Function 256 can also supply images, portions of images, frozen video frames, or other information as requested by 254 for display.

The process then proceeds to 258 in which the computer, on command from the operator, plays the video again on 68, and the operator selects the time frame and determines the wheel diameter. Then in 262, the operator estimates the vehicle speed at the boundaries of wheel blurriness and sends the information to the computer, which calculates the actual wheel rotation rates at the blurriness boundaries or other desired measuring points in 264 and stores the data. The vehicle velocity he will estimate from observing the moving vehicle against the background of the scene in the video, and making an approximate estimate of the vehicle's speed over the ground taking into account the angle of scene's view and the likely dimensions of some fixed objects including buildings and people. If he judges the vehicle's speed to be below, for example, about 38 kph or 24 mph, which corresponds to an L1 or L3 being below about 5 revolutions per second from $$TRR = \frac{V}{\pi D}$$

where V is the vehicle velocity in kilometers per hour, and D is the wheel assembly diameter in meters and assumed at 0.67 meters, and he perceives the wheel to be rotating forward and with the spoke pattern visible, he will deduce that the wheel actual rotation rate is on line 34 in FIG. 11A, and thus will probably not require major modification. If, however, he judges the vehicle speed to be substantially above 38 kph or 24 mph in this example then the distinct rotating spoke pattern he observes probably means that the actual rotation rate must be near one of the sub-synchronous points, the synchronous point, or even a super synchronous point, and he will therefore designate the rotation rate at that time as inappropriate and one that must be modified. In this way or an analogous way the operator can judge whether the computer's calculation of vehicle speed and wheel diameter are reasonable, and thus that the computer is not making large errors.

Then the operator, in 266, designates the time ranges to be modified and selects one, and the process proceeds to 268 for an optional accuracy check, and if OK he sends the process to 270. If the accuracy of the selections is not to his liking he sends the process back to 258. 270 is where the operator assess whether the horizontal and vertical dimensions of the wheel as seen are substantially the same, and if not sends the wheel to the computer which expands the horizontal dimensions to circularity of the wheel in 272, and sends the process to 274 for the operator to count the number of spokes in the wheel and designate that number to the computer for storage. He then, in 276, commands the computer to display the appropriate apparent/true wheel rotation rate chart, and in 280 determines if the aliasing lines intersect the shaded area of FIG. 11A. The operator then commands the computer to compute the Values 1, 2, and 4 for the Principal Algorithm in 282. The computer then decides in 284 whether Value 1 is greater than Value 2 and if so passes the process to 286 and if not to 288. 286 assesses whether Value 4 is greater than Value 3 and if YES passes the process to 290 in which the operator decides to use blurring of the wheel image, while if the answer in 284 was NO then in 288 the computer assesses whether Value 4 is smaller than Value 3 and if so sends the process to 292 where the operator decides to reduce the number of spokes in the modified wheel image, to substitute an image rotating at Value 4, or to somewhat blur the wheel image, or some combination of all these.

The operator then sends the process to 294 in which the computer prepares specific choices of modified wheel images for the operator, from which the operator, in 296, selects the images likely to produce the least false apparent wheel rotation. The operator then has an optional quality check in 298 in which he can satisfy himself that he has made the appropriate choices of selecting a new image. If he is NOT satisfied he sends the process back to 294 for another try. If the decision of 298 was YES and the decision in 270 was NO the process then proceeds to 300 in which the computer changes the wheel image dimensions back to the non-circular ones it has expanded them to previously in 270, and if the decision in 270 was YES then he proceeds directly to 302 as the dimension change will not be needed. In 302 he commands the computer to step through the time range examined and insert the modified wheel images to replace the appropriate unmodified ones, one by one and store them, which the computer executes in 304. The operator in 306 then asks for a temporary video stream to be prepared in the time range, which the computer executes in 308, and on command displays the video of the selected time range for the operator in 310. The operator once again checks the quality of the video in the time range in 312 and if not satisfied sends the process to 314 to repeat steps 294-312 one time. The default decision in 312 should be NO so that a poor quality product will not make it all the way without a conscious decision by the operator to do so. However if the operator is satisfied he passes the process to 316.

The operator, in 316, returns the process to 258 and chooses a different time range to modify. He then sends the process to 318 to repeat 262-314 for all the frames in the new time range and store the results. The operator then, in 320, commands the process to return to 254 and choose a different wheel to modify, whereupon the computer repeats 258-316 for all frames in the new time range in 322, and stores them. The operator then, in 324, commands the process to return to 254 to choose a different vehicle appearance, and commands the computer to repeat steps 258-320 for the other vehicle appearance. The computer then steps to 330 and accumulates and assembles all the unmodified and all the modified frames from all the wheels and from all the vehicle appearances into a new continuous video, which it send to the operator who observes it in 328. If the operator is satisfied with the quality of the new video in 332 he sends it to 334 to make at least one recording and to distribute to media as appropriate. If the operator is not satisfied he sends the process back to 254 to be repeated, which is the default action if he does nothing to prevent poor quality videos from reaching the recording stage.

Detailed Description of the Fourth (and Alternate Currently Preferred) Embodiment This embodiment is a method of a fully automated process implemented on a computer, with optional and very limited human control of the computer, which is designed to operate in real time and in line with streaming video services. This embodiment is similar to the second embodiment (currently preferred) but differs from it principally in adding parallel channels of processing and appropriate buffering and sequencing so that both visible wheels of a vehicle and two or more different vehicles can be processed in parallel and simultaneously in order to reduce time delays in making the desired modifications to wheel images to an absolute minimum, which will be of utmost importance to this embodiment as it operates in real time.

Figures in this embodiment: FIGS. 5 through 22A-F (previous embodiments) and 30-31

63-70 Inputs and computer
336 Visual identification of vehicles and manual designation, or process start command
338 Detect a vehicle and its wheels, designate the vehicle and its wheels, and autotrack
340 Select timing strategy and set the M frames and target frame
342 Provision of image rotation and measurement resources
344 Determination of vehicle speed, direction, and angles; and assignment of channels
346 Determination of video frame rate and counting number of spokes in wheel
348 Determination of the vertical and horizontal dimensions of a wheel
350 Deciding as to whether the two dimensions are about equal
352 Expansion of the horizontal dimension to equal the vertical dimension
354 Determine the wheel rotation rate over a set of N frames
356 Compute the Values 1-4 of the Principal Algorithm
358 Determining whether Value 1 is greater than Value 2
360 Determining whether Value 4 is greater than Value 3
362 Determining whether Value 4 is smaller than Value 3
364 Determining that the wheel images must be blurred
366 Determining that the wheel images must have reduced spokes, rotate at Value 4, or be partially blurred, or a combination of these
368 Recalling whether the previous decision in 350 was YES
370 Compression of the horizontal dimension back to its original dimensions
372 Adjusting the size and fit of the modified image
374 Sequencing and buffering of the modified wheel images
376 Insertion of the modified wheel images into the new target frame and storing off-line
378 Deciding on the quality and timing of the substitutions
380 Fast accumulation and assembly of the new frames into a video
382 Providing a remotely actuated fast video switch
384 Distribution of the resultant video stream to the users
386 Optional operator visual quality check of the replaced video images
388 Optional decision to accept or reject the replacement video images
390 Optional operator quality check of the video stream
392 Final optional operator accept/reject quality decision The process begins with computer function 338 in FIG. 30 with the computer accessing the start of the video 63, which is illustrated in FIG. 13 as point A. 338 then autonomously identifies, designates, and begins tracking the first vehicle's first appearance in the video, such as shown in the illustration of FIG. 13 as the point B of the vehicle's appearance, 96. The software definitions and many use provisions and discussions in the previous embodiments, and particularly in the second embodiment (currently preferred) are fully applicable to this embodiment.

An option is provided in function 336 for the operator to identify and designate the vehicle to 70 while viewing the video 63 on 68 as the first step in the process, and is provided as insurance against the process having unexpected difficulties at its outset or during routine operation, as well as serving a key role in initial checkout of the system or its upgrades. Alternatively the operator can simply initiate the machine process by a command to 70 to "start" in 336 if desired. The operator could also initiate the process by an even simpler switch actuation which would power or alert 70 to the fact that its functions are now desired, so as to prevent it from operating all the time on a video feed and rather only when and if so desired. Nonetheless, as the process is to be automated so as to minimize processing time delays, it is anticipated that the process starting with 338 be active all the time after initial checkout and when functioning. This could be implemented by a setting or switch activated by 336 once the automated vehicle recognition function works reliably enough and has a low inappropriate start rate, as would be determined by analysis, experience, or both.

Once the process is started 338 begins observing the video image stream to detect and identify the first appearance by a vehicle in the video stream, following the instructions, information, and criteria of 64, and designates the vehicle by a unique identifier code. The function then similarly detects, identifies, and designates its wheel, or both wheels should they both be visible, and begins tracking the vehicle and each wheel separately ad in parallel. Function 338 also continually observes the video stream to detect when the vehicle disappears, or when a different vehicle makes its appearance, shown as point D and curve 98 in FIG. 13, and if so it designates the second vehicle by another unique identifier code, detects and designates its wheels, and auto-tracks them separately and in parallel and in parallel with the wheels of the first vehicle if still visible, and repeats the process for any additional vehicles that make their appearance in the video. 338 will thus have the capability to identify and track several vehicles and their wheels simultaneously, an important factor since the two visible wheels of any vehicle may have a different shape when it is turning, and since the other vehicle or vehicles may make appearances and/or disappearances simultaneously with the first vehicle still being visible.

338 thus acts as a master detection and assignment function that selects and sets the overall timing and channel strategy for the embodiment, while it defers the detailed channel assignment for the parallel channels processing each wheel of each vehicle to 340. Function 338 ten passes the process to 340, which selects the timing and strategy for setting the M frames and the target frame for each wheel, similarly to the operations described in the second embodiment. The process then proceeds to 344 to determine the vehicle speed, which will be needed in order to determine the wheel actual rotation rate, which in turn is necessary for the image substitution process, direction, angles, and detailed assignment of channels. Since there could be many parallel channels to handle the multiple parallel wheels being tracked and operated on, there will be a need for multiple identical but separate process flows for the different visible wheels on a vehicle and the several different visible wheels of other vehicles, whether appearing simultaneously in the video frames or sequentially. These will be processed by parallel channels in the process, one for each wheel. In the interest of space the process flow diagrams do not show all these parallel channels, rather choosing to show only one channel for one wheel, recognizing that the parallel process flow steps exist but are not shown in FIGS. 30-31 as they are all identical. As a result of the foregoing the portion of the process flow of FIGS. 30-31 which begins with 346 and ends after 372, is shown for only one wheel, and the existence of the other channels is shown by arrows after 344 and 372. The assignment of which channel handles which wheel is handled by 344 and 70.

It is important to note that the designation of the wheels and the measurement of the vehicle speed are not dependent on each other and could start independently at this time also in parallel with the vehicle speed measurement, but the wheel dimension determination must follow the vehicle speed determination, and the system total processing time must necessarily be additive to all the other functional times, so that the total time could be reduced to $T_2$ in FIG. 24C by paralleling some functional steps. In addition, once the process has stepped though and modified the first frame image, the process for doing so the following frame images can be considerably shorter as long as it is within the same vehicle appearance. This is because only the vehicle speed and the wheel dimensions must be measured, and so with the unavoidable system time delay the total delay could be shortened to $T_3$ in FIG. 24D. The proper functioning of 338 and 340, 344, and following steps requires that the total system time delay be measured and stored, which would be done by the equipment manufacturer and calibrated in the installation by the operator during the set-up process, and would be similar though not necessarily identical for each parallel processing channel.

Once the vehicle speed and direction are known for the vehicle appearance in the video the process proceeds to function 346 which determines the video frame rate and counts the number of spokes in one wheel. The computer obtains the video frame rate by simply counting the time elapsed between video frames, which could take as little as two frames, and stores it. Determination of the number of spokes is accomplished by the computer when it accesses the digital data representing a wheel assembly and wheel image, and scans the digital data in a pattern equidistant from the center of rotation of the wheel, or of the centroid of the wheel image, whichever is easiest to implement, and counting the number of times that the magnitude of those data exceed some threshold. This way the number of spokes or regular features could be readily determined. Counting the times when the data falls below a threshold might also alternatively be used, as well as other methods. The assumption is made that all the wheels of the vehicle have the identical wheel pattern, as is the usual case, particularly in new vehicle advertisement videos. The implementation of the counting of the spokes is very fast as all it requires is scanning a set of digital data points, which can be done very much faster than within one frame of the video. Function 346 could be placed earlier or later within the process flow, and is shown as placed for graphical convenience.

The process then proceeds to 348 to determine the horizontal and vertical dimensions of the designated wheel assembly and wheel. These quantities can be determined by commonly available software that measures the vertical and horizontal extent of the wheel and wheel assembly data relative to the size of a known object. In this case it could be the length of the vehicle, which was estimated previously, or the height of a person or other object in the scene whose size is known or can be approximated. A more accurate determination might be a simple counting of the data elements in an array relative to data from a known object. Alternatively the computer could simply access a lookup table of common wheel assembly sizes for a number of different vehicle brands and models in various countries, and accept the uncertainty in actual rotation rate that would result from not knowing the exact size, which may be sufficiently accurate for the purposes of this embodiment.

The process then proceeds to 350 which is a computer automated decision function which compares the dimensions (X) and (Y) of the wheel to determine if they are similar to each other or very different. If the function makes a YES decision it passes the process to computer function 354 for further action, and if NO to computer function 352 to modify the wheel image dimensions so that they become substantially circular.

The criteria used by 350 to make the decision can be fairly loose, because foreshortening is a cosine function of the angle at which a circle is observed, and a few tens of degrees off normal viewing geometry causes little image non-circularity. The opposite is true of course, when viewing a circle close to right angles to the line of sight, in which case the cosine function is rapidly changing. To that end function 352 simply expands the (X) dimension until matches the (Y) dimension, making the dimensions substantially equal. Alternatively the (Y) dimension could be decreased until it matches the (X) dimension, to the same end. Either of these operations would take place in the digital domain and are very fast. The computer could measure the two dimensions and use the secant of the vertical to expand the horizontal, if desired, to the same end. If the images are small or the video noisy it would be better to invoke the former to avoid noise-induced errors. When complete the process proceeds to 354.

Function 354 determines the actual rotation rate of the wheel assembly over an averaging number of frames, identified as "N" frames, in a similar way as described in the previous embodiments. Once the actual rotation rate during the N video frames is known, the process proceeds to 356 which calculates the Values 1, 2, and 4 for the Principal Algorithm using information gathered in the previous steps as well as provided a priory to 70, in a manner completely analogous as was described in the previous embodiments. Value 3 is obtained from the inputs of 64. The process then proceeds to 358 which decides whether Value 1 is greater than Value 2 and if so passes process to decision function 360 and if not passes it to decision function 362. 360 subsequently decides whether Value 4 is greater than value 3 and if so passes the process to 364 which selects the method of replacement of wheel images with blurred images. 362 decides whether Value 4 is smaller than Value 3 and if so passes the process to 366 which selects replacement wheel images that have fewer spokes than those in the original video, rotate at Value 4, have a degree of blurring, or combinations of these. These decisions are in accordance with the regions so identified in FIG. 11B, and implement the Principal Algorithm as was described in the first and previous embodiments.

Functions 364 and 366 also select appropriate wheel image modification strategies such as illustrated in FIGS. 12A-12C using similar rationales and choosing from among similar choices that were discussed in the first embodiment, except that the process is entirely automated.

The process is then passed to computer decision function 368 to determine whether the wheel images require de-circularization. In order to determine that 368 accesses the decision made by 350 to determine whether the wheel dimensions (X) or (Y) were modified to attain circularity. If the 350 decision was YES then no circularization was done and the process proceeds directly to 372. If it was NO then the dimensions were modified to attain circularity and the process proceeds to 370 to perform the inverse operation and de-circularize the image back to its original shape for insertion of the modified wheel images. To do that it would compress the (X) dimension of the wheel image back to the same dimension that it has before 352 expanded it The process then proceeds to 372 which is a function that buffers or holds the data for the wheel assembly and wheel image in the modified frame and measures its dimensions, shape, and size, and adjusts them so that they match the stored dimensions in the original wheel assembly dimensions, should they require any adjustment. In that sense this a "vernier" adjustment to fine-tune the size adjustment and dimensions so that the new images will be seen as seamlessly replacing the original ones when the image replacement is actually performed. The sizing adjustment is a simple scaling in the software, and the criteria for size match are contained in 64.

The process then proceeds to 374 which is a sequencing and buffering function that collects the modified wheel images from up to two wheels in each of two or more different vehicles from the separate processing flows that originated in 340, 344, and 346. Since these images may each have a different total delay they may arrive at 374 at slightly different times, and thus they are each placed into buffer storage. When all have arrived they are sent to 376 which performs the simultaneous insertion and replacement of all the original wheel assembly images in all visible vehicles with the individual appropriately modified wheel assembly images into the next possible frame, whether the original targeted frame or a slightly delayed frame should the parallel processing requirements result in slightly more time delay. An option exists to insert the images into the original video frames as they are available from 372, should the time sequence be more favorable on the average to less time delay. The frames with the inserted wheel images are stored off line by 376.

The process then proceeds to 378 which is an optional function that assembles and accumulates the modified and unmodified frames in the proper sequence of the original video into a temporary video segment, which can optionally be shown to the operator for his approval off-line during the installation and checkout process, and for troubleshooting, if and when desired. If this is desired the process proceeds to 386 in which the operator views the temporary video segment prepared by 376 during which he would be able to see the effects of the image modification process. While this may not be very useful in actual on-line use because of the very short times available and the very undesirable time delays incurred, it would be extremely useful in the initial familiarization, operational practice, and checkout process, as well as for troubleshooting. If the operator responds in 386 he decides in 388 whether the quality is adequate. If YES, which is the default decision, he sends the process to 380. If NO he sends the process back to 340 or later for another try.

Function 380 is an optional fast-accumulating function that assembles the new and original frames into a continuous video. The output of 380 can optionally be sent to 390 for a complete screening by the operator off-line if he wishes, during the checkout or troubleshooting phases. If so he decides in 392 whether the new video is of high enough quality to declare the entire process as sound, and he has a default outcome of doing nothing. If he has a problem with the video he can send an activation signal to 382, which is a fast video switch function 382, implemented either in software or in hardware or both, that has the ability to switch between the original video 63 and the modified video in a time shorter than one video frame. The normal setting of the fast video switch is to pass the modified video stream from 380. This switching function would be enabled by command from 392 to 70 or directly from 392 to 382 to activate the switch if the operator decided the quality was not acceptable, which would result in the almost seamless and instantaneous streaming of the original video instead of the modified video. Should 382 be activated it would effectively sidetrack the image modification process until that command is reversed, but without interrupting the video stream which continues to stream the original video to be distributed by 384 to the media and the users/viewers. While the modified video would be sidetracked the process could be kept operating until the decision was made to switch it back to the modified video stream by commanding 70 to deactivate the switch 382 and pass the modified video to 384. The inclusion of this operator optional intervention assures that a poor quality product will not make it all the way, even in the checkout process, without a conscious decision by the operator let it do so.

Thus there exists also the flexibility, should the operator determine it advantageous, or there were instructions in 64 regarding trying again after some elapsed time so state, for the operator to reverse his decision to stream the original video to 384 for distribution to media by commanding 382 to once again pass the modified video stream to 384. This can be repeated as often as the operator or the instructions of 64 deem it necessary. None of these options need interfere with the process being limited to a wholly automatic and autonomous process with absolute minimal time delays that can be "on-line" all the time without operator participation, as all such operator intervention functions can be limited to times when the process is off-line such as in initialization, checkout, or troubleshooting.

As in the second and currently preferred embodiment the functioning of the process produces a video of the vehicle or vehicles in which the wheels appear to be rotating at rates appropriate for the vehicle speed, as illustrated in FIGS. 21A-21L for low speeds, or appropriately blurred as illustrated in FIGS. 22A-22F for higher speeds. The output of 384 is a seamless video stream containing either the original or modified video frames or both in whatever sequence the process attained, which is distributed to the media and users in the usual manner of conventional streaming video. This process will assure that the viewers will be unaware of the modifications, whether inserted or not, and at the worst case will be watching the original video unmodified at certain times.

While the steps of the process in this embodiment will accomplish its objectives, some steps may not be necessary and might be omitted, while some may be combined into fewer steps. An example is the omitting of steps 350, 352, 368, and 370 which made the wheel image circular for easier measurements and operations, used a circular modified image, and then made it non-circular again to match the original wheel shape. An option exists to perform all operations on the non-circular wheel images, which will be elliptical, since the are software programs that can perform the counting of the spokes and wheel sizing operations on elliptical images rather than on circular ones. While this would save some complexity and time delay there are limits to the elasticity that can be accommodated in such operations due to the inherent noise and inaccuracy involved in measurements of small quantities which could decrease the accuracy of the image substitution process, and thus such techniques could be used providing the angle of viewing of the wheel with respect to its axis is not close to zero or 180 degrees. Another option would be dispense with one or more of the optional operator functions in a wholly automated version for operations, which could be turned into the operator-controlled version by activating a software module.

Summary of Advantages

The embodiments described provide method which will result in the apparent rotation rates of the images of wheels in moving vehicles as presented in television, video, movie, computer, or other media displays to be perceived as appropriate for the actual vehicle speeds in the displays; provide similar apparatus and method which will result in the apparent translation rates of linear objects containing regular features as presented in television, video, movie, computer, or other media displays to be perceived as appropriate for the actual linear motion of those objects in the displays; generally make much more satisfying the television, video, movie, computer, or other media viewing experience when containing moving objects with regularly placed areas or features; generally make more pleasing the experience and much more attractive the vehicles shown in these media for advertising or other purposes and resulting in increased sales, greater viewer approval, or both; remove any limits in current vehicle imaging such as restrictions in showing only some viewing angles, situations, etc. which may be imposed in order to minimize the stroboscopic effect, which limits or complicates or makes more expensive the production of videos in any media for advertising and other purposes; have low cost and fairly rapid implementation, since all embodiments employ mostly existing software and hardware; ensure that operation of the implementation will also be low cost because most of the functions of the method can be performed by commonly available but specific software running on a widely available general purpose or special purpose computer; or if not available are simple enough that such can be readily programmed by those with ordinary skill in the art. The method exploits fundamental aspects of the stroboscopic aliasing phenomenon, which are expressed in definition of four Values that make up the variables of the Principal Algorithm that defines the uniqueness of this application, which is adopted and applied in each of four embodiments. These embodiments differ principally in the degree and kind of human operator interaction with, and oversight of, the machine computer carrying out the process in all embodiments; oversight of the final product; and whether they operate off-line on a video and produce another recorded video or in-line and in real time with the video while it is being streamed to viewers.

CONCLUSIONS, RAMIFICATIONS, AND SCOPE

Each of the embodiments of the invention presented can either completely eliminate or greatly reduce the perception of inappropriately rotating wheels on moving vehicles which are commonly observed in video, television, computer, movies, video discs or tapes, DVDs, video CDs and other displays. All embodiments are also applicable to all imaging media which show images in a set of sequences, including movie film when converted to electronic presentation or display, and for viewing on analog as well as digital displays or monitors, as well as cellphone displays, tablet computer displays, and the like.

Two of the embodiments are designed to function in a human-controlled and computer-executed mode, applicable to off-line operation in which the operator and process can take all the time necessary to achieve a satisfactory product; and in which the product is another video recording identical to the original source but with the wheel images that appear to be inappropriately rotating for the vehicle speeds when viewed on displays being replaced by wheel images that now appear to be appropriately rotating for the vehicle speeds. The other two embodiments, which are the currently preferred embodiments, are designed to function in a wholly automated computer-executed mode, with optional and very limited human participation to be used in the initial setup and checkout modes and for troubleshooting, and are applicable to streaming video data which are modified with the same result as in the first mode but with minimal time delays while being streamed to the user displays in real time. These are intended to be on-line with distribution channels to viewers and others active all the time and to function in automatic mode. These two automated embodiments will be able to produce video output with modified appropriate wheel images and original video wheel images both in their respective sequence of frames in the original video, seamlessly and without that process being noticeable or discernible by viewers on video displays.

The appearance of seeing the wheels of moving vehicles in videos without the inappropriate rotation effects caused by the stroboscopic effect would have the double advantage of producing a more pleasing and less disconcerting experience for the viewing public, and being a boon to vehicle manufacturers and advertisers, in the latter case saving money and selling more vehicles.

All embodiments are applicable regardless of the frame rate, the interlace rate, the scan rate, the progressive scan rate, film projection rate, or other rate at which the images are presented in rapid sequence to the display units and thence to the viewers. This is due to the invention of a Principal Algorithm and its four constituent Values. All the embodiments can function well whether the vehicles and their wheels are viewed normal to the axis of rotation of the wheels or at an oblique angle, as the desired effectiveness of the embodiments can be obtained mostly regardless of such angle. The rotational rates, frame rates, apparent rotational rates, frame rate variations, and other aspects of a moving vehicle presented in television or other video media are illustrated and discussed for example only, and the embodiments would function as well for other values. The embodiments are also wholly applicable whether the vehicles shown in the media are cars, bicycles, motorcycles, trucks, trains, wagons, horse-drawn carts or carriages, aircraft taxiing, or indeed any mobile conveyance with rotating visible parts whose design or construction is such that a series of regular features or marks appear thereon, as opposed to a homogeneous surface or appearance. The embodiments may have applications in industry, government, or entertainment regardless of the parameter values of examples discussed.

It will be also appreciated that it may not be necessary to make the final wheel image apparent rotation rates exactly the proper ones, but that due to the limitations of the human eye and thresholds below which the inappropriate motion may be not observable or perceived as objectionable some latitude may exist in presenting images whose apparent rotation rates, while not perfect, still appear much better if not totally appropriate than the backwardly rotation, stopped rotation, and other apparent rates grossly differing from the proper ones commonly seen in videos, movies, and television.

It must also be recognized that the stroboscopic effect as treated for rotating objects is not limited to objects that rotate, but in general also applies to objects that have regular features and rectilinear or other motion at an angle that is not parallel to the main direction of some or all of those features. This is because if an extended object with regular features, such as a long ladder with a number of steps or rungs for example, is moving in a direction such as being carried by two workmen across the field of view of the video camera, the stroboscopic effect interacting with the frame rate of the viewers' display can cause the horizontal position of the steps of the ladder to be perceived improperly as moving forward, backward, or standing still. This is completely analogous to the improperly perceived rotating wheel assemblies. Therefore the features, characteristics, and methods of all embodiments of this invention must be recognized to apply fully for use with objects of any shape and having rectilinear as well as rotational motion, or combinations of both, so long as they contain elements of their construction or design that have regular features, and whose placement in the video images is varying with time.

The four embodiments presented are equally capable and worthy, and their presentation and order should not be construed as implying that any has more advantages than the others, however the currently preferred and the alternate currently preferred embodiments have the advantage of being on line and operating in real time seamlessly with the original video, while the other two embodiments have the advantage of operating totally off-line and thus allowing plenty of time for all process steps to make the image modifications which are best, allow many iterations toward this end, and to have human operators whose judgment and pattern recognition abilities can ensure a high quality product.

While the embodiment descriptions contain many details and specifics, these should not be construed as limiting the scope of the embodiments, but as merely providing illustrations of several possible embodiments. Thus the scope of the embodiments should be determined by the appended claims and their legal equivalents, rather than by the examples given.

The invention claimed is:

1. A method of modifying the apparent rotation rate of at least one vehicle wheel containing distinct regularly placed areas, in video media, comprising:

accessing a sequence of source video images which include the at least one vehicle wheel, wherein the sequence has a frame rate in frames per second, and wherein the at least one vehicle wheel contains a number of distinct regularly placed areas, is coupled to a vehicle moving at a velocity, has an overall diameter including a tire, and has a rotation rate;

providing replacement means to replace wheel areas of each image in the sequence with modified wheel areas, leaving all non-wheel areas, wherein a wheel area is an area of an image in which a wheel appears, and a modified wheel area is an area of an image in which a modified wheel appears;

setting a first value equal to the frame rate divided by the number of distinct regularly placed areas in a single wheel;

setting a second value equal to two times a third value which represents a human upper rotational motion perception limit;

setting a fourth value equal to the velocity in meters per second divided by the product of pi and the overall wheel diameter in meters;

wherein when the first value is greater than the second value, operating the replacement means whenever the fourth value is greater than the third value in order to replace the wheel areas of each image with modified wheel areas that are rotationally uniform and indistinct so as to appear blurred or unresolved regardless of their rotation rate when viewed in a video display, and wherein when the first value is less than the second value, operating the replacement means whenever the fourth value is less than the third value in order to replace the wheel areas of each image with modified wheel areas having at least one of three properties, the first property comprising having a smaller number of distinct regularly placed areas than the number of distinct regularly placed areas in the source video images, the second property comprising rotation of said wheel at a rotation rate equal to of the fourth value when viewed on one or more video displays, and the third property comprising modified wheel areas that are rotationally uniform and indistinct so as to appear blurred or unresolved regardless of their rotation rate when viewed in a video display; and producing a new sequence of video images comprising the source video images and the modified wheel images.

2. The method of claim 1, further comprising:
producing and storing the new sequence of video images in a time sequence that matches the source sequence.

3. The method of claim 2, further comprising:
removing any foreshortening for ease in image manipulation, or applying foreshortening after image manipulation for image insertion into the video stream, based on horizontal and vertical dimensions of a vehicle wheel.

4. The method of claim 2, further comprising:
accessing and modifying in parallel a plurality of wheel areas on a plurality of vehicles in one or more scenes of the source video simultaneously.

5. The method of claim 2, further comprising:
buffering and sequencing a plurality of modified wheel areas from a plurality of vehicles for simultaneous and seamless replacement into the new video sequence.

6. The method of claim 1, further comprising:
producing and streaming the new sequence of video images to media in real time for display on at least one display device.

7. The method of claim 6, further comprising:
removing any foreshortening for ease in image manipulation, or applying foreshortening after image manipulation for image insertion into the video stream, based on horizontal and vertical dimensions of a vehicle wheel.

8. The method of claim 6, further comprising:
accessing and modifying in parallel a plurality of wheel areas on a plurality of vehicles in one or more scenes of the source video simultaneously.

9. The method of claim 6, further comprising:
buffering and sequencing a plurality of modified wheel areas from a plurality of vehicles for simultaneous and seamless replacement into the new video sequence.

* * * * *